United States Patent [19]
Fujimura et al.

[11] Patent Number: 5,484,118
[45] Date of Patent: *Jan. 16, 1996

[54] SEAT BELT RETRACTOR

[75] Inventors: Yoshiichi Fujimura, Shiga; Shizutaka Matsuuka, Hikone, both of Japan

[73] Assignee: Takata Corporation, Tokyo, Japan

[ * ] Notice: The term of this patent shall not extend beyond the expiration date of Pat. No. 5,314,137.

[21] Appl. No.: 34,702

[22] Filed: Mar. 19, 1993

[30] Foreign Application Priority Data

Mar. 24, 1992 [JP] Japan ..................................... 4-066326

[51] Int. Cl.$^6$ ............................ B60R 22/34; B65H 75/48
[52] U.S. Cl. .................................... 272/384.2; 242/381.1
[58] Field of Search ........................... 242/101, 107.4 R, 242/107.4 A, 107.4 B, 381.1, 384.2; 280/806, 807, 808

[56] References Cited

U.S. PATENT DOCUMENTS

| | | | |
|---|---|---|---|
| 3,865,329 | 2/1975 | Higbee et al. | 242/107.4 |
| 4,277,036 | 7/1981 | Seifert et al. | 242/107.4 A |
| 4,307,852 | 12/1981 | Seifert et al. | 242/107.4 A |
| 4,366,934 | 1/1983 | Seifert et al. | 242/107.4 A |
| 4,369,932 | 1/1983 | Seifert et al. | 242/107.4 A |
| 4,723,729 | 2/1988 | Gulette | 242/107.4 A |
| 4,726,540 | 2/1988 | Ches et al. | 242/107.4 A |
| 4,796,918 | 1/1989 | Meyer et al. | 280/806 |
| 4,802,634 | 2/1989 | Singer | 242/107.4 A |
| 4,907,820 | 3/1990 | Föhl | 280/806 |
| 5,314,137 | 5/1994 | Fujimura et al. | 242/381.1 |
| 5,364,048 | 11/1994 | Fujimura et al. | 242/381.1 |

FOREIGN PATENT DOCUMENTS

| | | |
|---|---|---|
| 0123219 | 10/1984 | European Pat. Off. . |
| 3108632 | 10/1982 | Germany ..................... 242/107.4 R |
| 1436764 | 5/1976 | United Kingdom . |
| 2151458 | 7/1985 | United Kingdom . |
| 2151910 | 7/1985 | United Kingdom . |
| 2155306 | 9/1985 | United Kingdom . |
| 2156198 | 10/1985 | United Kingdom . |
| 2254774 | 10/1992 | United Kingdom . |

*Primary Examiner*—John P. Darling
*Attorney, Agent, or Firm*—Varndell Legal Group

[57] ABSTRACT

A seat belt retractor in which when a lock gear (13) rotates in a direction (B) relative to a reel shaft (4), a projecting shaft (19d) moves by the action of a first cam hole (13i), causing a main pawl (19) to pivot in the direction B. Thus, teeth (20a) which are to be engaged with first and second pawl portions (19b) and (19c) are decided. At this time, a backup pawl (22) does not pivot because a projecting shaft (21c) merely moves along a hole (13m). When the lock gear (13) further moves in the direction (B) relative to the reel shaft (4), the first and second pawl portions (19b) and (19c) begin to engage with the teeth (20a), and the projecting shaft (21c) moves along a radial hole (13k). Thus, the backup pawl (22) pivots in the direction (B), and a tooth (2f) which is to be engaged with the backup pawl (22) is decided. When the lock gear (13) further rotates in the direction (B) relative to the reel shaft (4), the first and second pawl portions (19b) and (19c) completely engage with the teeth (20a) at the same time as the backup pawl (22) completely engages with the tooth (2f).

9 Claims, 47 Drawing Sheets

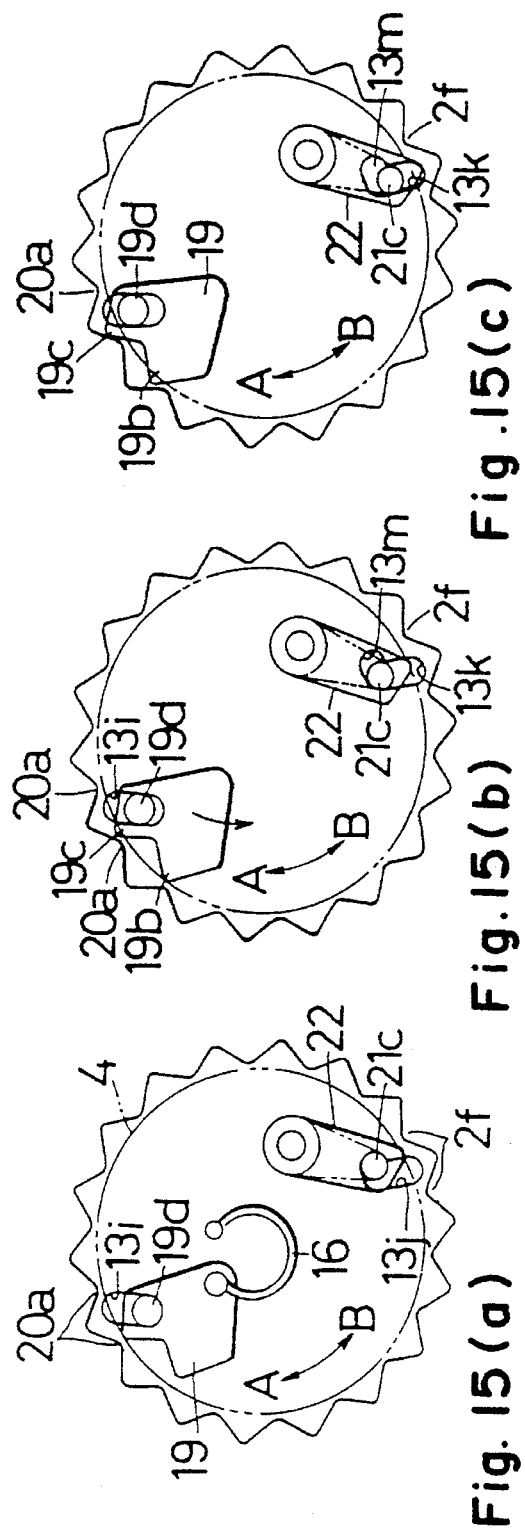

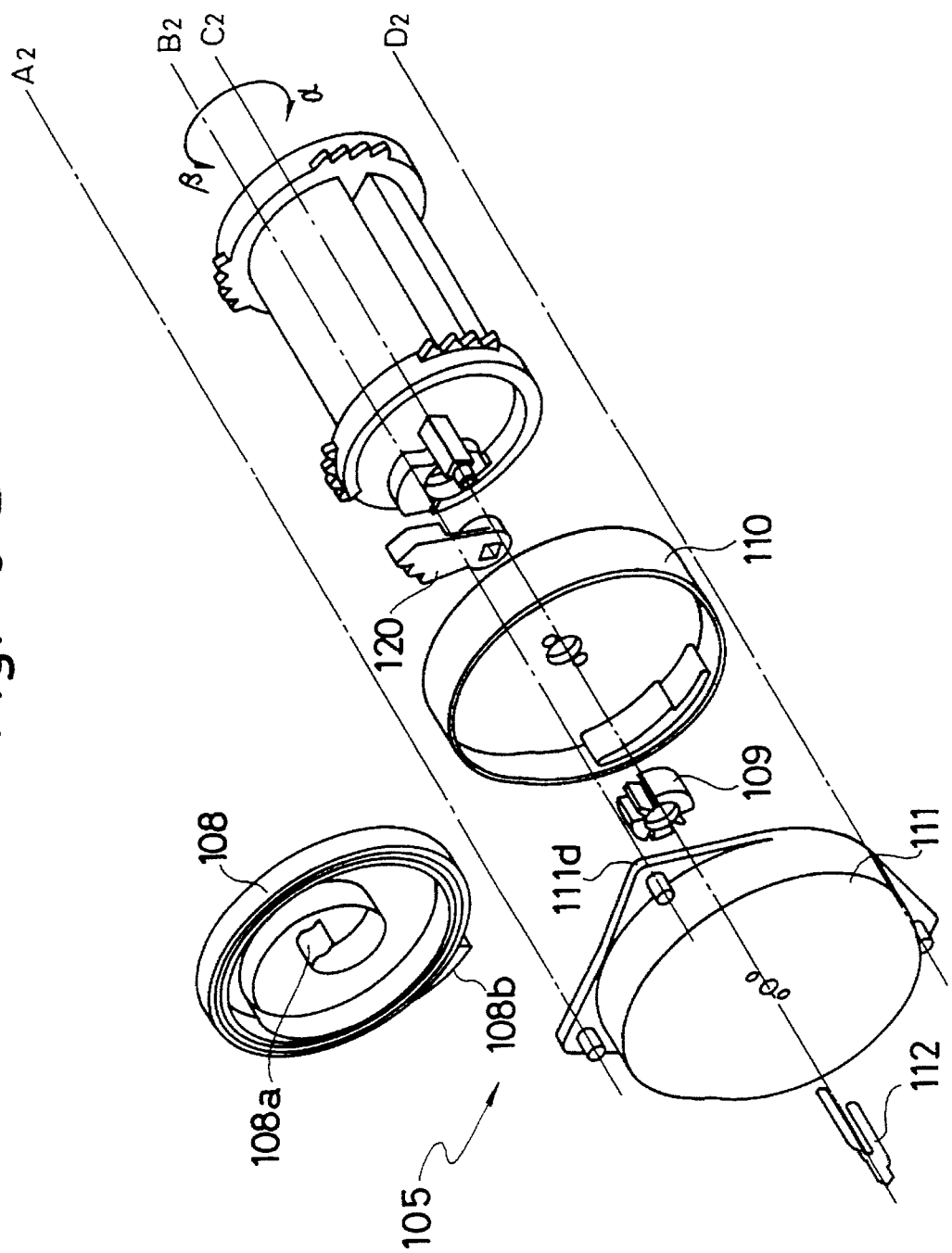

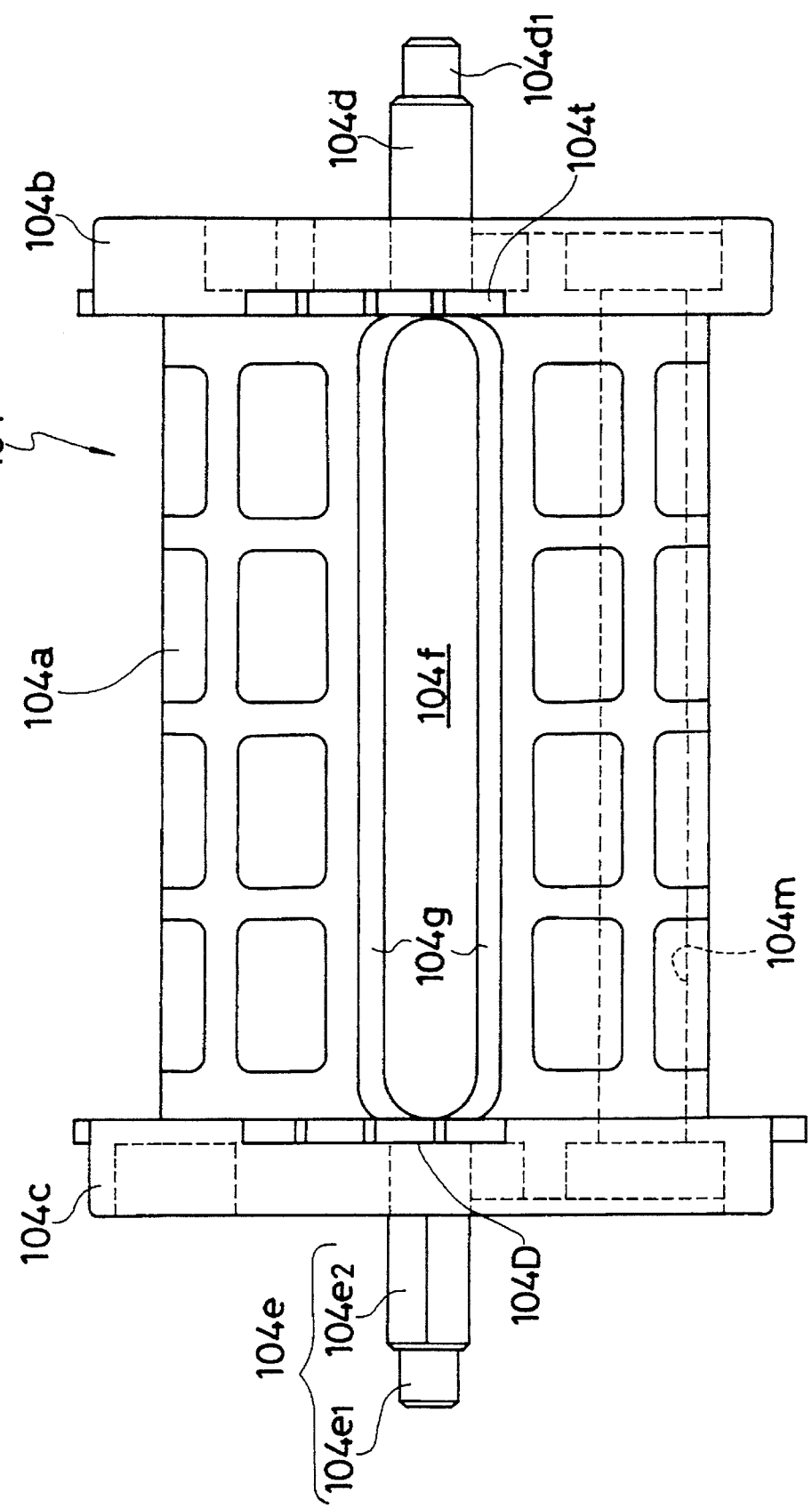

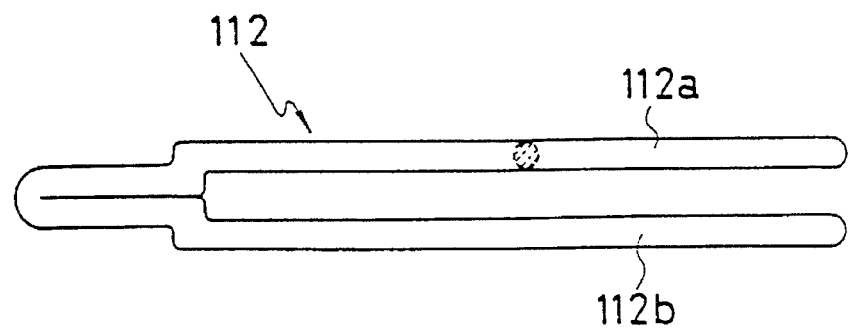
Fig. 28
Fig. 40(a)
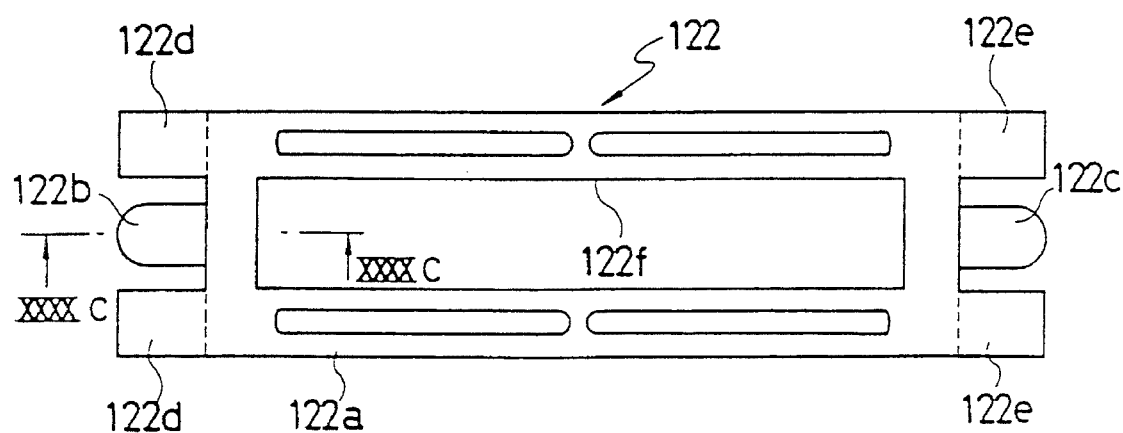
Fig. 40(b)
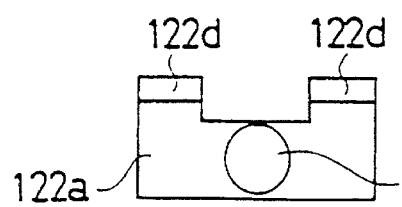
Fig. 40(c)
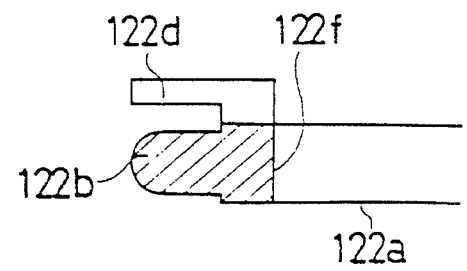

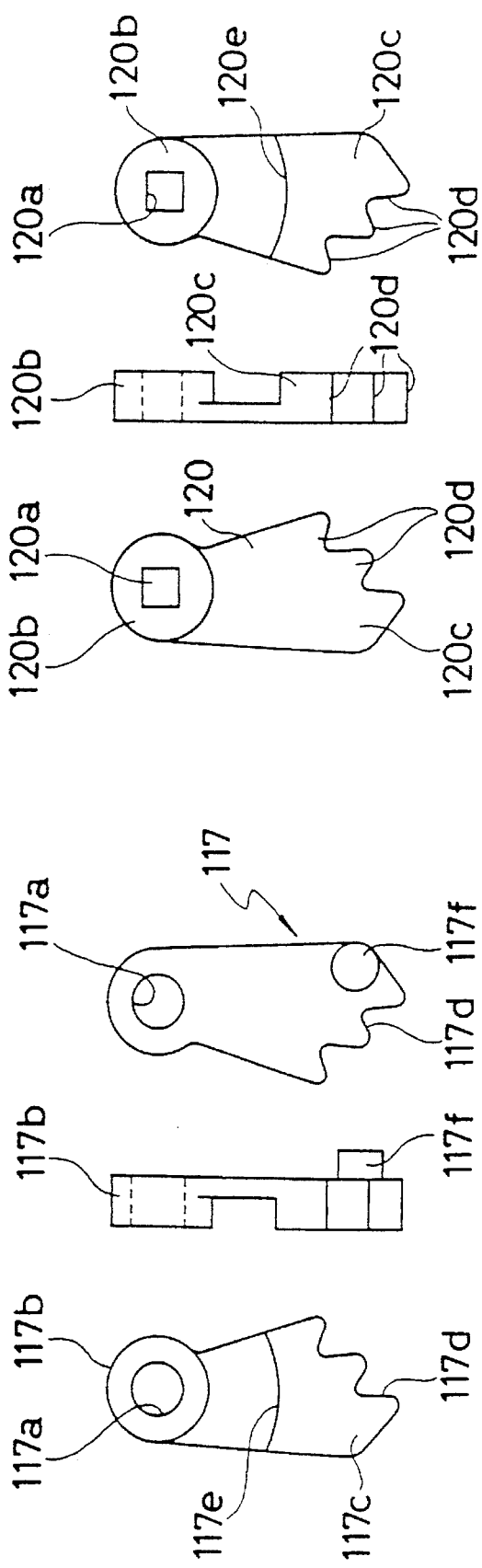

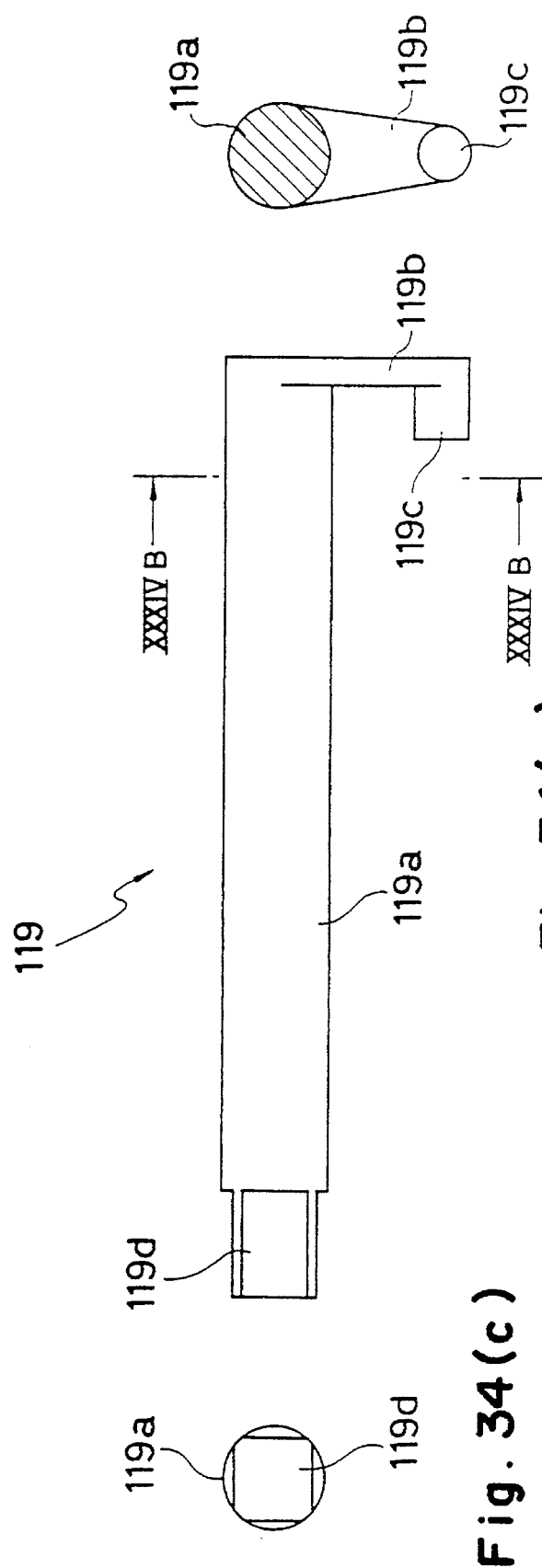

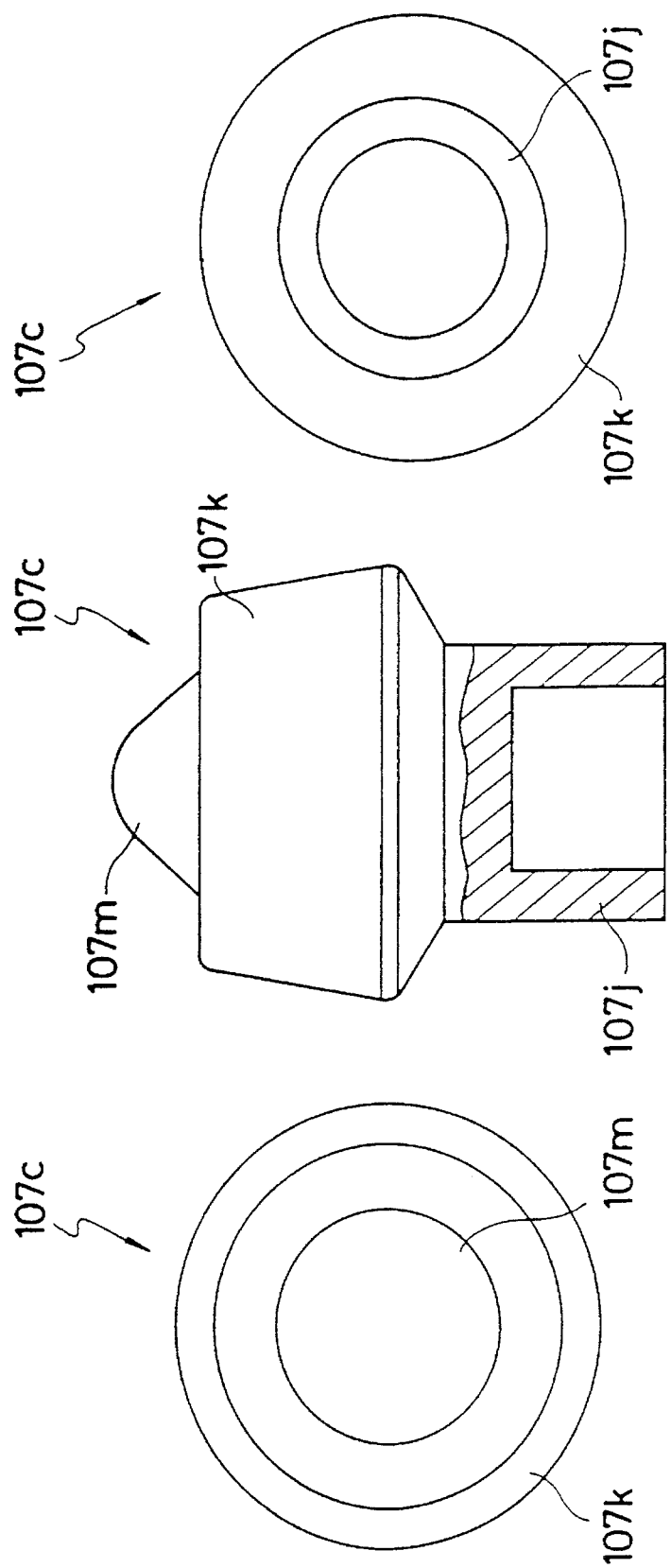

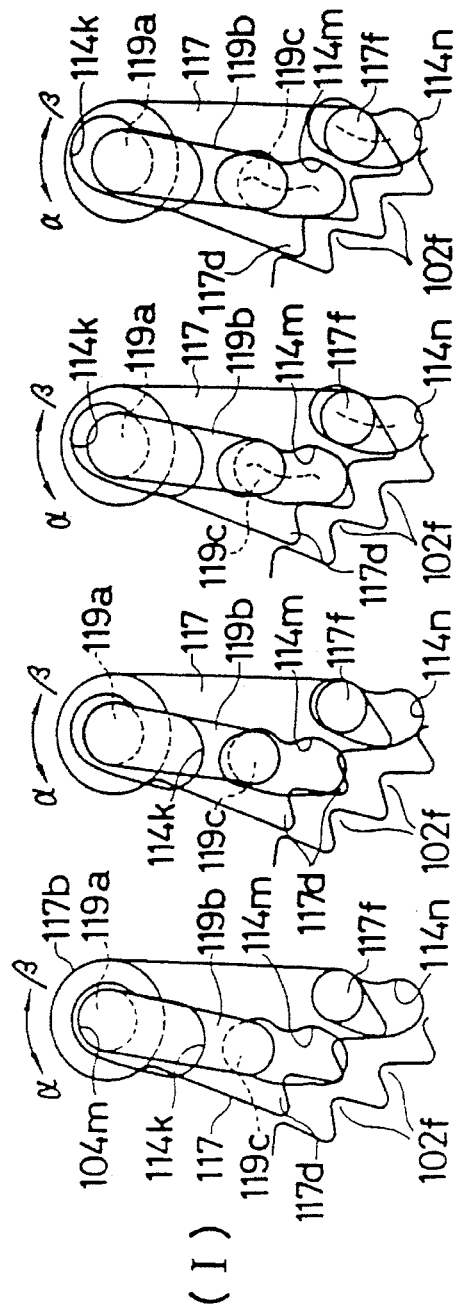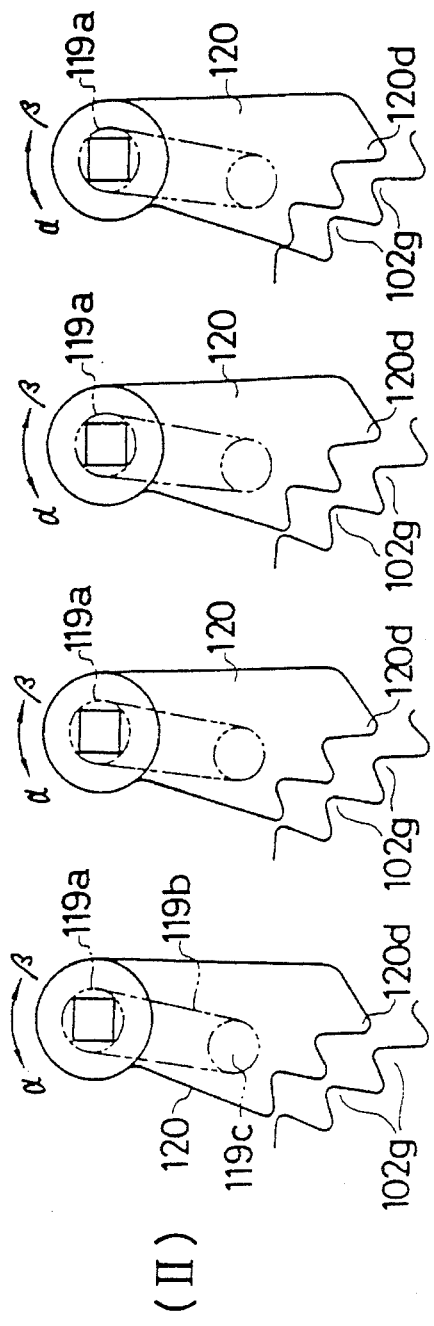
Fig.41A(a) Fig.41A(b) Fig.41A(c) Fig.41A(d)
Fig.41A(e) Fig.41A(f) Fig.41A(g) Fig.41A(h)

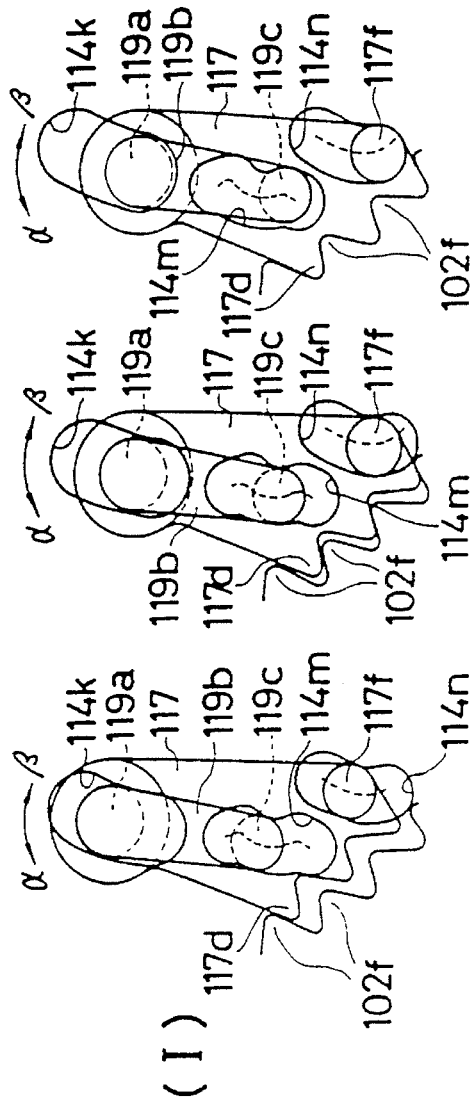
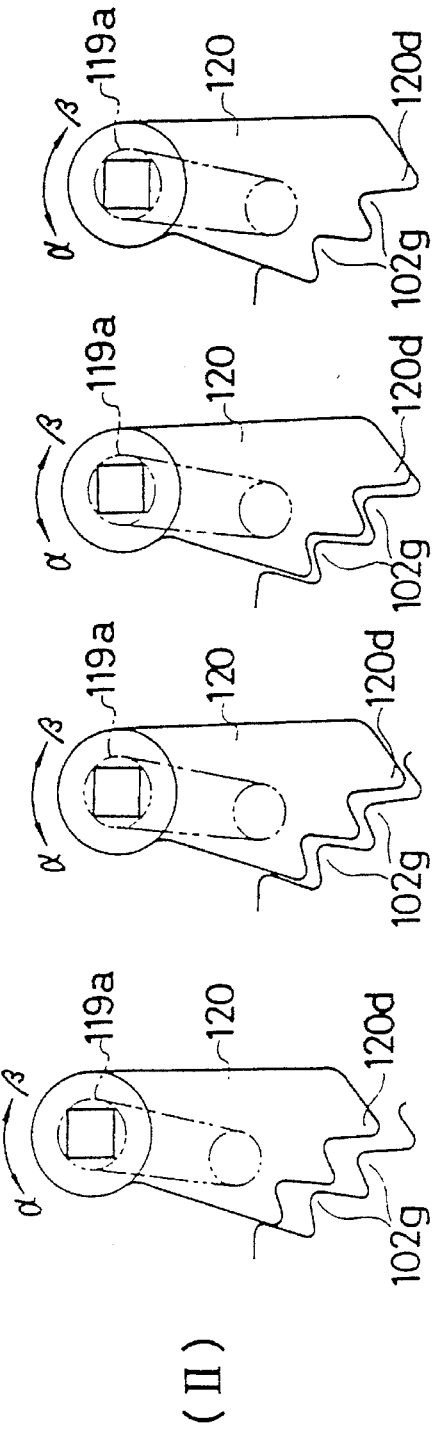

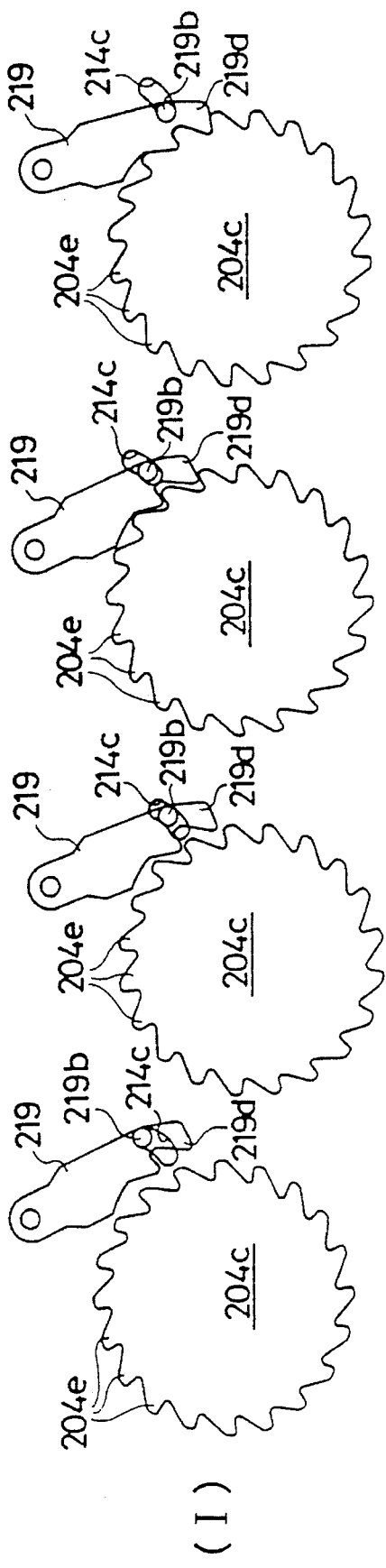

SEAT BELT RETRACTOR

BACKGROUND OF THE INVENTION

The present invention relates to a seat belt system that is provided on a vehicle, for example, an automobile, for the purpose of protecting an occupant. More particularly, the present invention relates to a seat belt retractor designed so that a reel shaft for winding up a webbing is locked from rotating when an emergency situation occurs, thereby preventing the webbing from being pulled out.

A typical conventional seat belt retractor mounted on a vehicle, for example, an automobile, is provided with a means for locking a reel shaft, which winds up a webbing, from rotating in order to prevent the webbing from being pulled out by the inertial movement of the occupant's body at the time of occurrence of such an emergency situation that a high degree of deceleration acts on the vehicle.

As one of the above-described reel shaft lock means, a frame lock type lock means is known in which a reel shaft and a frame, which supports the reel shaft, are formed with teeth, and when deceleration exceeding a predetermined value acts on the vehicle, the reel shaft is moved to engage the teeth thereof with the teeth of the frame, thereby locking the reel shaft from rotating, as disclosed, for example, in the specification and drawings of U.S. Pat. No. 4,796,918. In this frame lock type lock means, since teeth are formed on the frame, there is no need for a special member having such teeth, and it is therefore possible to form the lock means in a relatively lightweight structure. Accordingly, the above-described lock means makes it possible to comply well with the present demand for a reduction in weight of automobiles and other vehicles.

Incidentally, the conventional seat belt retractor, equipped with such a lock means, suffers from the following problems: When the teeth provided on the reel shaft engage with the teeth of the frame to lock the reel shaft from rotating, relatively large force is applied to each of the teeth of the reel shaft and the frame. Therefore, these teeth must be formed with an adequately large width in order to lessen the stress produced in the teeth. Measures which have heretofore been taken to lessen the stress produced in the teeth include one in which the thickness of the teeth of the reel shaft and the plate thickness of the frame are increased to thereby enlarge the width of area for meshing engagement between the teeth, and another in which the frame is provided with teeth, which are formed separately from the frame, thereby reinforcing the lock means. However, the former measure involves the problem that the weight increases, while the latter measure suffers from the problem that the number of parts required increases because of the need for a reinforcing material, and the number of working steps also increases because of the need for a step of attaching the reinforcing material, resulting in a rise in the cost.

Further, in the above-described frame lock type lock means, the teeth provided at both ends of the reel shaft must simultaneously mesh with the corresponding teeth provided at the left and right sides of the frame. In actual practice, however, it is difficult to allow these teeth to mesh with the corresponding teeth simultaneously. In many cases, meshing takes place only at one side of the frame. In particular, since the lock means is arranged such that the teeth on the reel shaft and the teeth on the frame are brought into engagement with each other by the movement of the reel shaft, it is extremely difficult to allow the teeth to simultaneously mesh with the corresponding teeth at both sides of the frame. If the teeth mesh with each other only at one side, the stress concentrates on the meshed teeth. Therefore, it is necessary to enhance the strength furthermore, and the retractor inevitably increases in the overall size and weight.

SUMMARY OF THE INVENTION

It is an object of the present invention to provide a seat belt retractor which is designed so that the reel shaft can be surely locked from rotating by reliable engagement with the frame, thereby enabling an improvement in the reliability.

It is another object of the present invention to provide a small-sized and lightweight seat belt retractor which is designed so that the mechanism is simplified and the assembly is facilitated, thereby enabling a lowering in the cost.

To attain these objects, the present invention provides a seat belt retractor for a vehicle including a reel shaft for winding up a webbing, a frame rotatably supporting both ends of the reel shaft, and lock means disposed in between the frame and the reel shaft and arranged to allow rotation of the reel shaft under normal circumstances and to be activated, when need arises, so as to prevent rotation of the reel shaft in at least a direction in which the webbing is unwound. The seat belt retractor further includes deceleration sensing means operating when deceleration exceeding a predetermined value acts on the vehicle, and means for activating the lock means in response to the operation of the deceleration sensing means. The lock means includes either a first engagement member or a first engagement portion, which is provided on the frame at a position which is closer to one end of the reel shaft, and the other of the first engagement member and first engagement portion, which is supported on the one end of the reel shaft so as to be engageable with the first-mentioned one of the first engagement member and first engagement portion. The lock means further includes either a second engagement member or a second engagement portion, which is provided on the frame at a position which is closer to the other end of the reel shaft, and the other of the second engagement member and second engagement portion, which is supported on the other end of the reel shaft so as to be engageable with the first-mentioned one of the second engagement member and second engagement portion. The lock activating means includes means for controlling locking such that after the first engagement member and the first engagement portion have been set in a state where they are engageable with each other, the second engagement member and the second engagement portion are set in a state where they are engageable with each other, and then engagement between the first engagement member and the first engagement portion and engagement between the second engagement member and the second engagement portion are effected.

The lock control means may effect control such that the engagement between the first engagement member and the first engagement portion and the engagement between the second engagement member and the second engagement portion are completed simultaneously.

The lock control means may effect control such that after the engagement between the first engagement member and the first engagement portion has been completed, the engagement between the second engagement member and the second engagement portion is completed.

The seat belt retractor may further include webbing pull-out sensing means operating when the webbing is pulled out at acceleration exceeding a predetermined value. In this case, the lock activating means is also activated in response to the operation of the webbing pull-out sensing means.

The seat beat retractor may be arranged such that the first and second engagement portions respectively comprise a predetermined number of first teeth and a predetermined number of second teeth, which are formed on respective inner peripheral surfaces of circular holes formed in the frame, and the first and second engagement members respectively comprise a first pawl and a second pawl, which are pivotably provided on the reel shaft and engageable with the first and second teeth, respectively, and that the lock control means decides which one of the second teeth is to be engaged with the second pawl after deciding which one of the first teeth is to be engaged with the first pawl.

The lock control means may include a first cam for guiding the first pawl, a second cam for guiding the second pawl, and means for interlocking the first and second pawls.

The first cam may be a radial cam hole, and the second cam may be formed in a substantially L shape from a radial hole and a circumferential hole.

The seat belt retractor may also be arranged such that the first and second engagement portions respectively comprise a predetermined number of first teeth and a predetermined number of second teeth, which are formed on respective outer peripheries of flanges formed on the reel shaft, and the first and second engagement members respectively comprise a first pawl and a second pawl, which are pivotably provided on the frame and engageable with the first and second teeth, respectively, and that the lock control means decides which one of the second teeth is to be engaged with the second pawl after deciding which one of the first teeth is to be engaged with the first pawl.

In the above-described arrangement, the lock control means may include a first cam for guiding the first pawl, a second cam for guiding the second pawl, and means for interlocking the first and second cams.

According to the seat belt retractor of the present invention, arranged as described above, when deceleration exceeding a predetermined value acts on the vehicle, the lock activating means is activated by the deceleration sensing means. As a result, either the first engagement member or the first engagement portion, which is provided on the frame at a position which is closer to one end of the reel shaft, engages with the other of the first engagement member and first engagement portion, which is supported on the one end of the reel shaft so as to be engageable with the first-mentioned one of the first engagement member and first engagement portion. In addition, either the second engagement member or the second engagement portion, which is provided on the frame at a position which is closer to the other end of the reel shaft, engages with the other of the second engagement member and second engagement portion, which is supported on the other end of the reel shaft so as to be engageable with the first-mentioned one of the second engagement member and second engagement portion. At this time, the lock control means operates such that after the first engagement member and the first engagement portion have been set in a state where they are engageable with each other, the second engagement member and the second engagement portion are set in a state where they are engageable with each other, and then engagement between the first engagement member and the first engagement portion and engagement between the second engagement member and the second engagement portion are effected.

Accordingly, both the engagement between the first engagement portion and the first engagement member and the engagement between the second engagement portion and the second engagement member are reliably made by the lock control means. Therefore, the rotation of the reel shaft in the webbing unwinding direction can be surely prevented at both sides of the reel shaft. Thus, the reliability of the seat belt retractor improves. In particular, since the reel shaft can be locked with respect to the frame without moving the reel shaft, the reliability improves furthermore.

In addition, since both the engagement between the first engagement portion and the first engagement member and the engagement between the second engagement portion and the second engagement member are surely made, there is no stress concentration, which would otherwise occur when the engagement is effected only at one side. Therefore, stress that is produced by the engagement is extremely small. Accordingly, it is unnecessary to increase the thickness of the frame to a substantial degree. In addition, the reel shaft can also be reduced in size. Thus, the retractor can be reduced in the overall size and weight.

In addition, since the engagement between the first engagement member and the first engagement portion is first completed, at least the first engagement member and the first engagement portion are reliably engaged with each other. Accordingly, there is no likelihood of a failure in engagement between the engagement member and the engagement portion. Thus, the reel shaft can be locked reliably.

Further, according to the present invention, the reel shaft can be locked simply by engaging the first and second engagement members with the first and second engagement portions without moving the reel shaft. Accordingly, the mechanism is simplified, and the number of parts required decreases. As a result, the number of assembling steps decreases, and the cost lowers.

Further, according to the present invention, when the webbing is pulled out at acceleration exceeding a predetermined value, the reel shaft is surely locked by the operation of the webbing pull-out sensing member.

In particular, according to the present invention, pawls are employed as the first and second engagement members, and teeth are used to constitute the first and second engagement portions. Thus, the engagement is made even more reliably, and the structure is simplified.

Further, according to the present invention, cams and cam holes are employed to form the lock control means. Thus, the structure is further simplified, and the operation is made even more reliable.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 8(a) and 8(b) show the reel shaft employed in the embodiment, in which FIG. 8(a) is a side view of the reel shaft as seen from the left-hand side thereof, and FIG. 8(n) is a side view of the reel shaft as seen from the right-hand side thereof.

FIGS. 9(a) and 9(b) show a lock gear employed in the embodiment, in which FIG. 9(a) is a side view of the lock gear as seen from the left-hand side thereof, and FIG. 9(b) is a sectional view taken along the line IXB—IXB in FIG. 9(a).

FIGS. 11(a) and 11(b) show a main pawl employed in the embodiment, in which FIG. 11(a) is a plan view of the main pawl, and FIG. 11(b) is a side view of the main pawl.

FIGS. 13(a) and 13(b) show an assembly of a joint pin and a backup pawl employed in the embodiment, in which FIG. 13(a) is a side view of the assembly as seen from the left-hand side thereof, FIG. 13(b) is a front view of the assembly, and FIG. 13(c) is a side view of the assembly as seen from the right-hand side thereof.

FIGS. 15(a) and 15(b) illustrate the operation of the main and backup pawls employed in the embodiment.

FIG. 22 is a front view of a reel shaft employed in the second embodiment.

FIGS. 26(a) and 26(b) show a spring casing employed in the second embodiment, in which FIG. 26(a) is a side view of the spring casing as seen from the right-hand side thereof, and FIG. 26(b) is a sectional view taken along the line XXVIB—XXVIB in FIG. 26(a).

FIGS. 27(a) and 27(b) show a cover employed in the second embodiment, in which FIG. 27(a) is a side view of the cover as seen from the left-hand side thereof, and FIG. 27(b) is a sectional view taken along the line XXVIIB—XXVIIB in FIG. 27(a).

FIG. 28 shows a spring pin employed in the second embodiment.

FIGS. 31(a) and 31(b) show a lock gear employed in the second embodiment, in which FIG. 31(a) is a side view of the lock gear as seen from the right-hand side thereof, FIG. 31(b) is a sectional view taken along the line XXXIB—XXXIB in FIG. 31(a), and FIG. 31(c) is a sectional view taken along the line XXXIC—XXXIC in FIG. 31(a).

FIG. 32 shows an inertia member employed in the second embodiment, in which

FIGS. 33(a) to 33(c) show a main pawl employed in the second embodiment, in which FIG. 33(a) is a side view of the main pawl as seen from the left-hand side thereof, FIG. 33(b) is a front view of the main pawl, and FIG. 33(c) is a side view of the main pawl as seen from the right-hand side thereof.

FIGS. 34(a) to 34(c) show a joint pin employed in the second embodiment, in which FIG. 34(a) is a front view of the joint pin, FIG. 34(b) is a sectional view taken along the line XXXIVB—XXXIVB in FIG. 34(a), and FIG. 34(c) is a side view of the joint pin as seen from the left-hand side thereof.

FIGS. 35(a) to 35(c) show a backup pawl employed in the second embodiment, in which FIG. 35(a) is a side view of the backup pawl as seen from the left-hand side thereof, FIG. 35(b) is a front view of the backup pawl, and FIG. 35(c) is a side view of the backup pawl as seen from the right-hand side thereof.

FIGS. 36(a) and 36(b) show a lock gear second cover employed in the second embodiment, in which FIG. 36(a) is a side view of the lock gear second cover as seen from the left-hand side thereof, and FIG. 36(b) is a view as seen from the direction of the arrow XXXVIB in FIG. 36(a).

FIGS. 38(a) and 38(b) show a casing, a lever and a pawl of the deceleration sensing means, in which FIG. 38(a) is a front view thereof, and FIG. 38(b) is a partly-cutaway side view of the deceleration sensing means as seen from the right-hand side thereof.

FIGS. 39(a) to 39(c) show an inertia member of the deceleration sensing means, in which FIG. 39(a) is a plan view of the inertia member, FIG. 39(b) is a partly-cutaway front view of the inertia member, and FIG. 39(c) is a bottom view of the inertia member.

FIGS. 40(a) to 40(c) show a webbing guide employed in the second embodiment, in which FIG. 40(a) is a plan view of the webbing guide, FIG. 40(b) is a side view of the webbing guide as seen from the left-hand side thereof, and FIG. 40(c) is a sectional view taken along the line XXXXC—XXXXC in FIG. 40(a).

FIG. 41A(I)(a) to FIG. 41A(I)(d) and FIG. 41A(II)(a) to FIG. 41A(II)(h) illustrate one part of the operation of the main and backup pawls in the second embodiment.

FIG. 41B(I)(e) to FIG. 41B(I)(h) and FIG. 41B(II)(h) illustrate the other part of the operation of the main and backup pawls in the second embodiment.

FIGS. 42(a) to 42(c) illustrate the operation of the main pawl and the lock gear which takes place when the main pawl performs a self-lock action, in which FIG. 42(a) shows the main pawl and the lock gear when the main pawl is in a standby position, and FIG. 42(b) shows them when the main pawl is in a lock position.

FIGS. 47(a) and 47(b) show a reel shaft employed in the third embodiment, in which FIG. 47(a) is a side view of the reel shaft as seen from the left-hand side thereof, and FIG. 47(b) is a side view of the reel shaft as seen from the right-hand side thereof.

FIGS. 48(a) and 48(b) show lock rings employed in the third embodiment, in which FIG. 48(a) shows the lock ring employed for the left-hand side, and FIG. 48(b) shows the lock ring employed for the right-hand side.

FIGS. 49(a) and 49(b) show pawls employed in the third embodiment, in which FIG. 49(a) shows the backup pawl, and FIG. 49(b) shows the main pawl.

FIG. 51 (I)(a) to FIG. 5 1(I)(d) and FIG. 51(II)(a) to FIG. 51(II)(d) illustrate the operation of the main and backup pawls employed in the third embodiment.

DESCRIPTION OF THE PREFERRED EMBODIMENTS

Figure 1:
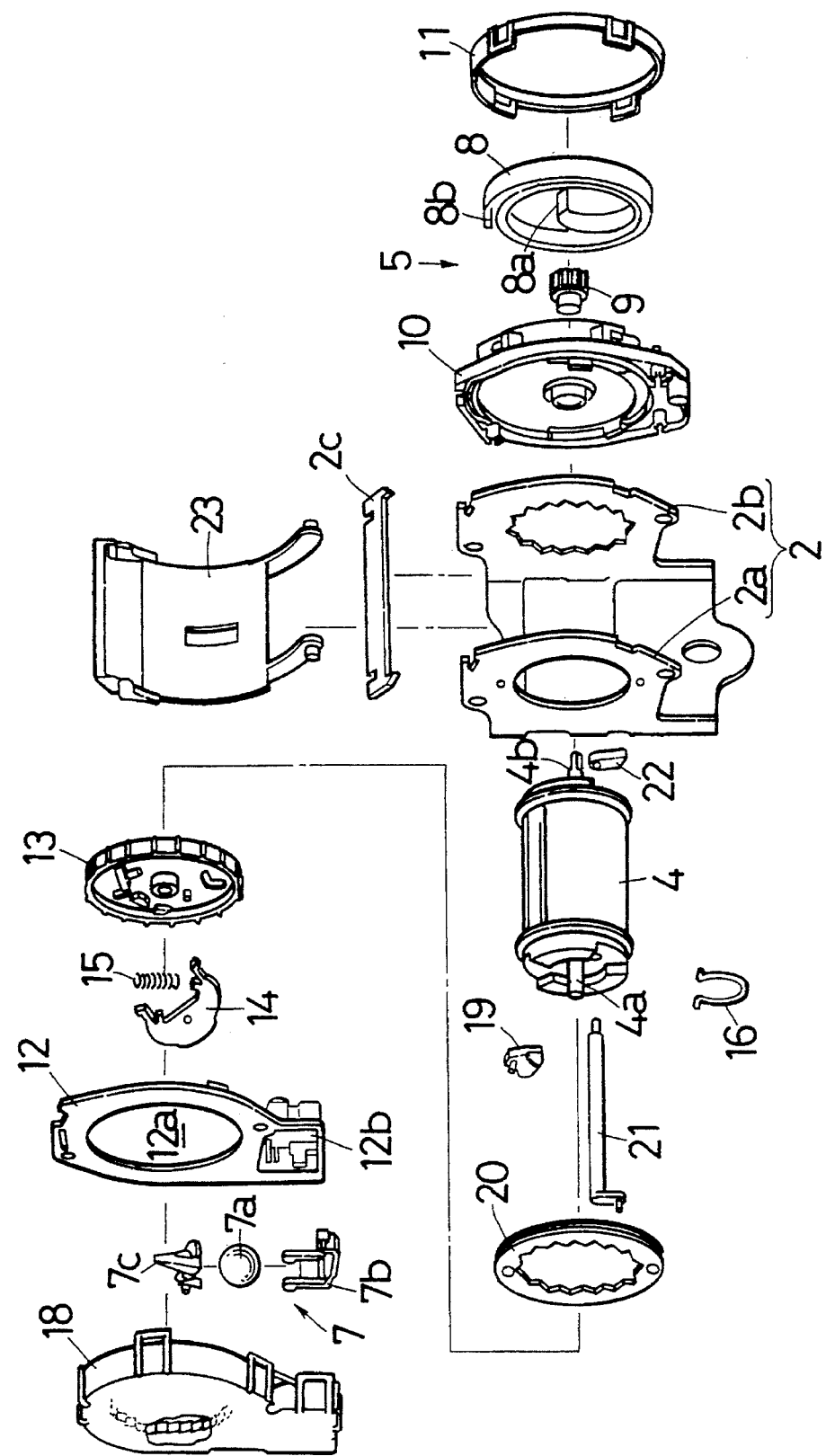
FIG. 1 is an exploded perspective view of one embodiment of the seat belt retractor according to the present invention.
Figure 2:
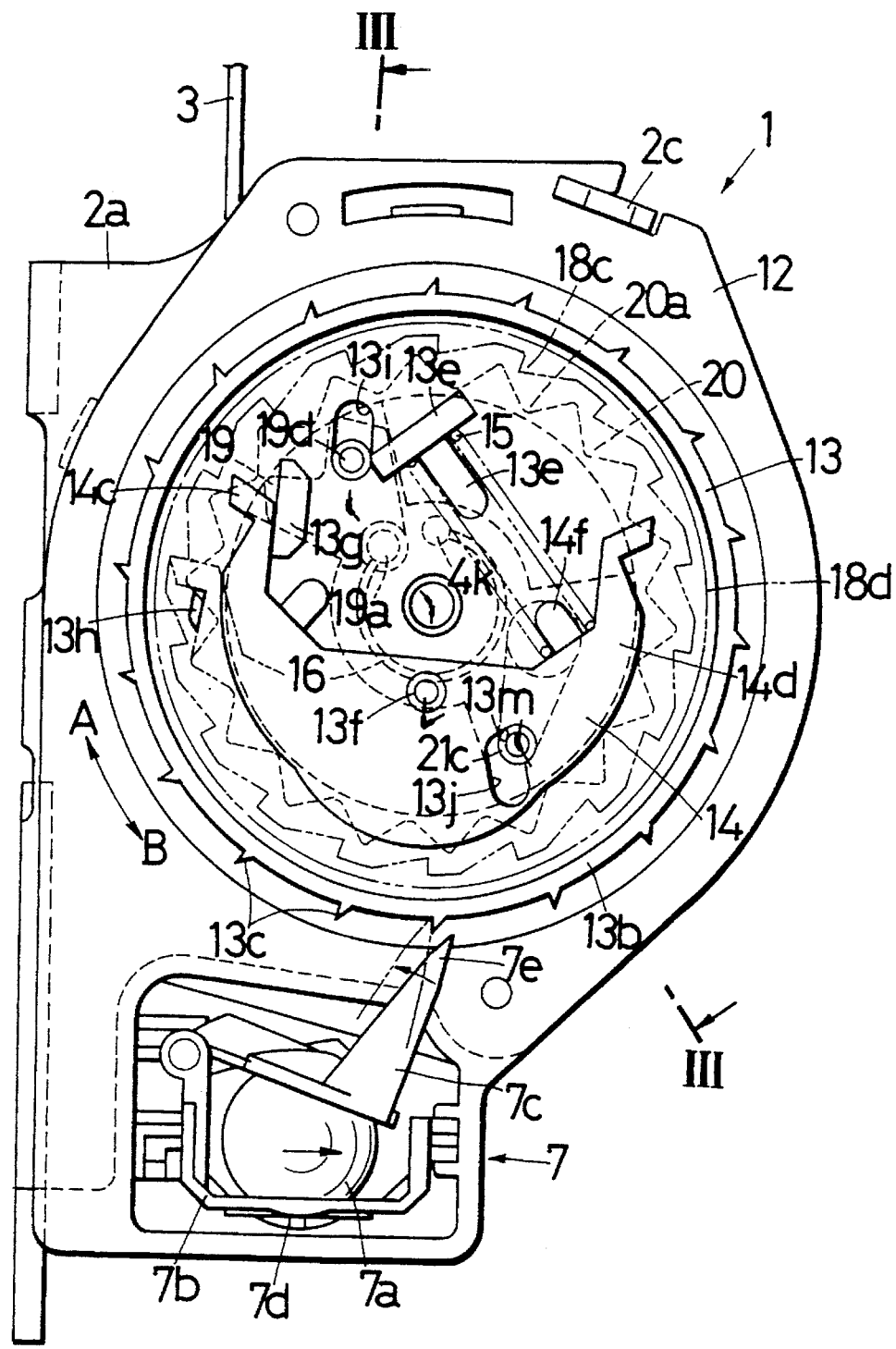
FIG. 2 is a side view of the seat belt retractor of the embodiment in an assembled state, as seen from the left-hand side thereof, with a cover removed therefrom.
Figure 3:
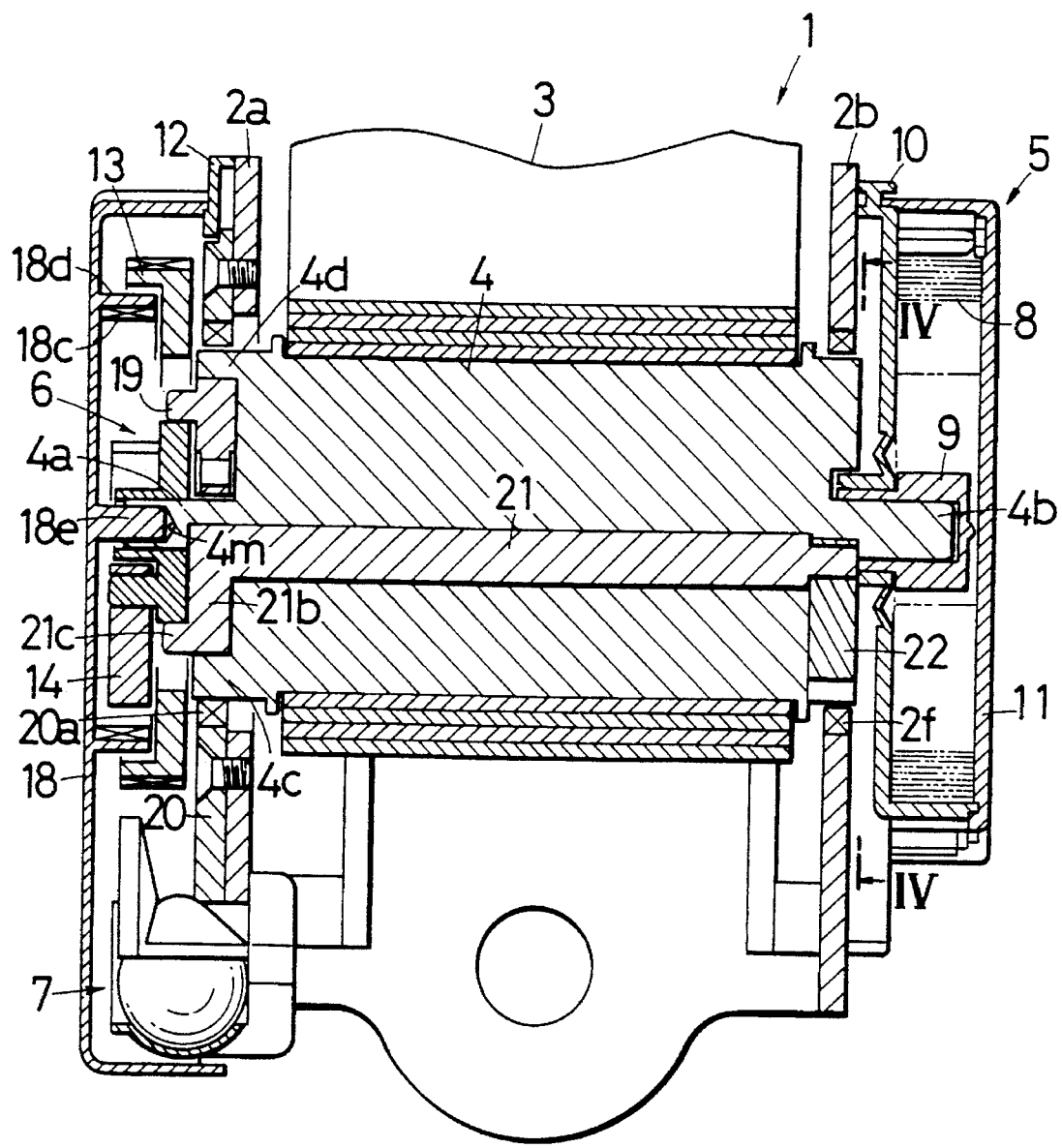
FIG. 3 is a sectional view taken along the line III—III in FIG. 2, showing the assembled state of the seat belt retractor of the embodiment.
Figure 4:
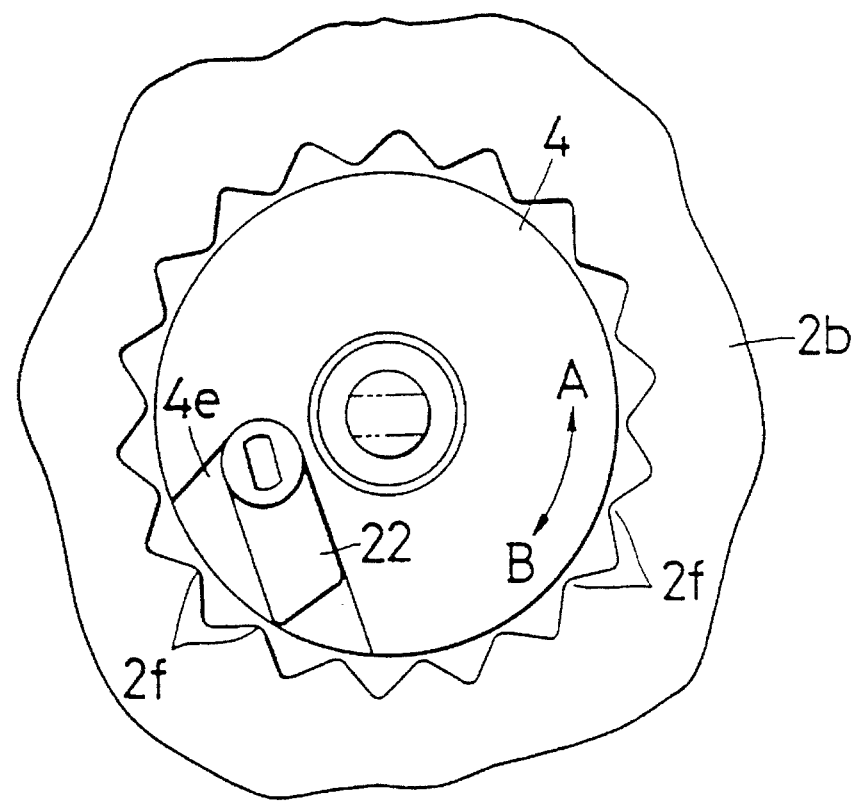
FIG. 4 is a fragmentary side view of the seat belt retractor of the embodiment, as seen from the left-hand side thereof, with a biasing force application means removed therefrom.

FIG. 1 is an exploded perspective view showing one embodiment of the seat belt retractor according to the present invention. FIGS. 2 to 4 show the seat belt retractor of the embodiment which is in an assembled state. FIG. 2 is a side view of the seat belt retractor as seen from the left-hand side thereof with a cover removed therefrom. FIG. 3 is a sectional view taken along the line III—III in FIG. 2. FIG. 4 is a fragmentary side view of the seat belt retractor as seen from the left-hand side thereof with a biasing force application means removed therefrom.

Figure 5:
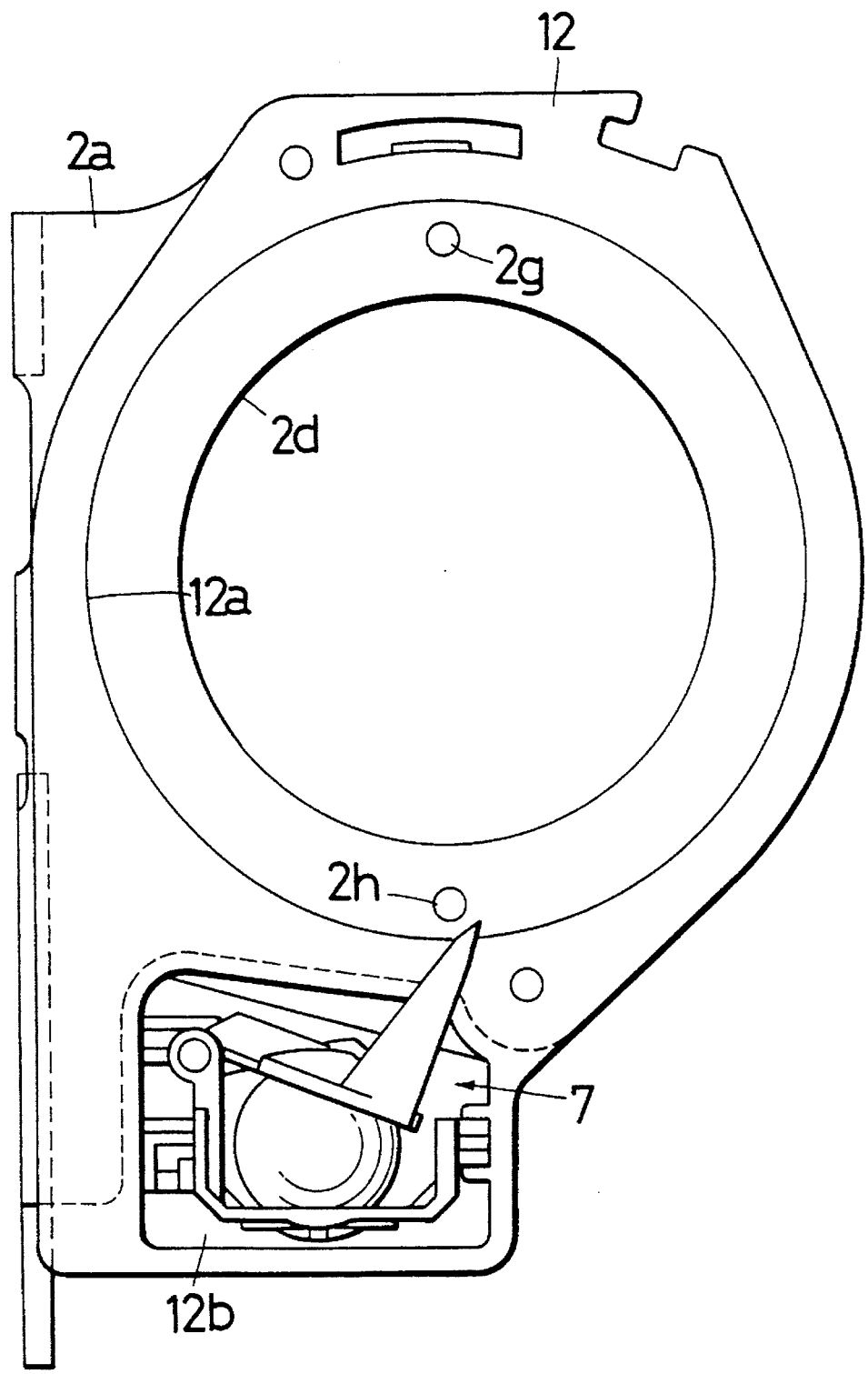
FIG. 5 is a side view of a frame employed in the embodiment, as seen from the left-hand side thereof, with a retainer attached thereto.
Figure 6:
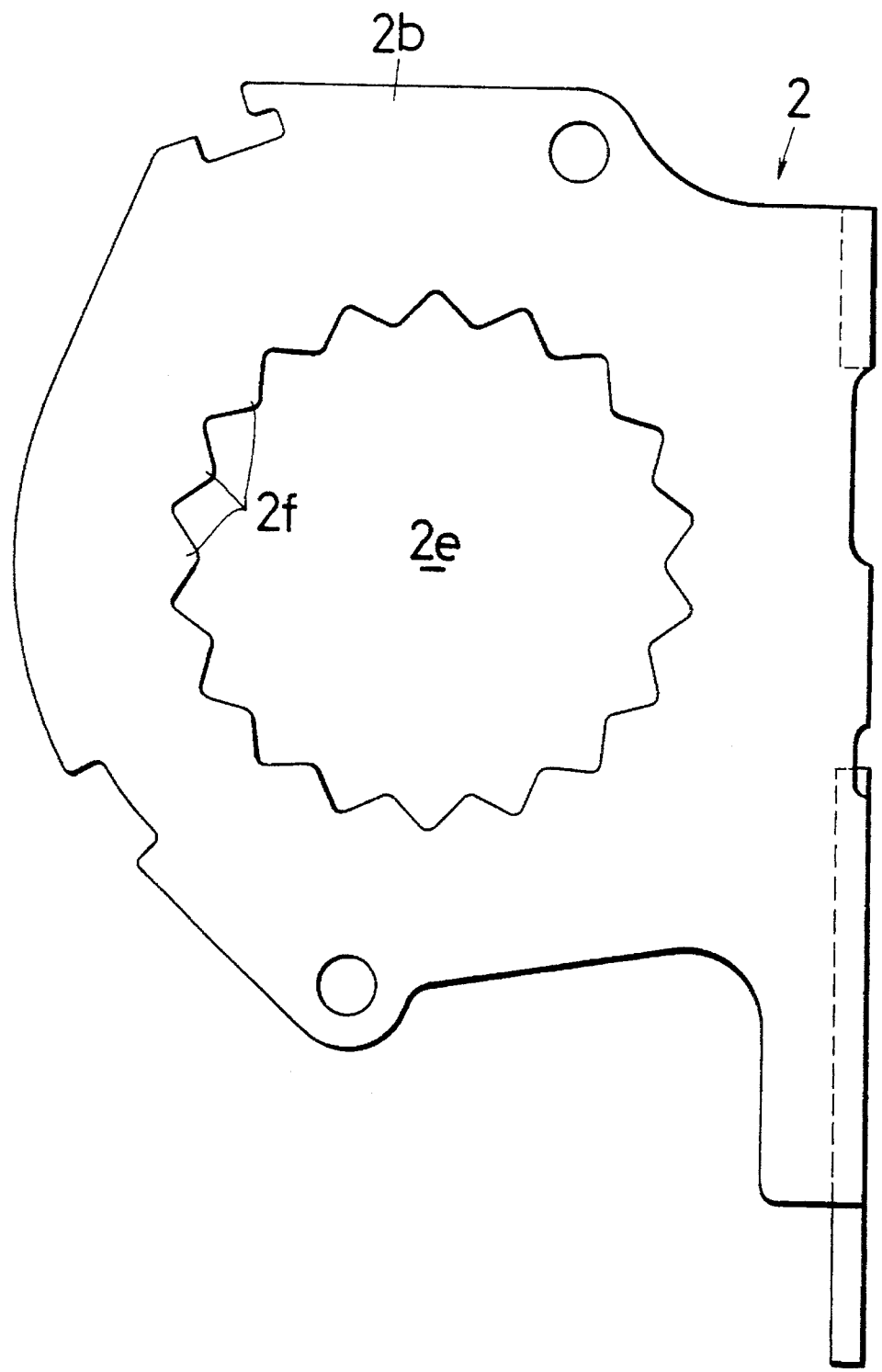
FIG. 6 is a side view of the frame employed in the embodiment, as seen from the right-hand side thereof.

As shown in FIGS. 1 to 4, the seat belt retractor 1 in this embodiment includes a U-shaped frame 2 having a pair of left- and right-hand side walls 2a and 2b, which are connected together through a connecting member 2c, thereby reinforcing the frame 2. The left-hand side wall 2a is formed with a circular hole 2d, as shown in FIG. 5. Similarly, the right-hand side wall 2b is formed with a circular hole 2e, as shown in FIG. 6. In addition, the inner peripheral surface of the hole 2e in the right-hand side wall 2b is formed with a predetermined number of sawtooth-shaped teeth 2f over the entire circumference thereof.

Figure 7:
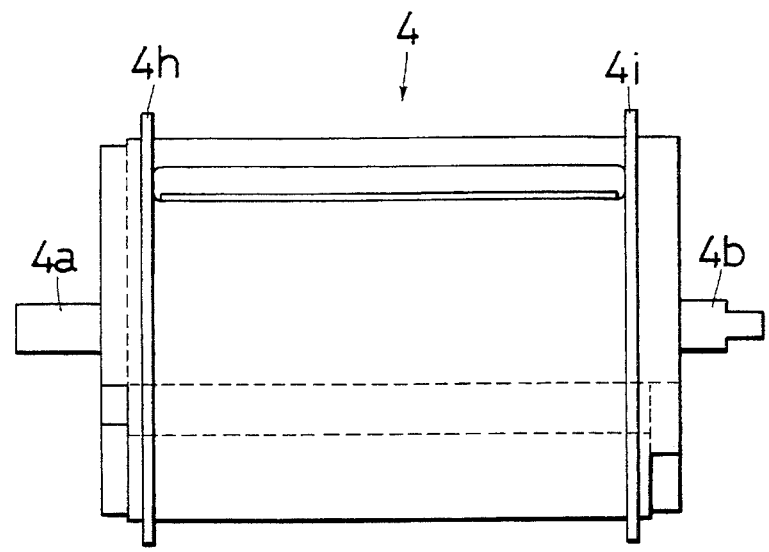
FIG. 7 is a front view of a reel shaft employed in the embodiment.

As shown in FIG. 3, a reel shaft 4 for winding up a webbing 3 is disposed between the left- and right-hand side walls 2a and 2b of the frame 2. Referring to FIG. 7, the reel shaft 4 has a first rotating shaft 4a and a second rotating shaft 4b which are provided in the respective centers of the left and right ends of the reel shaft 4. Further, a pair of fan-shaped axial projections 4c and 4d are provided on the left end face of the reel shaft 4, while an irregular fan-shaped recess 4e is formed on the right end face of the reel shaft 4. In addition, an axial hole 4g is provided in the reel shaft 4 so as to open at one end thereof in the recess 4e and at the other end thereof in one recess 4f that is defined between the pair of axial projections 4c and 4d. The reel shaft 4 further has a pair of flanges 4h and 4i provided at the left and right ends thereof for guiding the webbing 3 when wound up.

The right-hand side wall 2b has a biasing force application means 5 attached thereto for giving the reel shaft 4 force for winding up the webbing 3. Further, a seat belt lock activating means 6 is attached to the left-hand side wall 2a. In addition, the left-hand side wall 2a is provided with a deceleration sensing means 7. When a predetermined degree of deceleration acts on the vehicle, the deceleration sensing means 7 senses the deceleration and activates the seat belt lock activating means 6.

The biasing force application means 5 comprises a spiral spring 8, a bush 9 to which the inner end 8a of the spiral spring 8 is connected to apply spring force thereto, a spring casing 10 to which the outer end 8b of the spiral spring 8 is secured and which accommodates the spiral spring 8, and a cover 11 which is attached to the spring casing 10 to cover the spiral spring 8.

The bush 9 is fitted to the second rotating shaft 4b so as to be unable to rotate relative to it. Accordingly, the reel shaft 4 is constantly biased by the spring force from the spiral spring 8 so as to rotate in a direction B for winding up the webbing 3.

Figure 8A:
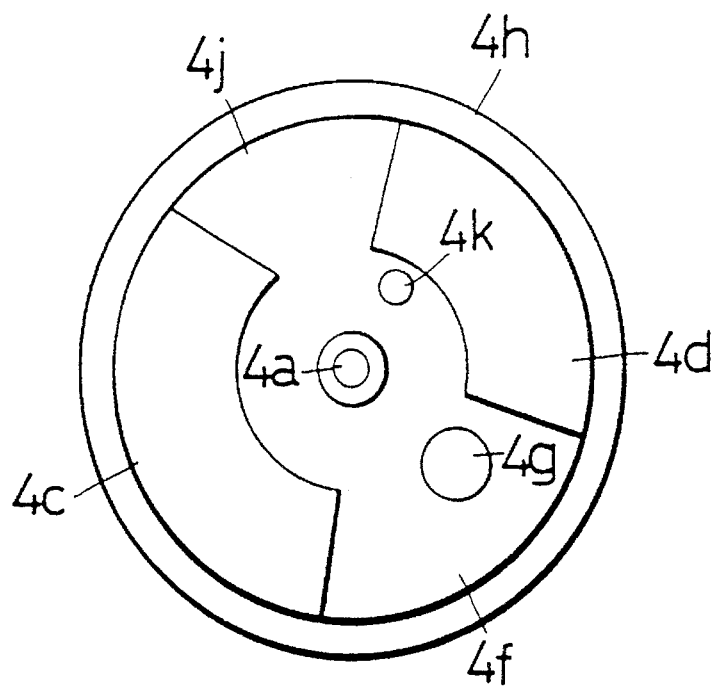
Figure 8B:
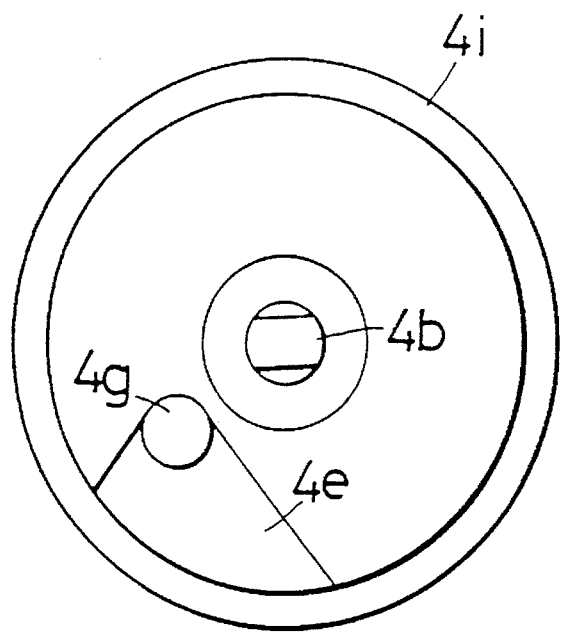

In the meantime, the seat belt lock activating means 6 comprises: a retainer 12 which is secured to the left-hand side wall 2a ; a lock gear 13; an inertia member 14 which is rockably attached to the lock gear 13; a control spring 15 which is disposed between the lock gear 13 and the inertia member 14; a main pawl 19 which is disposed in the other recess 4j (shown in FIG. 8) that is defined between the pair of axial projections 4c and 4d ; an Ω-shaped return spring 16 which is disposed between the reel shaft 4 and the main pawl 19; an internal gear 20 which is secured to the retainer 12 and which has a predetermined number of sawtooth-shaped teeth 20a formed on its inner peripheral surface over the entire circumference thereof; a joint pin 21 which extends through the axial hole 4g of the reel shaft 4; a backup pawl 22 which is connected to one end of the joint pin 21; and a cover 18 which covers the lock gear 13. It should be noted that reference numeral 23 in FIG. 1 denotes a webbing guide.

As shown in FIGS. 1 and 5, the retainer 12 is formed in the shape of a flat plate and has a relatively large hole 12a. The retainer 12 further has a portion 12b for mounting the deceleration sensing means 7 in the lower part thereof.

Figure 9B:
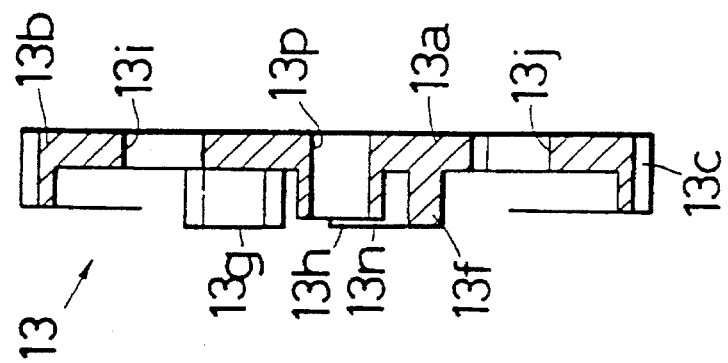
Figure 9A:
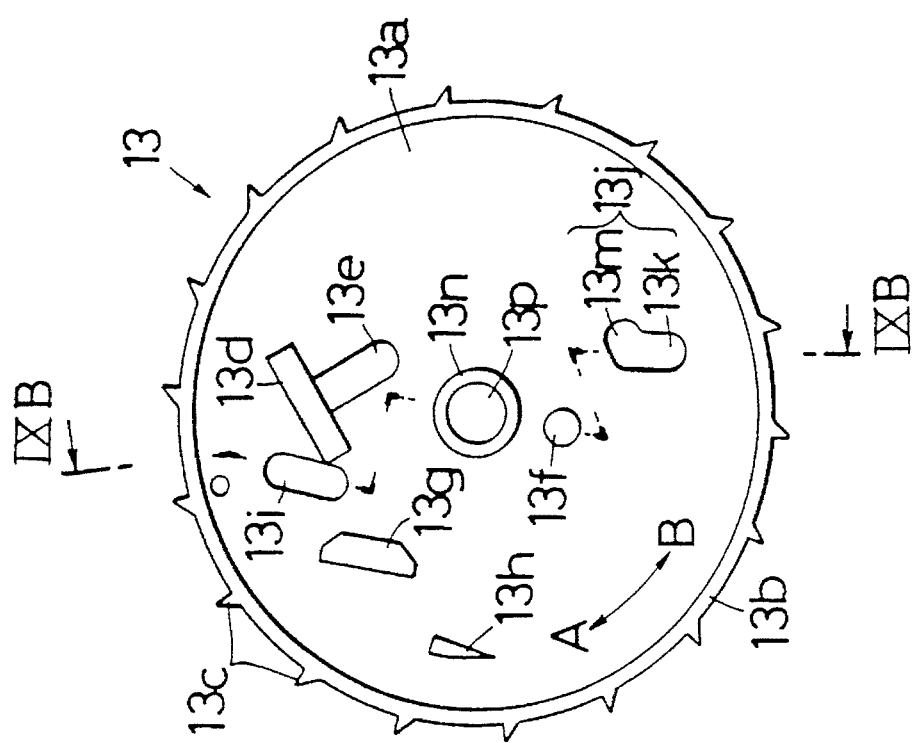

As shown in FIG. 9(a) and 9(b), the lock gear 13 comprises a circular flat plate 13a and an annular flange 13b formed around the outer peripheral edge of the flat plate 13a. The outer peripheral surface of the flange 13b is formed with a predetermined number of teeth 13c. The teeth 13c each have a triangular cross-sectional configuration in which the surface of each tooth 13c which faces the webbing unwinding direction A is a relatively gentle slope, whereas the surface thereof which faces the webbing winding direction B is a substantially vertical surface.

As shown in FIG. 9(a), the flat plate 13a has a spring retaining member 13d provided on the left-hand side surface as viewed in FIG. 9(b). The spring retaining member 13d is provided with a spring guide portion 13e extending parallel to the flat plate 13a. The flat plate 13a is further provided with a shaft 13f and a pair of first and second stoppers 13g and 13h. Further, the flat plate 13a is provided with an elliptical first cam hole 13i and an L-shaped second cam hole 13j. The first cam hole 13i extends radially outward with an inclination toward the webbing unwinding direction A. The second cam hole 13j comprises a radial hole 13k which extends radially outward with an inclination toward the webbing unwinding direction A, and a circumferential hole 13m which extends circumferentially from the inner end of the radial hole 13k.

In addition, a rotating shaft 13n is provided in the center of the flat plate 13a, and an axial through-hole 13p extends through the rotating shaft 13n.

Figure 10:
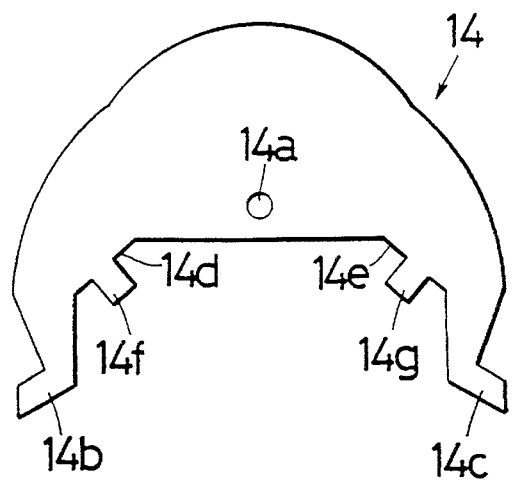
FIG. 10 shows an inertia member employed in the embodiment.

As shown in FIG. 10, the inertia member 14 is formed in a substantially Ω-shape from a flat plate. The inertia member 14 has a hole 14a provided in the center thereof. Further, pawls 14b and 14c are formed at both ends, respectively, of the inertia member 14. Between the pawls 14b and 14c are provided a pair of spring retaining portions 14d and 14e and a pair of spring guide portions 14f and 14g. As shown in FIG. 2, the inertia member 14 is rockably supported on the lock gear 13 by fitting the hole 14a with the shaft 13f of the lock gear 13. In addition, the control spring 15 is fitted to the guide portions 13e and 14f so as to be compressedly loaded between the spring retaining member 13d and the spring retaining portion 14d. The inertia member 14 is constantly biased in the direction A relative to the lock gear 13 by the spring force from the control spring 15 so that it abuts on the first stopper 13g under normal circumstances, as shown by the solid line. When the inertia member 14 rotates in the direction B relative to the lock gear 13 against the spring force from the control spring 15, the inertia member 14 abuts on the second stopper 13h, as shown by the two-dot chain line.

Figures 11A, 11B:
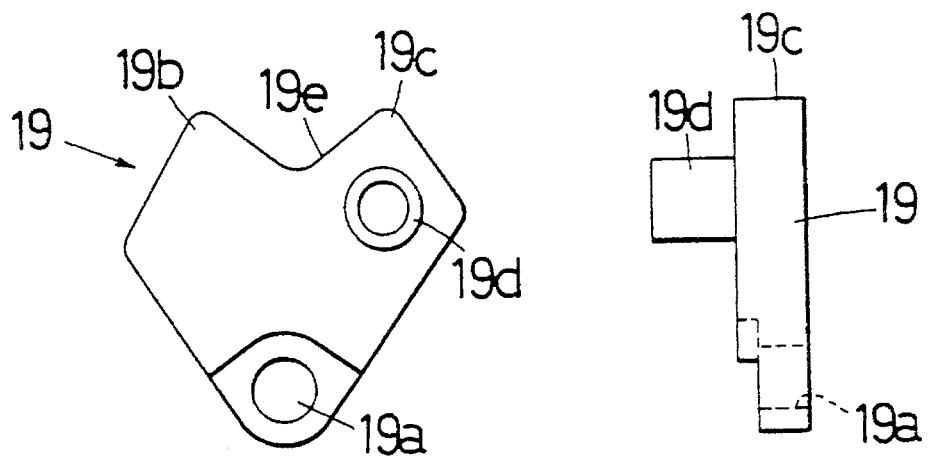

As shown in FIGS. 11(a) and 11(b), the main pawl 19 is formed in a substantially fan-like shape and has a through-hole 19a provided in a portion thereof which acts as a pivot. The main pawl 19 has a pair of pawl portions 19b and 19c formed on the outer peripheral surface at an end thereof which is remote from the pivot. Further, an axially projecting shaft 19d is provided in the vicinity of one pawl portion 19c. Between the pair of pawl portions 19b and 19c is formed a V-shaped recess 10e which is engageable with one of the sawtooth-shaped teeth 20a of the internal gear 20.

The Ω-shaped return spring 16 is retained at one end thereof by the hole 4k of the reel shaft 4 and at the other end thereof by the hole 19a of the main pawl 19. The Ω-shaped return spring 16 constantly biases the main pawl 19 in the webbing unwinding direction A relative to the reel shaft 4.

Figure 12:
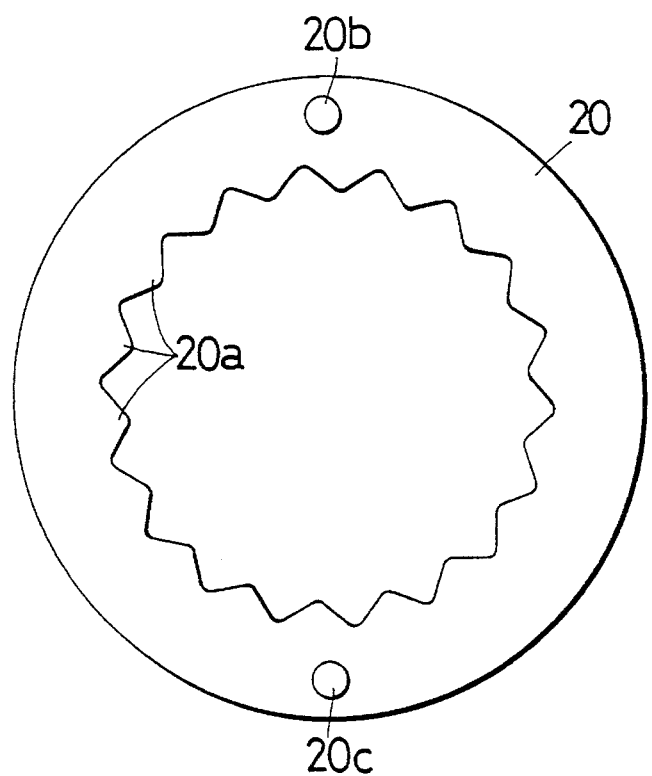
FIG. 12 is a plan view of an internal gear employed in the embodiment.

As shown in FIG. 12, the internal gear 20 is formed from a ring-shaped flat plate, and has a predetermined number of sawtooth-shaped teeth 20a formed on its inner peripheral surface over the entire circumference thereof, as described above. These teeth 20a are identical in terms of configuration and number to the teeth 2f formed on the right-hand side wall 2b of the frame 2. The internal gear 20 is disposed in the hole 12a of the retainer 12 and secured to the left-hand side wall 2a of the frame 2 by threading fasteners, e.g., screws, into a pair of upper and lower holes 2g and 2h, formed in the left-hand side wall 2a of the frame 2, through a pair of mounting holes 20b and 20c.

The internal gear 20 is secured to the left-hand side wall 2a so that one tooth 20a of the internal gear 20 circumferentially coincides with one tooth 2f of the right-hand side wall 2b.

Figures 13A, 13B, 13C:
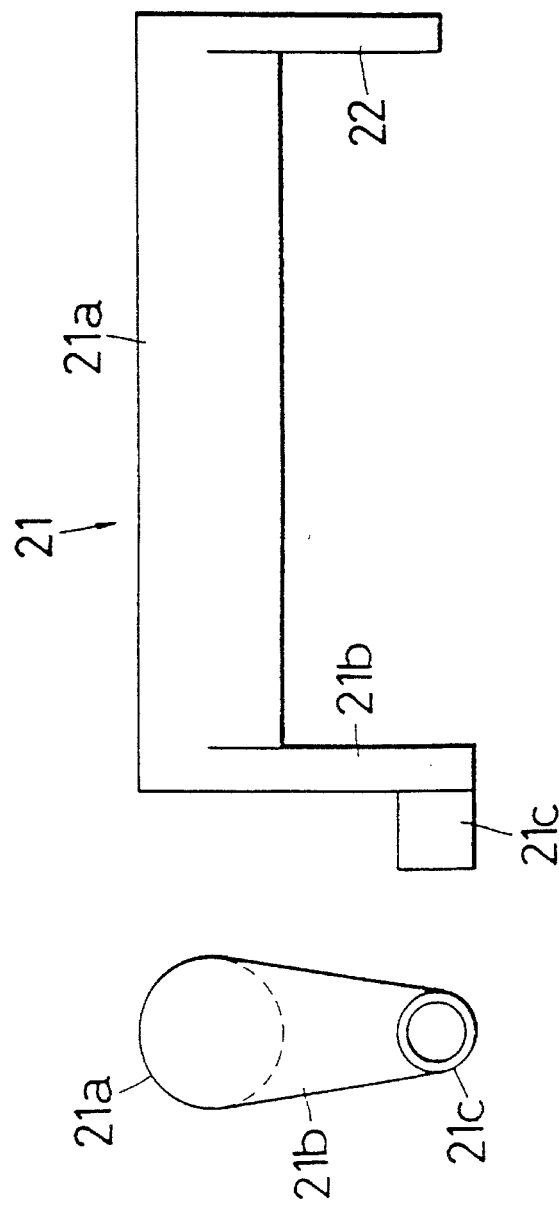

As shown in FIGS. 13(a) 13(b) and 13(c) the joint pin 21 comprises a shaft portion 21a, an arm portion 21b integrally formed at the left end of the shaft portion 21a, and an axially projecting shaft 21c that is provided at the distal end of the arm portion 21b. In addition, the backup pawl 22 is secured to the right end of the shaft portion 21a so that as the arm portion 21b rotates, the backup pawl 22 rotates in the same direction in association with the rotation of the arm portion 21b. As shown in FIG. 4, the backup pawl 22 is engageable with a sawtooth-shaped tooth 2f, which is formed on the right-hand side wail 2b of the frame 2, in the webbing unwinding direction A.

When the lock gear 13 is attached in position by piercing the through-hole 13p in the rotating shaft 13n of the lock gear 13 with the first rotating shaft 4a of the reel shaft 4, the projecting shaft 19d of the main pawl 19 extends through the first cam hole 13i of the lock gear 13, and at the same time, the projecting shaft 21c of the joint pin 21 extends through the second cam hole 13j. In this case, since the main pawl 19 is biased in the webbing unwinding direction A relative to the reel shaft 4 by the Ωshaped return spring 16, the lock gear 13 is also biased in the same direction A relative to the reel shaft 4 through the projecting shaft 19d.

In the normal state where the lock gear 13 is biased, the projecting shaft 19d is set in a position where it abuts on the inner end of the first cam hole 13i, and the projecting shaft 21c is set in a position where it abuts on the end of the circumferential hole 13m of the second cam hole 13j. In this state, the main pawl 19 assumes a position where the first and second pawl portions 19b and 19c of the main pawl 19 do not engage with teeth 20a of the internal gear 20, and the backup pawl 22 assumes a position where it does not engage with a tooth 2f of the right-hand side wall 2b of the frame 2.

Figure 14:
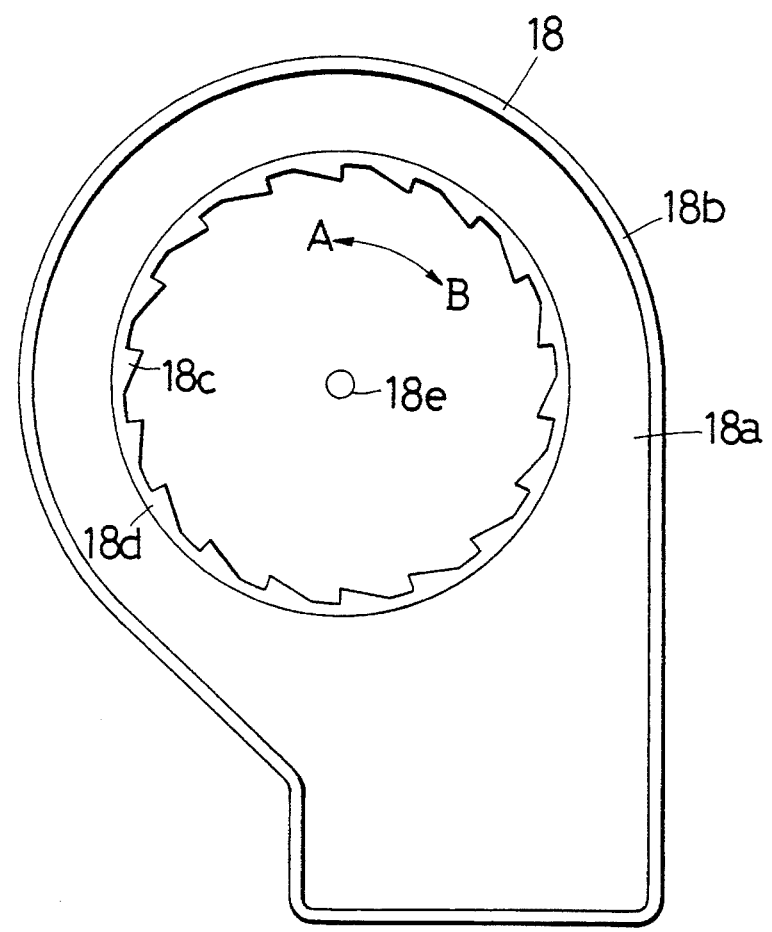
FIG. 14 is a plan view of a cover employed in the embodiment.

As shown in FIG. 3, the cover 18 is removably attached to the retainer 12 so as to cover the lock gear 13, the inertia member 14 and the deceleration sensing means 7. As shown in FIG. 14, the cover 18 comprises a flat plate portion 18a having a predetermined configuration, and a flange portion 18b that is provided over the entire peripheral edge of the flat plate portion 18a. The flat plate portion 18a is provided with an annular tooth member 18d having a predetermined number of teeth 18c formed on the inner peripheral surface thereof. The teeth 18c each have a triangular cross-sectional configuration in which the surface of each tooth 18c which faces the webbing unwinding direction A is a substantially vertical surface, whereas the surface thereof which faces the webbing winding direction B is a relatively gentle surface.

As shown in FIGS. 2 and 3, when the cover 18 is attached in position, the annular tooth member 18d lies inside the flange 13b of the lock gear 13 and in between the flange 13b and the inertia member 14. Since in the normal state the inertia member 14 is held by the spring force from the control spring 15 in a position where it abuts on the first stopper 13g, as described above, the pawl 14c is held in a non-engaging position, which is apart from the teeth 18c. When the inertia member 14 pivots relative to the lock gear 13 against the spring force from the control spring 15 and abuts on the second stopper 13h, the inertia member 14 moves to an engageable position where the pawl 14c is engageable with a tooth 18c.

If the lock gear 13 rotates in the webbing unwinding direction A when the pawl 14c is in the engageable position, the pawl 14c engages with a tooth 18c, so that the lock gear 13 is prevented from further rotating in the webbing unwinding direction A. If the lock gear 13 rotates in the webbing winding direction B when the pawl 14c is in the engageable position, the pawl 14c passes over the teeth 18c while moving along the gentle slopes of the teeth 18c against the control spring 15. Accordingly, the lock gear 13 is rotatable in the webbing winding direction B.

The annular tooth member 18d has a projection 18e provided in the center thereof. As shown in FIG. 3, when the cover 18 is attached in position, the projection 18e is fitted into the hole 4m of the reel shaft 4, thereby allowing the annular tooth member 18d of the cover 18 to be accurately positioned with respect to the lock gear 13.

Next, the operations of the main pawl 19 and the backup pawl 22 will be explained in detail with reference to FIG. 15. It should be noted that FIG. 15 is a schematic view in which the teeth 2f, the teeth 20a, the main pawl 19 and the backup pawl 22 are illustrated on the same plane.

Referring to FIG. 15(a), since the main pawl 19 is constantly biased in the direction A by the spring force from the Ω-shaped return spring 16, both the lock gear 13 and the arm portion 21b of the joint pin 21 are biased in the direction A. Accordingly, the lock gear 13 rotates in the direction A relative to the reel shaft 4. Thus, the lock gear 13 rotates in the direction A relative to the reel shaft 4 to a position where the projecting shaft 19d abuts on the inner end of the first cam hole 13i, and the lock gear 13 stops and is held in this position.

In the meantime, the shaft 21c projecting from the arm portion 21b of the joint pin 21 abuts on the end of the circumferential hole 13m of the second cam hole 13j. In this state, both the main pawl 19 and the backup pawl 22 are in the respective non-engaging positions where these pawls do not engage with teeth 20a and 2f.

When the lock gear 13 rotates in the direction B relative to the reel shaft 4, the projecting shaft 19d moves by being guided along the first cam holes 13i, as shown in FIG. 15(b). The movement of the projecting shaft 19d causes the main pawl 19 to pivot in the direction B, that is, toward the teeth 20a. Thus, teeth 20a which are to be engaged with the first and second pawl portions 19b and 19c, respectively, decided. In the meantime, the shaft 21c projecting from the arm portion 21b of the joint pin 21 moves as far as the other end of the hole 13m by being guided along the circumferential hole 13m. At this time, since the projecting shaft 21c merely moves along the circumferential hole 13m, the arm portion 21b does not rotate substantially. Accordingly, the backup pawl 22 does not rotate, either. Therefore, the backup pawl 22 maintains its posture in the normal state.

When the lock gear 13 further rotates in the direction B relative to the reel shaft 4, the projecting shaft 19d further moves by being guided along the first cam hole 13i, as shown in FIG. 15(c), causing the main pawl 19 to pivot further toward the teeth 20a. Thus, the first and second pawl portions 19b and 19c begin to engage with the teeth 20a. In the meantime, the projecting shaft 21c of the arm portion 21b moves by being guided along the radial hole 13k, causing the backup pawl 22 to pivot in the direction B, that is, toward the teeth 2f. Thus, a tooth 2f which is to be engaged with the backup pawl 22 is decided.

When the lock gear 13 further rotates in the direction B relative to the reel shaft 4, the projecting shaft 19d further moves by being guided along the first cam hole 13i, as shown in FIG. 15(d), causing the main pawl 19 to pivot further toward the teeth 20a. Thus, the engagement between the first and second pawl portions 19b and 19c and the teeth 20a progresses. In addition, the projecting shaft 21c of the arm portion 21b further moves by being guided along the radial hole 13k, and engagement between the backup pawl 22 and the tooth 2f begins.

When the lock gear 13 further rotates in the direction B relative to the reel shaft 4, the projecting shaft 19d further moves by being guided along the first cam hole 13i, as shown in FIG. 15(e), causing the main pawl 19 to pivot further toward the teeth 20a. Thus, the first and second pawl portions 19b and 19c become completely engaged with the teeth 20a. In addition, the projecting shaft 21c of the arm portion 21b further moves by being guided along the radial hole 13k. Thus, the backup pawl 22 and the tooth 2f completely engage with each other at the same time as the first and second pawl portions 19b and 19c mesh with the teeth 20a.

Thus, the main pawl 19, the backup pawl 22, and the teeth 20a and 2f constitute a seat belt lock means.

Incidentally, in the seat belt retractor 1 of this embodiment, teeth 20a which are to be engaged with the first and second pawl portions 19b and 19c of the main pawl 19 are first decided, and then a tooth 2f which is to be engaged with the backup pawl 22 is decided. Therefore, at least either the engagement between the main pawl 19 and the teeth 20a or the engagement between the backup pawl 22 and the tooth 2f is surely made without an engagement failure.

The deceleration sensing means 7 comprises, as shown in FIG. 1, an inertia ball 7a, a support 7b for supporting the inertia ball 7a, and an actuator 7c that is attached to the support 7b so as to be rockable through the movement of the inertia ball 7a. As shown in FIG. 2, the support 7b is provided with a recess 7d for placing the inertia ball 7a. The inertia ball 7a is supported by the recess 7d so that the ball 7a does not move substantially under normal circumstances. When deceleration exceeding a predetermined value acts on the vehicle, the inertia ball 7a comes out of the recess 7d and moves forwardly, as shown by the arrow.

In addition, a pawl 7e is formed at the distal end of the actuator 7c. Under normal circumstances, the actuator 7c is in a non-engaging position where the pawl 7e is separate from the teeth 13c of the lock gear 13, as shown by the solid line in the figure. When the inertia ball 7a moves rightwardly as viewed in the figure, the actuator 7c pivots upwardly, as shown by the arrow, to assume an engageable position where the pawl 7e is engageable with a tooth 13c.

Next, the operation of the seat belt retractor in this embodiment, arranged as described above, will be explained.

[Normal state where no deceleration exceeding a predetermined value acts on the vehicle]

In this state, the inertia ball 7a of the deceleration sensing means 7 does not move. Therefore, the actuator 7c is held in the solid-line position, as shown in FIG. 2, and the pawl 7e is placed in the non-engaging position, which is apart from the teeth 13c of the lock gear 13. Similarly, the pawl 14c of the inertia member 14, the main pawl 19 and the backup pawl 22 are held in the respective non-engaging positions, as shown in FIGS. 2, 3 and 4.

Accordingly, in this state the seat belt retractor 1 mainly performs an operation based on the action of the biasing force application means 5. That is, the reel shaft 4 is biased in the webbing winding direction B by the spring force of the spiral spring 8 so as to wind up the webbing 3.

(When the seat belt is not fastened to the occupant's body)

In this state, a tongue (not shown), which is attached to the webbing 3, is separate from a buckle member (not shown). Accordingly, the webbing 3 has been wound up by the spring force of the spiral spring 8, as described above.

(When the webbing is unwound)

When the occupant unwinds the webbing 3 in order to fasten it to his/her body, the reel shaft 4 and the bush 9 rotate in the webbing unwinding direction A in response to the unwinding of the webbing 3. Consequently, the spiral spring 8 is gradually wound up.

(When the occupant takes his/her hand off the webbing after connecting together the tongue and the buckle member)

At the time when the occupant connects together the tongue and the buckle member, the webbing 3 has been unwound in excess of the length of the webbing 3 unwound when the occupant has it fastened to his/her body in a normal state. Therefore, when the occupant takes his/her hand off the webbing 3 after connecting together the tongue and the buckle member, the webbing 3 is wound up by the spring force of the spiral spring 8 until it fits to the occupant's body. The spring force of the spiral spring 8 is properly determined in advance so that the webbing 3 will not give a sensation of pressure to the occupant. During the running of the vehicle, the seat belt retractor 1 maintains this state unless deceleration exceeding a predetermined value acts on the vehicle.

[When deceleration exceeding a predetermined value acts on the vehicle]

When deceleration exceeding a predetermined value acts on the vehicle during the running due to a sudden braking operation or other emergency operation, both the seat belt lock activating means 6 and the deceleration sensing means 7 operate. As a first stage of the operation, the inertia ball 7a of the deceleration sensing means 7 moves forwardly (in the direction of the arrow shown in FIG. 2) by the deceleration, so that the actuator 7c pivots upwardly to reach the position shown by the two-dot chain line in FIG. 2. Consequently, the pawl 7e assumes the engageable position. In the meantime, the occupant's body is urged to move forwardly by the deceleration acting on the vehicle to a degree higher than a predetermined value, thus causing the webbing 3 to be unwound. The unwinding of the webbing 3 causes both the reel shaft 4 and the lock gear 13 to rotate in the unwinding direction A.

However, since a tooth 13c of the lock gear 13 engages with the pawl 7e immediately, the lock gear 13 is immediately stopped from rotating in the unwinding direction A. As a result, the reel shaft 4 alone continuously rotates in the unwinding direction A. Thus, relative rotation occurs between the lock gear 13 and the reel shaft 4. In other words, the lock gear 13 rotates in the direction B relative to the reel shaft 4.

The relative rotation of the lock gear 13 causes the main pawl 19 and the backup pawl 22 to pivot and engage with respective teeth 20a and 2f, as a second stage of the operation, as shown in FIGS. 15(b) to 15(e). Thus, the reel shaft 4 is locked from rotating in the webbing unwinding direction A. As a result, unwinding of the webbing 3, which would otherwise be caused by the inertial forward movement of the occupant's body, is surely prevented. Thus, the occupant's body is reliably restrained and protected.

[When unwinding force suddenly acts on the webbing]

When such a situation occurs, the webbing 3 is suddenly unwound, so that the reel shaft 4, the lock gear 13 and the inertia member 14 are suddenly urged to rotate in the webbing unwinding direction A. However, since the spring force of the control spring 15 is not so strong, the control spring 15 contracts, so that the inertia member 14 has an inertia delay. That is, the inertia member 14 not only revolves in the webbing unwinding direction A together with the lock gear 13 but also rotates in the direction B relative to the lock gear 13. Thus, the inertia member 14 constitutes the webbing pull-out sensing means of the present invention.

The rotation of the inertia member 14 causes the pawl 14c to move to the engageable position, where it abuts on the second stopper 13h, and to engage with a tooth 18c, as shown by the two-dot chain line in FIG. 2. Consequently, the revolution of the inertia member 14 and the rotation of the lock gear 13 in the webbing unwinding direction A are stopped. Accordingly, the reel shaft 4 alone rotates in the webbing unwinding direction A. Thus, the lock gear 13 rotates in the direction B relative to the reel shaft 4, as described above.

The relative rotation of the lock gear 13 causes the main pawl 19 and the backup pawl 22 to pivot and engage with respective teeth 20a and 2f in the same way as the above. Thus, the reel shaft 4 is locked from rotating in the webbing unwinding direction A. As a result, unwinding of the webbing 3, which would otherwise be caused by the inertial forward movement of the occupant's body, is surely prevented. Thus, the occupant's body is reliably restrained and protected.

Figure 16:
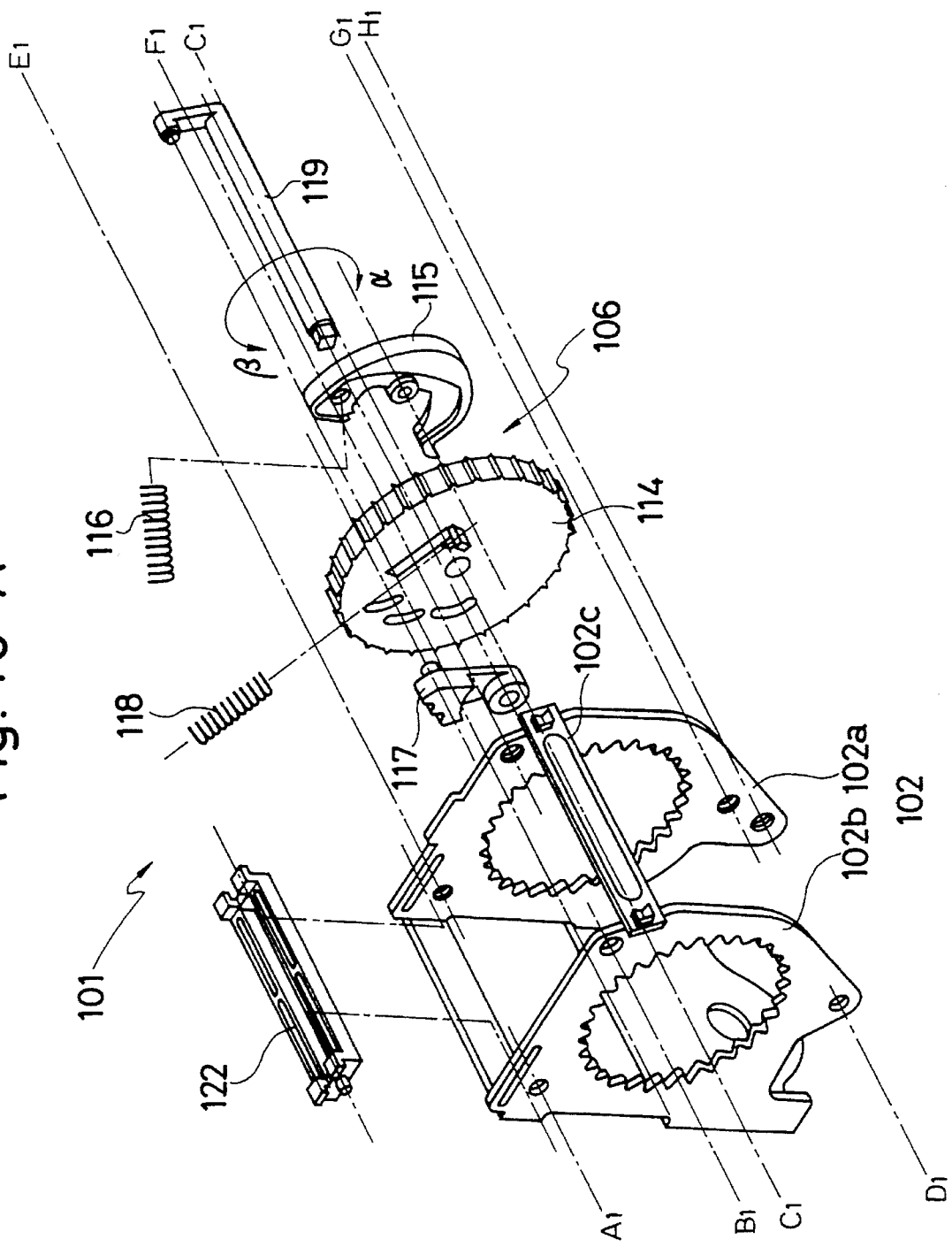
FIG. 16A is an exploded perspective view of a central portion of another embodiment of the seat belt retractor according to the present invention.
FIG. 16B is an exploded perspective view of a left-hand portion of the second embodiment of the seat belt retractor according to the present invention.
FIG. 16C is an exploded perspective view of a right-hand portion of the second embodiment of the seat belt retractor according to the present invention.
Figure 16:
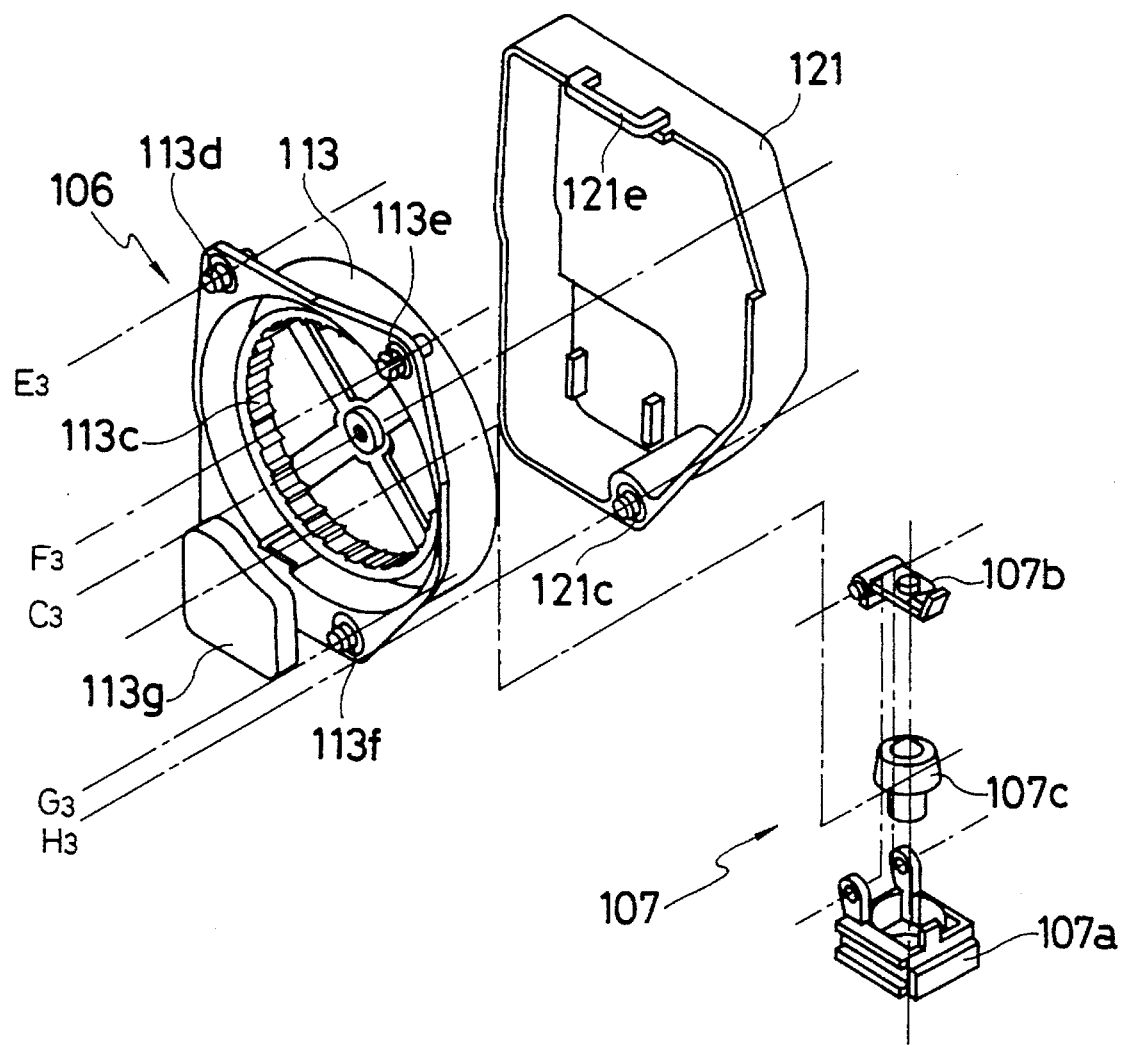
Figure 17:
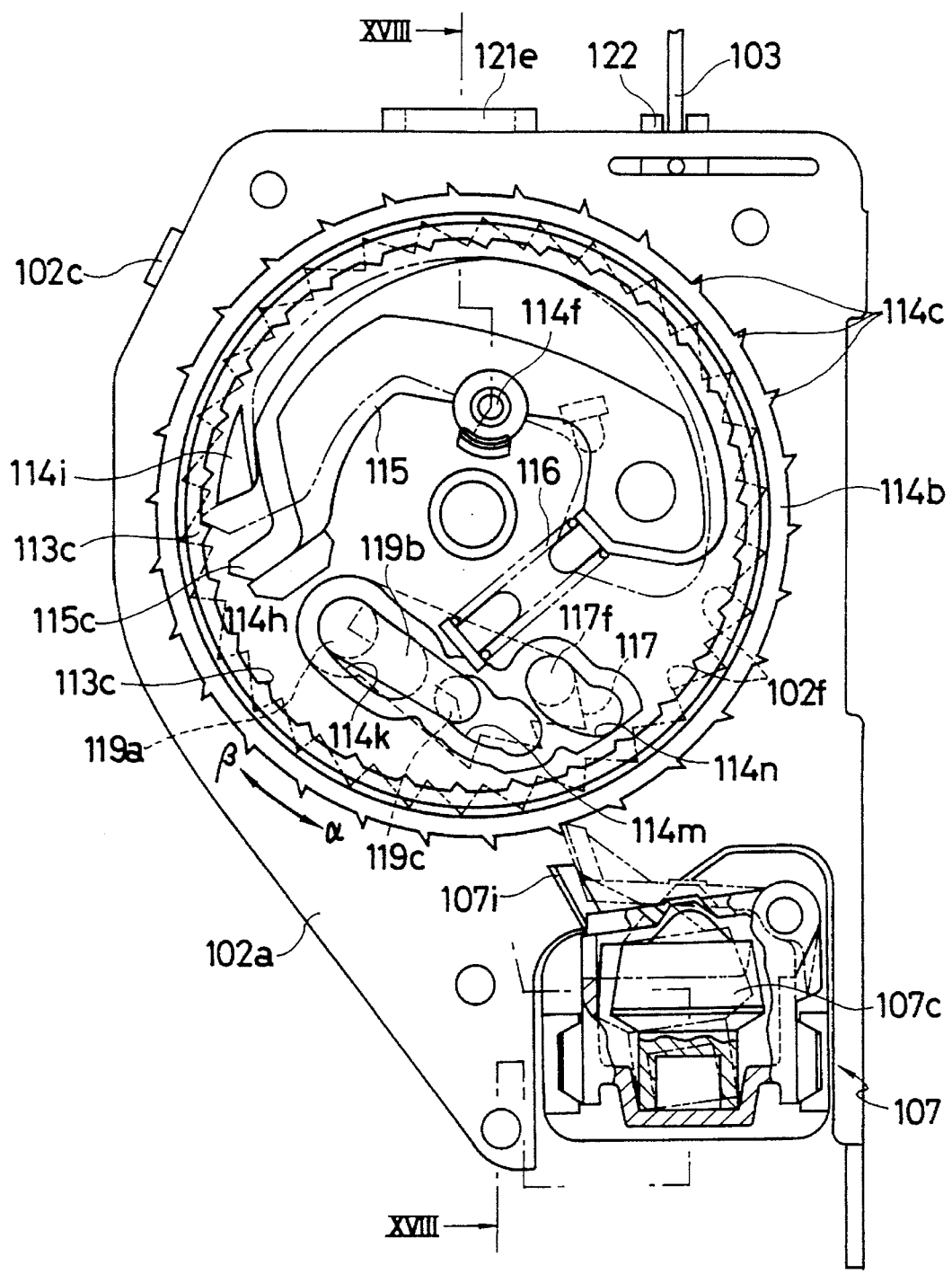
FIG. 17 is a side view of the seat belt retractor of the second embodiment in an assembled state, as seen from the right-hand side thereof, with a cover removed therefrom.
Figure 18:
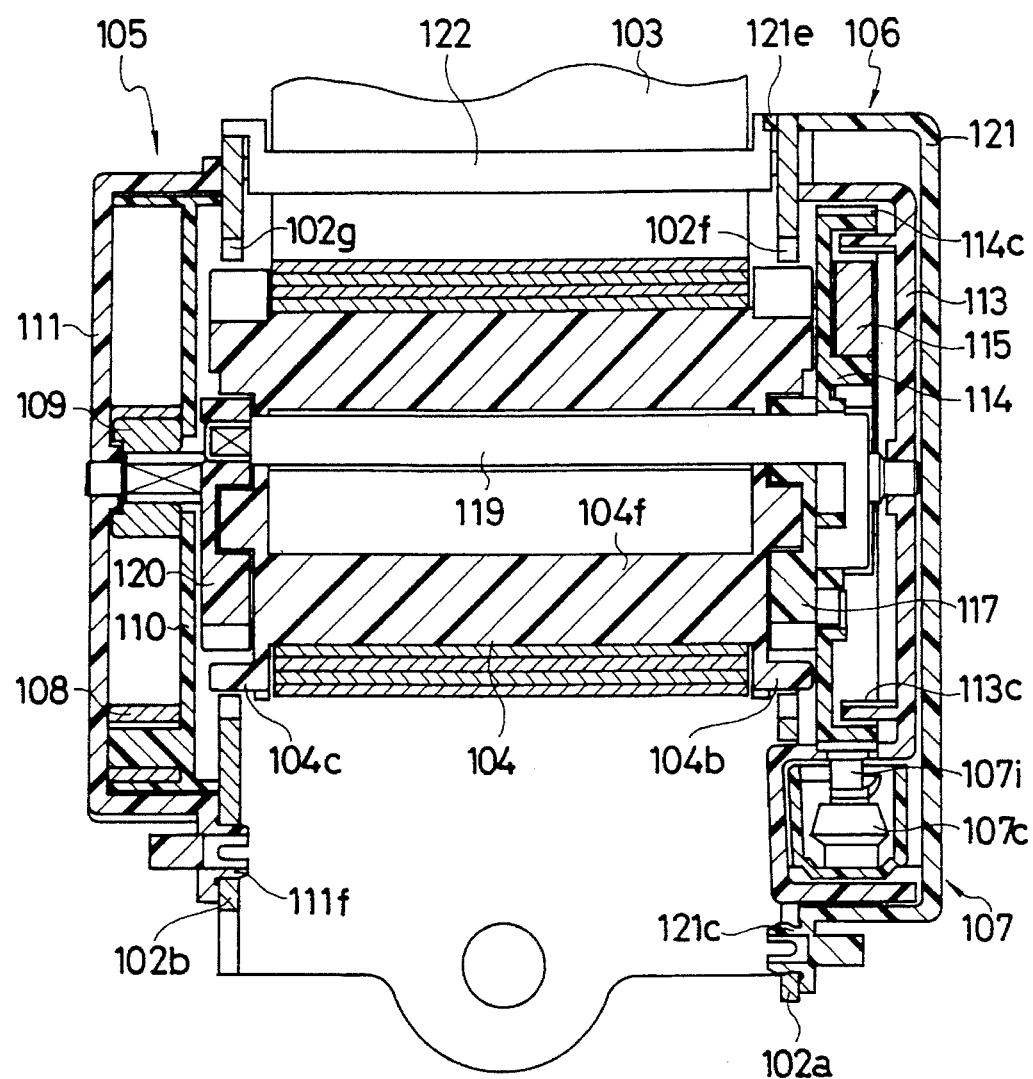
FIG. 18 is a sectional view taken along the line XVIII—XVIII in FIG. 17, showing the assembled state of the seat belt retractor of the second embodiment.
Figure 19:
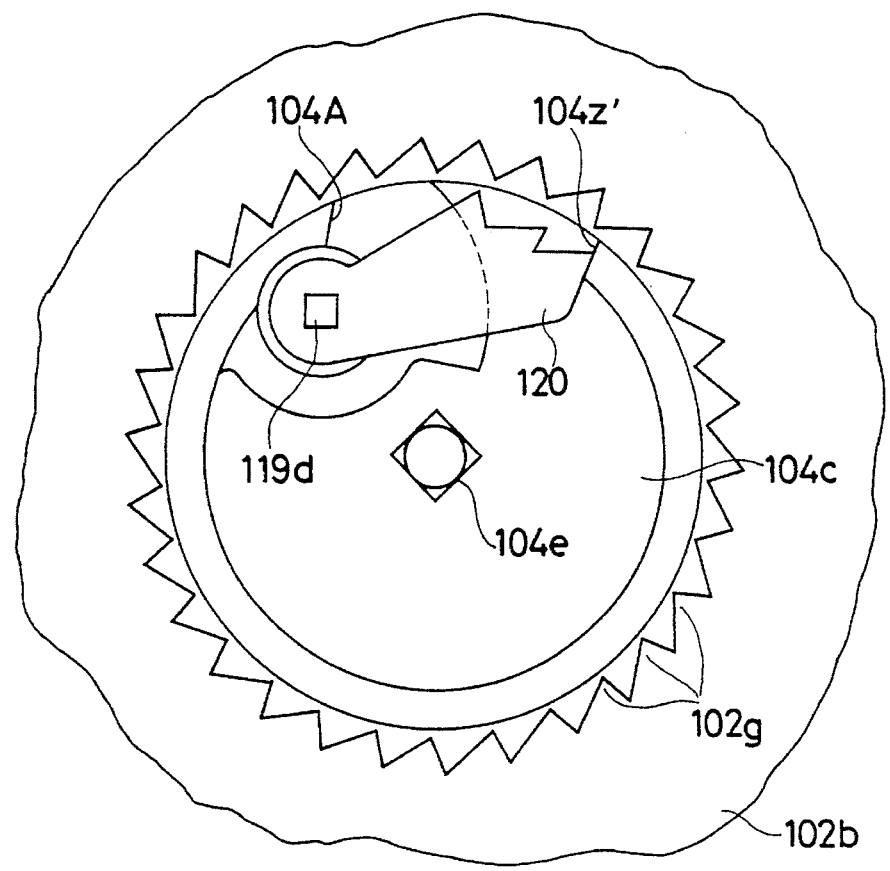
FIG. 19 is a fragmentary side view of the arrangement shown in FIG. 18, as seen from the left-hand side thereof, with a biasing force application means removed therefrom.

FIGS. 16A to 16C are exploded perspective views showing another embodiment of the seat belt retractor according to the present invention. FIG. 16A shows a central portion of the embodiment, while FIG. 16B shows a left-hand portion thereof, and FIG. 16C shows a right-hand portion thereof. An exploded perspective view showing the whole of the embodiment is formed by combining together FIGS. 16A, 16B and 16C with the imaginary lines $A_1$, $B_1$, $C_1$ and $D_1$ in FIG. 16A matched with the imaginary lines $A_2$, $B_2$, $C_2$ and $D_2$ in FIG. 16B, respectively, and with the imaginary lines $E_1$, $F_1$, $C_1$, $G_1$ and $H_1$ in FIG. 16A matched with the imaginary lines $E_3$, $F_3$, $C_3$, $G_3$ and $H_3$ in FIG. 16C, respectively. FIGS. 17 to 19 show the seat belt retractor of this embodiment which is in an assembled state. FIG. 17 is a side view of the seat belt retractor as seen from the right-hand side thereof with a cover removed therefrom. FIG. 18 is a sectional view taken along the line XVIII—XVIII in FIG. 17. FIG. 19 is a fragmentary side view of the arrangement shown in FIG. 18, as seen from the left-hand side thereof with a biasing force application means 105 removed therefrom.

Figure 20:
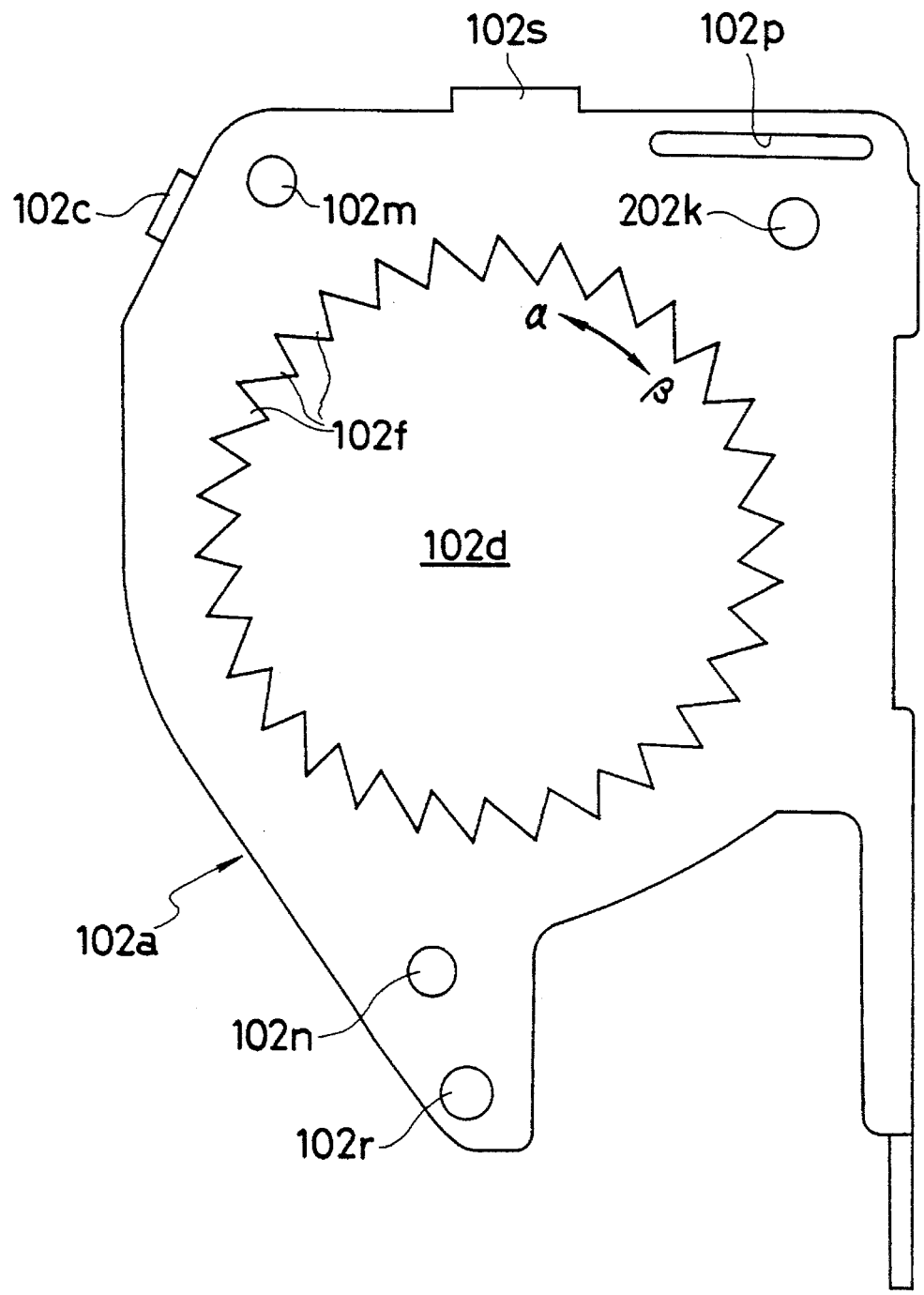
FIG. 20 is a side view of a frame employed in the second embodiment, as seen from the right-hand side thereof.
Figure 21:
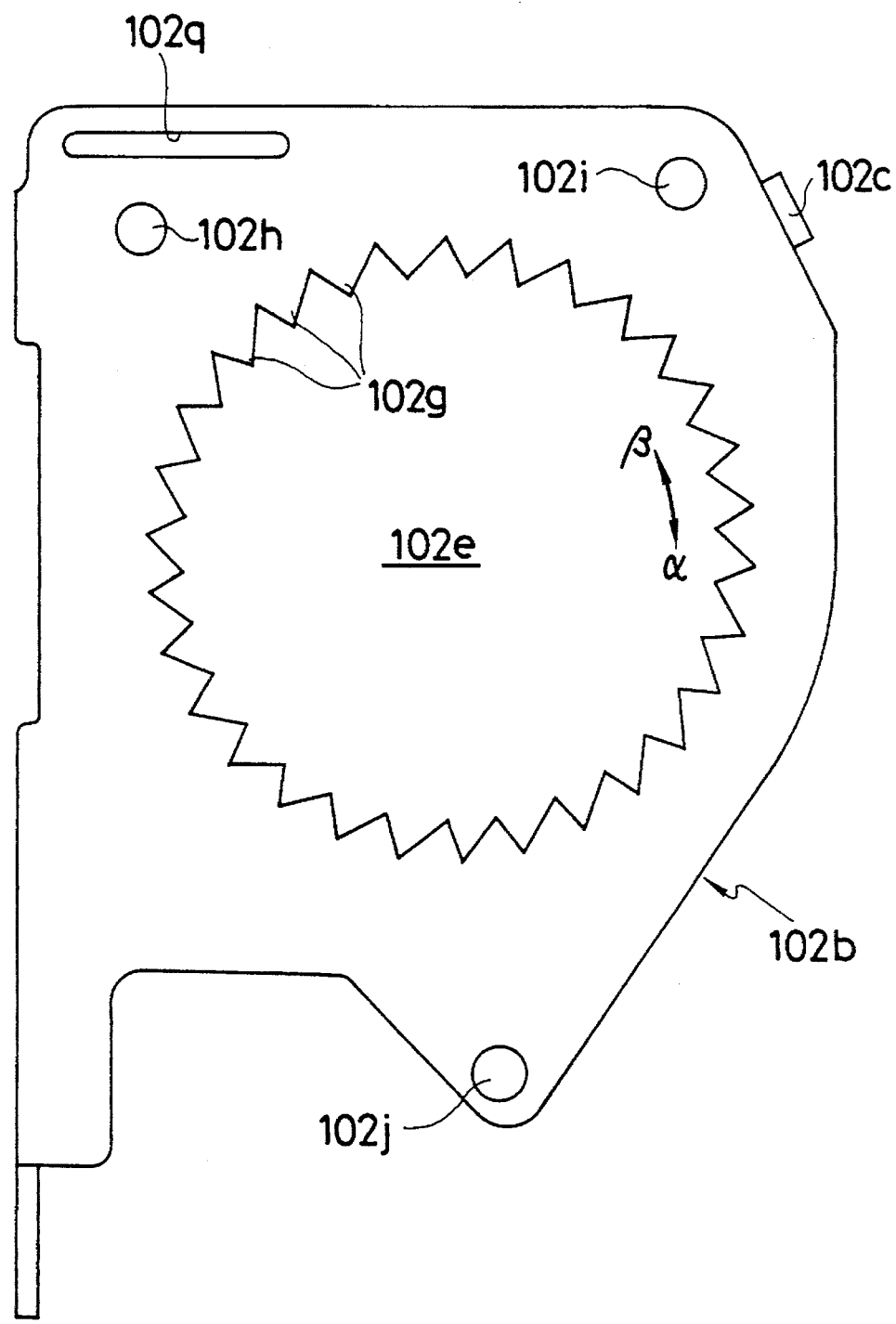
FIG. 21 is a side view of the frame employed in the second embodiment, as seen from the left-hand side thereof.

As shown in FIGS. 16A to 19, the seat belt retractor 101 in this embodiment includes a U-shaped frame 102 having a pair of right- and left-hand side walls 102a and 102b, which are connected together through a connecting member 102c, thereby reinforcing the frame 102. The right-hand side wall 102a is formed with a circular hole 102d, as shown in FIG. 20. Similarly, the left-hand side wall 102b is formed with a circular hole 102e, as shown in FIG. 21. In addition, the inner peripheral surface of the hole 102d in the right-hand side wall 102a is formed with a predetermined number of sawtooth-shaped teeth 102f over the entire circumference thereof. Similarly, the inner peripheral surface of the hole 102e in the left-hand side wall 102b is formed with a predetermined number of sawtooth-shaped teeth 102g over the entire circumference thereof. The phase of the left-hand teeth 102g is advanced a predetermined angle (e.g., 3°) in a webbing unwinding direction α with respect to the phase of the right-hand teeth 102f. The teeth 102f and 102g have the same triangular cross-sectional configuration. The surface of each tooth that faces the webbing unwinding direction α has a relatively steep slope, whereas the surface of the tooth that faces a webbing winding direction β has a relatively gentle slope.

The surfaces of these teeth 102f and 102g that have a relatively steep slope are shaped so that after main and backup pawls 117 and 120 have been guided by cam holes 114m and 114n to respective standby positions where teeth 117d and 120d of the pawls 117 and 120 begin to engage with the corresponding teeth 102f and 102g, the main and backup pawls 117 and 120 are allowed to pivot to respective lock positions where the teeth 117d and 120d are completely engaged with the teeth 102f and 102g, that is, the main and backup pawls 117 and 120 are each allowed to perform a self-lock action. The details of the self-lock action will be described later.

Further, the left-hand side wall 102b is provided with three engagement holes 102h, 102i and 102j and a guide hole 102q which comprises an elongated hole. The right-hand side wall 102a is provided with four engagement holes 102k, 102m, 102n and 102r and a guide hole 102p which comprises an elongated hole. In addition, the right-hand side wall 102a has an engagement projection 102s projecting upwardly from the upper end thereof.

As shown in FIG. 18, a reel shaft 104 for winding up a webbing 103 is disposed between the right- and left-hand side walls 102a and 102b of the frame 102. Referring to FIG. 22, the reel shaft 104 comprises a central webbing winding portion 104a, circular flanges 104b and 104c, which are formed at the right and left ends, respectively, of the webbing winding portion 104a so as to guide the webbing 103 when wound up, a first rotating shaft 104d that is provided in the center of the flange 104b so as to project axially outward, and a second rotating shaft 104e that is provided in the center of the flange 104c in coaxial relation to the first rotating shaft 104d. The webbing winding portion 104a is provided with a diametrical through-hole 104f into which one end of the webbing 103 is inserted and retained so that the webbing 103 can be wound up. One end of the through-hole 104f is formed with a relatively wide width. Accordingly, the through-hole 104f is designed in the form of a stepped-hole, which has steps 104g, so that the end of the webbing 103 is retained by the steps 104g.

The reel shaft 104 may be formed from PF die cast aluminum, for example.

Figures 23A, 23B:
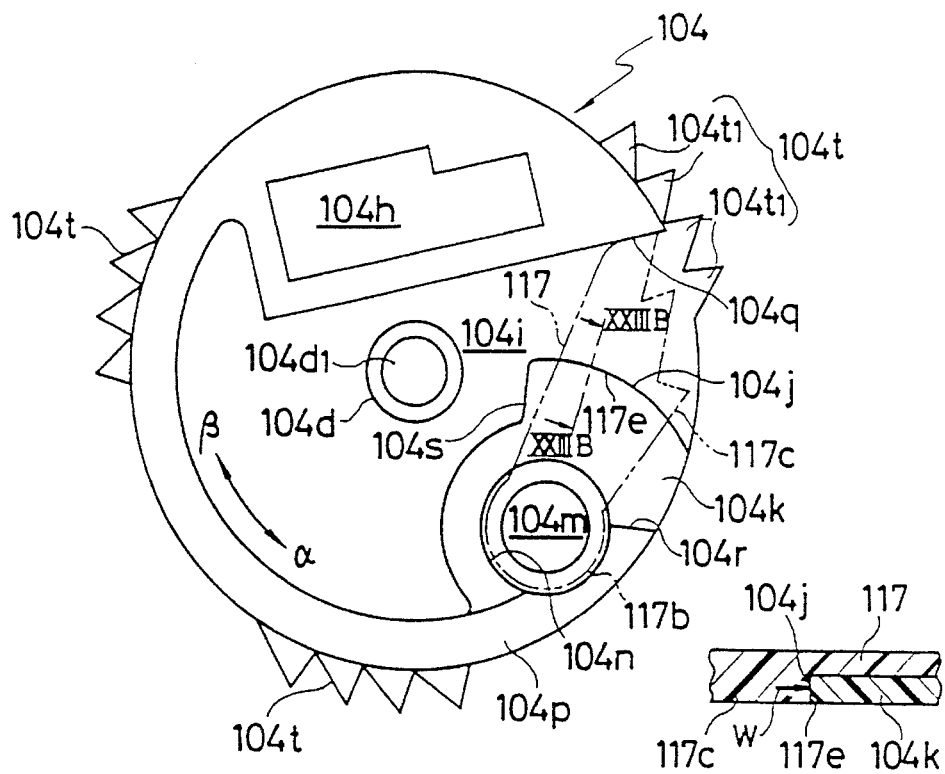
FIGS. 23(a) and 23(b) are side views of the reel shaft employed in the second embodiment, as seen from the right-hand side thereof.

As shown in FIGS. 23(a) and 23(b), the right-hand flange 104b is provided with a first recess 104h for accommodating a pawl spring 118 (shown in FIG. 16A), a second recess 104i in which is disposed a pawl portion 117c of a main pawl 117 (shown specifically in FIG. 33, described later), a load bearing portion 104k that is formed with a load bearing surface 104j for receiving a load applied to the pawl portion 117c of the main pawl 117, an axial through-hole 104m in which a joint pin 119 is rotatably fitted, and a third circular recess 104n that is formed at one end of the through-hole 104m in concentrical relation to it. The first, second and third recesses 104h, 104i and 104n are axially recessed most deeply relative to the surface of the outer peripheral edge 104p of the flange 104b. The load bearing portion 104k is axially recessed relative to the surface of the outer peripheral edge 104p of the flange 104b, shallower than the recesses 104h, 104i and 104n. Accordingly, a step 104q is formed between the second recess 104i and a portion of the outer peripheral edge 104p of the flange 104b where the first recess 104h is formed. Similarly, steps 104r and 104s are respectively formed between the outer peripheral edge 104p of the flange 104b and the load bearing portion 104k, and between the second recess 104i and the load bearing portion 104k. The load bearing surface 104j is formed from a circular arc of a predetermined length which is a part of a circle concentrical with respect to the through-hole 104m.

Further, the outer peripheral surface of the flange 104b is formed with three circumferentially equally spaced right-hand guide portions 104t for axially guiding the reel shaft 104 relative to the right-hand side wall 102a when the reel shaft 104 is disposed in between the right- and left-hand side walls 102a and 102b. The size of the right-hand guide portions 104t is so set that the flange 104b cannot readily pass through the holes 102d and 102e in the right- and left-hand side walls 102a and 102b. However, the right-hand guide portions 104t each have a predetermined number of teeth $104t_1$. The teeth $104t_1$ are similar to but a little smaller than the teeth 102f and 102g formed on the right- and left-hand side walls 102a and 102b. Accordingly, when the teeth $104t_1$ are matched with the teeth 102f or 102g, the flange 104b having the right-hand guide portions 104t can pass through the holes 102d and 102e.

Further, the distal end of the first rotating shaft 104d is defined as a small-diameter portion $104d_1$, which is rotatably fitted to and supported by a small hole 113n provided in a lock gear first cover 113, as described later.

Figures 24A, 24B:
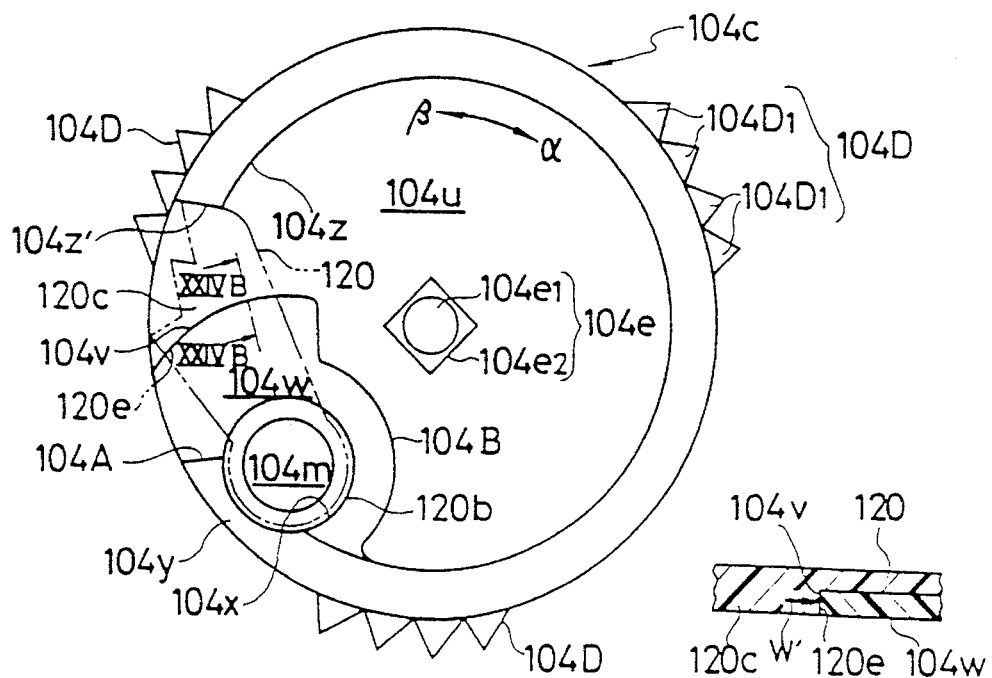
FIGS. 24(a) and 24(b) are side views of the reel shaft employed in the second embodiment, as seen from the left-hand side thereof.

In addition, as shown in FIGS. 24(a) and 24(b), the left-hand flange 104c is provided with a fourth recess 104u in which is disposed a pawl portion 120c of a backup pawl 120 (shown specifically in FIG. 35, described later), a load bearing portion 104w that is formed with a load bearing surface 104v for receiving a load applied to the pawl portion 120c of the backup pawl 120, an axial through-hole 104m in which the joint pin 119 is rotatably fitted, and a fifth circular recess 104x that is formed at one end of the through-hole 104m in concentrical relation to it. The fourth and fifth recesses 104u and 104x are axially recessed most deeply relative to the surface of the outer peripheral edge 104y of the flange 104c. The load bearing portion 104w is axially recessed relative to the surface of the outer peripheral edge 104y of the flange 104c, shallower than the recesses 104u and 104x. Accordingly, a step 104z is formed between the fourth recess 104u and the outer peripheral edge 104y of the flange 104c. Similarly, steps 104A and 104B are respectively formed between the outer peripheral edge 104y of the flange 104c and the load bearing portion 104w, and between the fourth recess 104u and the load bearing portion 104w. The load bearing surface 104v is formed from a circular arc of a predetermined length which is a part of a circle concentrical with respect to the through-hole 104m.

The outer peripheral surface of the flange 104c is also formed with three circumferentially equally spaced left-hand guide portions 104D for axially guiding the reel shaft 104 relative to the left-hand side wall 102b when the reel shaft 104 is disposed in between the right- and left-hand side walls 102a and 102b. The size of the left-hand guide portions 104D is so set that the flange 104c cannot readily pass through the holes 102d and 102e in the right- and left-hand side walls 102a and 102b. However, the left-hand guide portions 104D each have a predetermined number of teeth $104D_1$. The teeth $104D_1$ are similar to but a little smaller than the teeth 102f and 102g formed on the right- and left-hand side walls 102a and 102b. Accordingly, when the teeth $104D_1$ are matched with the teeth 102f or 102g, the flange 104c having the left-hand guide portions 104D can pass through the holes 102d and 102e.

Further, the second rotating shaft 104e, which projects axially from the flange 104c, has a distal end portion $104e_1$ with a circular cross-sectional configuration. The root portion $104e_2$ of the second rotating shaft 104e has a polygonal (square in this embodiment) cross-sectional configuration.

As will be clear from FIG. 22, the through-hole 104m extends not only through the flanges 104b and 104c but also through the central webbing winding portion 104a axially. In other words, the through-hole 104m extends axially through the reel shaft 104.

As shown in FIGS. 16B and 18, the left-hand side wall 102b has a biasing force application means 105 attached thereto for giving the reel shaft 104 force for winding up the webbing 103. Further, a seat belt lock activating means 106 is attached to the right-hand side wall 102a, as shown in FIGS. 16A, 16C and 18. In addition, the right-hand side wall 102a is provided with a deceleration sensing means 107, as shown in FIGS. 16C and 18 When a predetermined degree of deceleration acts on the vehicle, the deceleration sensing means 107 senses the deceleration and activates the seat belt lock activating means 106.

The biasing force application means 105 comprises a power spring 108, which is a spiral spring, a bush 109 to which the inner end 108a of the power spring 108 is connected to apply spring force thereto, a spring casing 110 to which the outer end 108b of the power spring 108 is secured and which accommodates the power spring 108, and a cover 111 which is attached to the spring casing 110 to cover the power spring 108.

Figure 25:
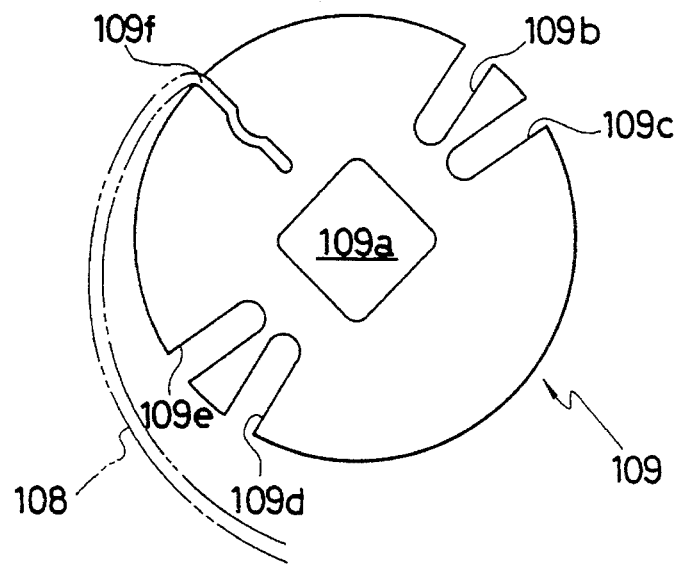
FIG. 25 is a side view of a bush employed in the second embodiment, as seen from the left-hand side thereof.

As shown in FIG. 25, the center of the bush 109 is provided with an axially extending through-hole 109a which can be fitted with the root portion $104e_2$ of the second rotating shaft 104e of the reel shaft 104. The through-hole 109a has the same polygonal cross-sectional configuration as that of the root portion $104e_2$ of the second rotating shaft 104e. The bush 109 is further provided with four grooves 109b, 109c, 109d and 109e of U-shaped cross-section which open in the outer peripheral surface thereof. Among these grooves, the grooves 109b and 109d are disposed diametrically opposite to each other with respect to the center of the bush 109, and so are the grooves 109c and 109e. These grooves are pierced with a spring pin 112 (shown in FIG. 16B), as described later. The bush 109 is further provided with a retaining groove 109f in which the inner end 108a of the spring 108 is fitted and retained.

The bush 109 is connected to the second rotating shaft 104e so as to be unable to rotate relative to it by fitting the hole 109a with the root portion $104e_2$ of the second rotating shaft 104e, thereby allowing the spring force of the spring 108 to act on the reel shaft 104 through the bush 109 in the webbing winding direction β at all times.

Figure 26A:
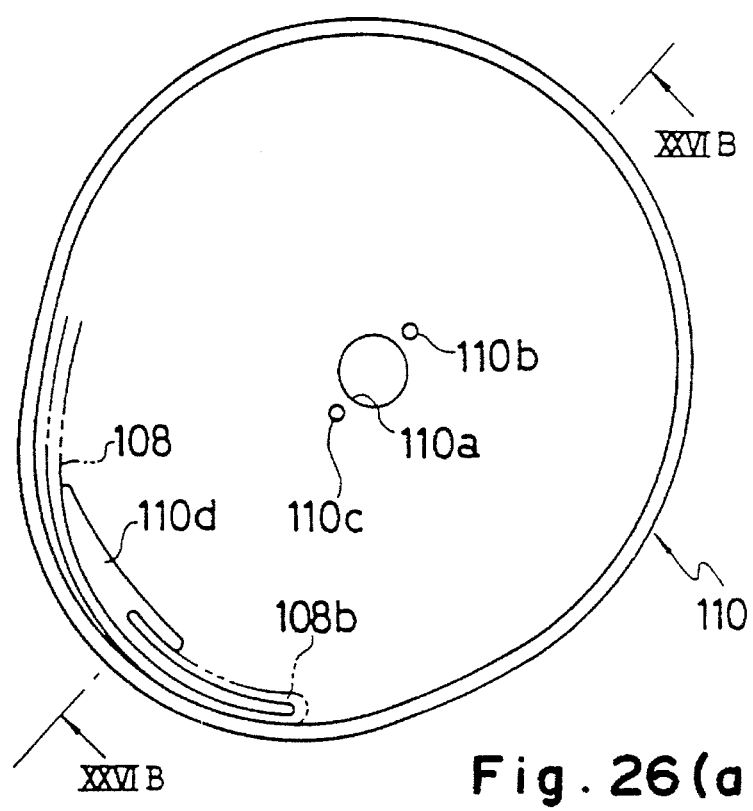
Figure 26B:
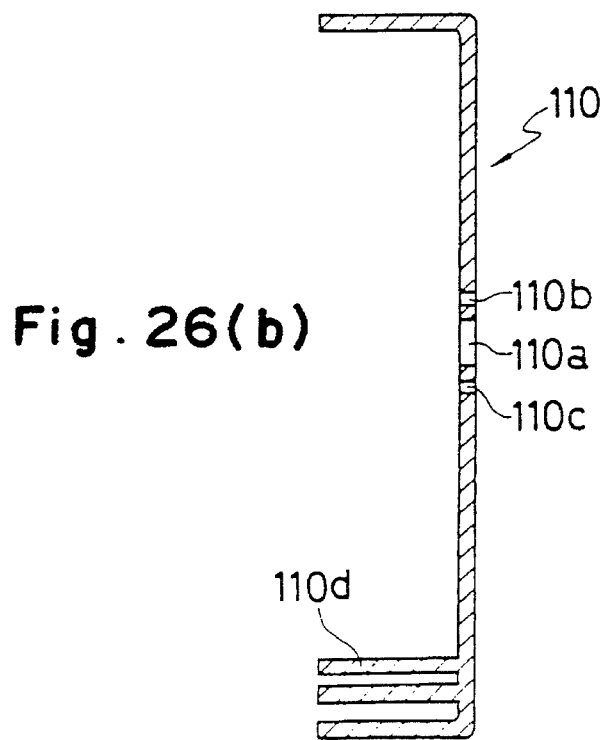

As shown in FIGS. 26(a) and 26(b), the spring casing 110 has a hole 110a provided in an approximately central portion thereof for rotatably fitting the root portion $104e_2$ of the second rotating shaft 104e of the reel shaft 104. The spring casing 110 further has a pair of small holes 110b and 110c which are provided at respective positions which face each other across the hole 110a. The small holes 110b and 110c are pierced with the spring pin 112. In addition, a retaining portion 110d which retains the outer end 108b of the spring 108 is provided near the outer peripheral edge of the spring casing 110.

Figure 27A:
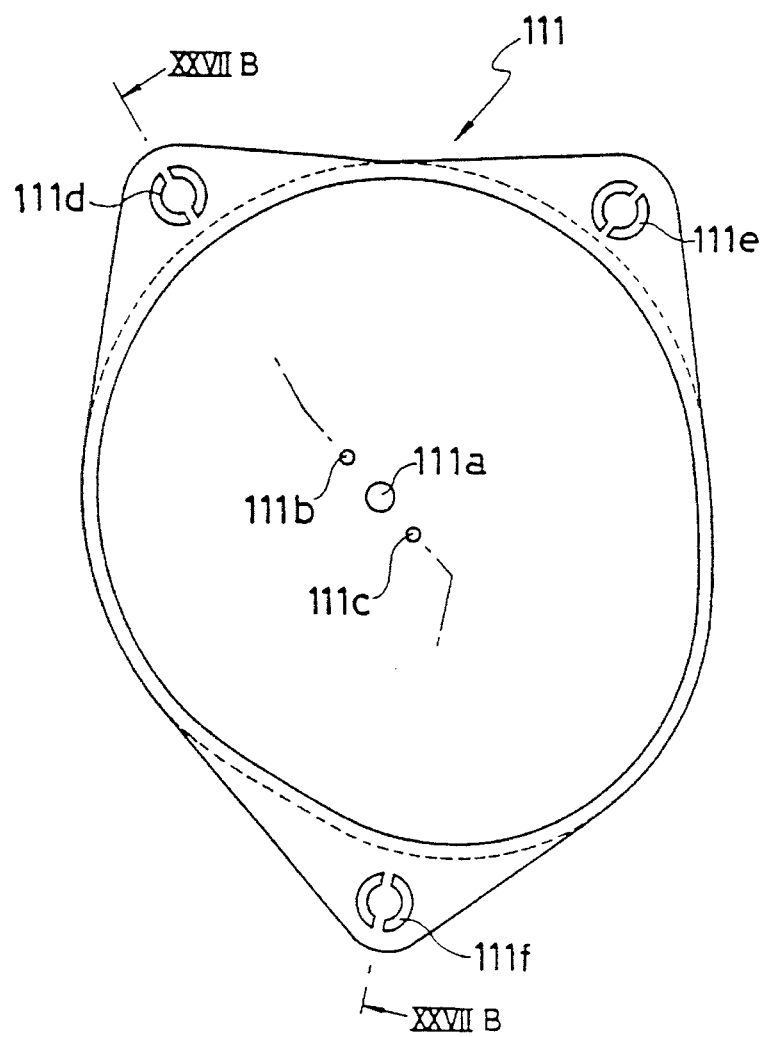
Figure 27B:
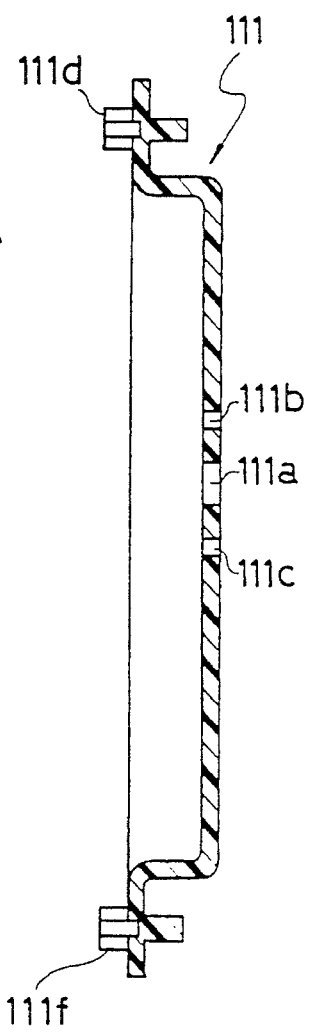

As shown in FIGS. 27(a) and 27(b), the cover 111 has a hole 111a provided in an approximately central portion thereof for rotatably supporting the distal end portion $104e_1$ of the second rotating shaft 104e of the reel shaft 104. The cover 111 further has a pair of small holes 111b and 111c which are provided at respective positions which face each other across the hole 111a. The small holes 111b and 111c are pierced with the spring pin 112. In addition, three engagement projections 111d, 111e and 111f are provided on a flange formed at one end of the cover 111. These projections 111d, 111e and 111f are fitted into and engaged with the corresponding engagement holes 102h, 102i and 102j, which are provided in the left-hand side wall 102b of the frame 102, thereby allowing the biasing force application means 105 to be removably attached to the left-hand side wall 102b of the frame 102.

Incidentally, when the seat belt retractor 101 is to be assembled, the biasing force application means 105 is assembled in advance as a subassembly, and this subassembly is attached to the left-hand side wall 102b of the frame 102. When the biasing force application means 105 is in the subassembled state, the power spring 108 needs to be held in a state where it has been wound up by a predetermined amount in the webbing unwinding direction α in order to apply spring force to the reel shaft 104 in the webbing winding direction β at all times. For this purpose, the spring pin 112 as shown in FIG. 16B is employed.

As shown in FIG. 28 in detail, the spring pin 112 is formed by bending an elastic wire material so as to have two rotation preventing arms 112a and 112b. In order to prevent the power spring 108 from unwinding when the biasing force application means 105 is in the subassembled state, the spring pin 112 is attached to the biasing force application means 105 so that the rotation preventing arms 112a and 112b pierce through the small holes 111b and 111c of the spring cover 111, either of the grooves 109b and 109c and either of the grooves 109d and 109e, which are provided in the bush 109, and the small holes 110b and 110c of the spring casing 110, as shown in FIG. 16B, thereby preventing undesired unwinding of the power spring 108.

In the meantime, the seat belt lock activating means 106 comprises: a lock gear first cover 113 which is secured to the right-hand side wall 102a of the frame 102; a lock gear 114; an inertia member 115 which is rockably attached to the lock gear 114; a control spring 116 which is disposed between the lock gear 114 and the inertia member 115; a main pawl 117 which has one end thereof pivotably supported in the third recess 104n, which is formed in the flange 104b of the reel shaft 104, and the other end of which forms an engagement portion that is disposed in the second recess 104i; a pawl spring 118 which is accommodated in the first recess 104h of the reel shaft 104 and compressedly loaded in between the reel shaft 104 and the main pawl 117; a joint pin 119 which extends through the axial hole 104m of the reel shaft 104; a backup pawl 120 which is connected to one end of the joint pin 119 and pivotably supported at one end thereof in the fifth recess 104x, which is formed in the flange 104c of the reel shaft 104, and the other end of which forms an engagement portion that is disposed in the fourth recess 104u; and a lock gear second cover 121 which is fitted to and supported by the right-hand side wall 102a of the frame 102 so as to cover the lock gear first cover 113, the lock gear 114, the inertia member 115, the main pawl 117, the joint pin 119, and the deceleration sensing means 107.

Further, the seat belt retractor 101 has a webbing guide 122 for guiding the webbing 103.

Figure 29:
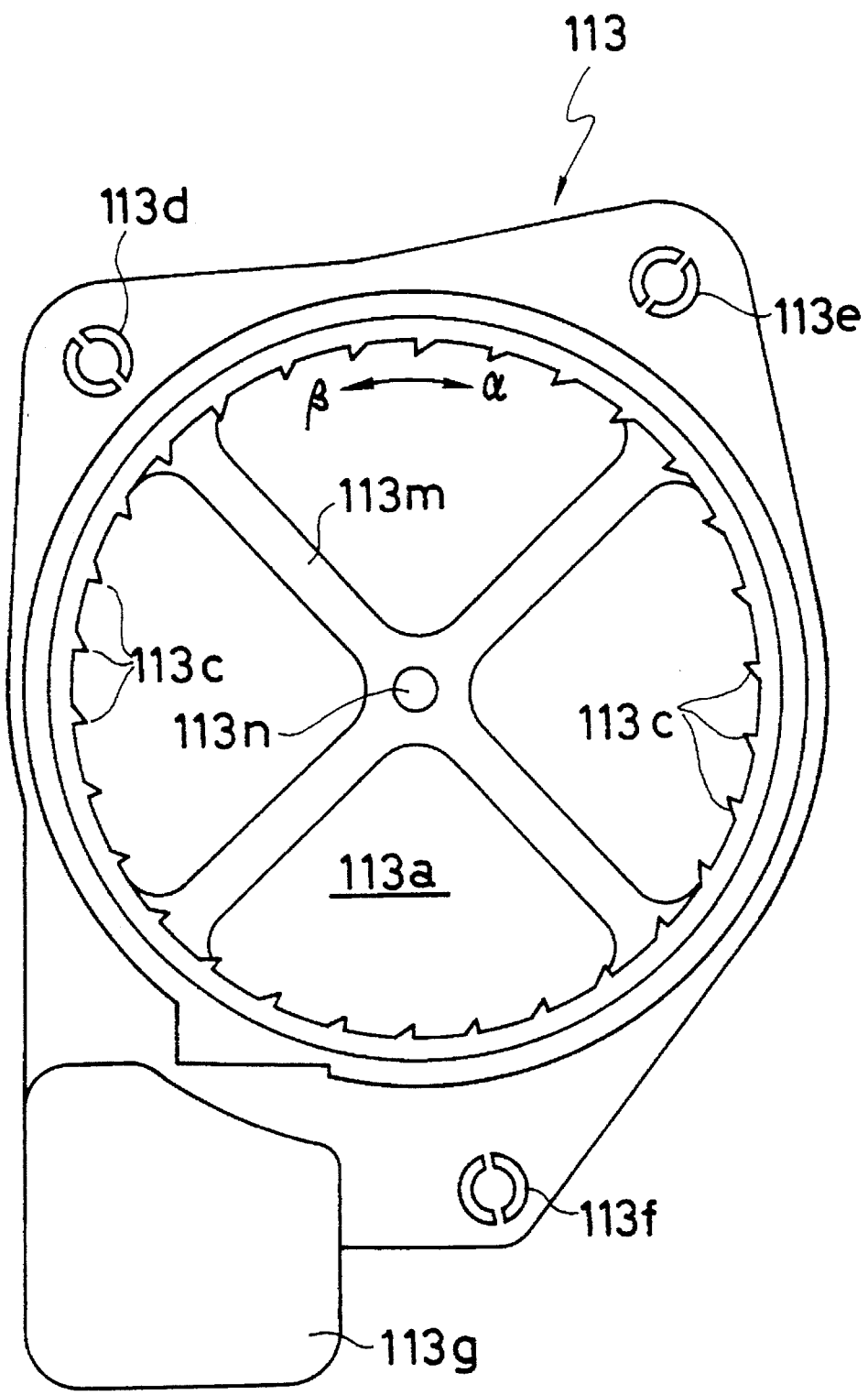
FIG. 29 is a side view of a lock gear first cover employed in the second embodiment, as seen from the left-hand side thereof.
Figure 30:
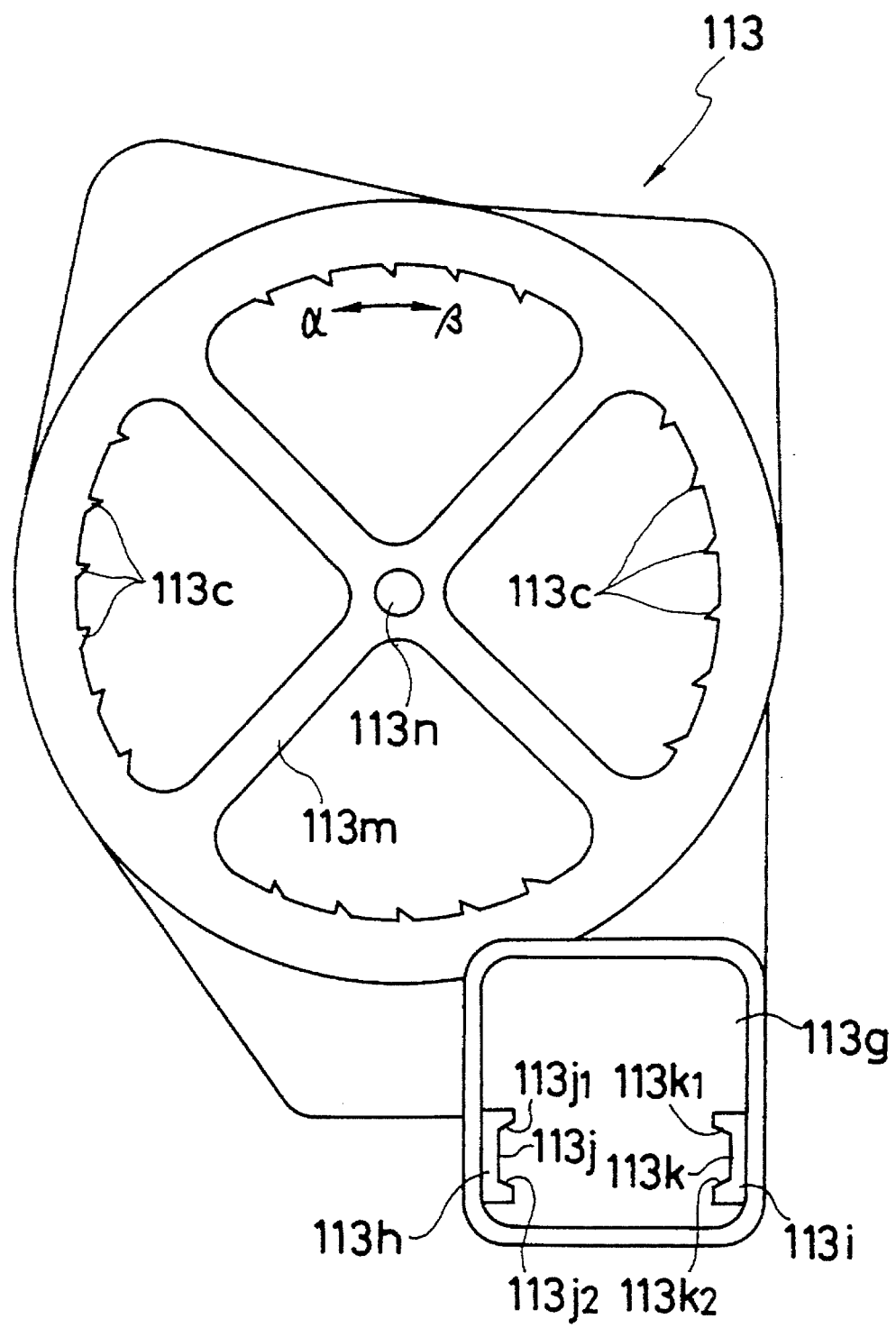
FIG. 30 is a side view of the lock gear first cover employed in the second embodiment, as seen from the right-hand side thereof.
Figure 3I:
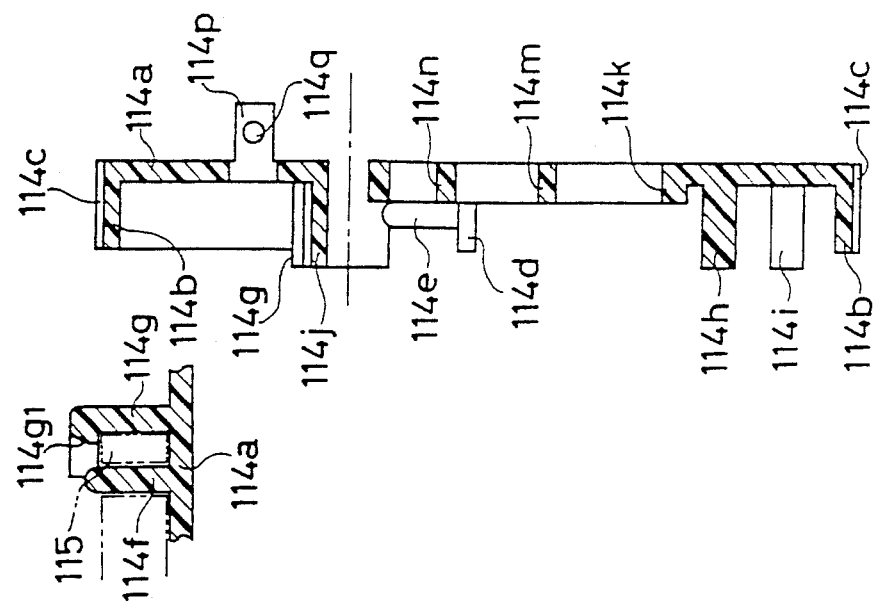
Figure 3I:
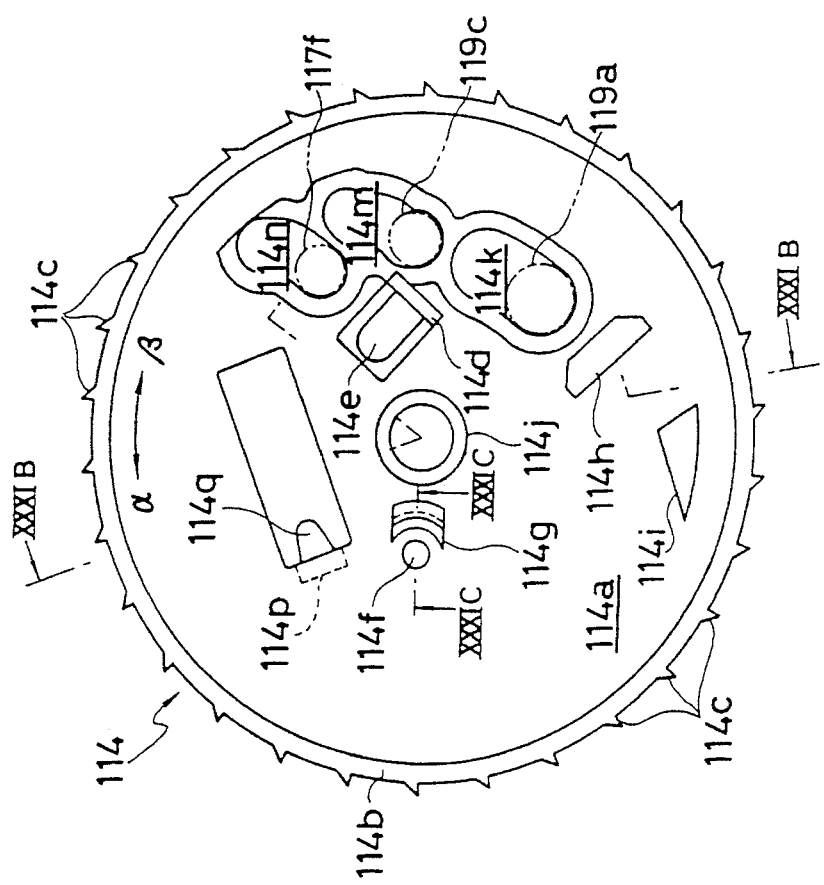

As shown in FIGS. 29 and 30, the lock gear first cover 113 has a relatively large through-hole 113a. The inner peripheral surface of the through-hole 113a is formed with a predetermined number of teeth 113c over the entire circumference thereof. The annularly disposed teeth 113c have a triangular cross-sectional configuration in which the surface of each tooth 113c which faces the webbing unwinding direction $\alpha$ is a substantially vertical surface, whereas the surface thereof which faces the webbing winding direction $\beta$ is a relatively gentle slope. Further, the lock gear first cover 113 has three engagement projections 113d, 113e and 113f provided on a side thereof which faces the right-hand side wall 102a of the frame 102, as shown in FIG. 29. These engagement projections 113d, 113e and 113f are fitted into the engagement holes 102k, 102m and 102n, respectively, which are formed in the right-hand side wall 102a, thereby allowing the lock gear first cover 113 to be removably attached to the frame 102.

As shown in FIG. 30, the lock gear first cover 113 is provided with a portion 113g for accommodating the deceleration sensing means 107, which opens to the side reverse to the side where the engagement projections 113d, 113e and 113f are provided. The inner wall of the accommodating portion 113g is provided with a pair of guide members 113h and 113i that guide the deceleration sensing means 107 in a direction perpendicular to the plane of FIG. 30 and that fixedly support the deceleration sensing means 107. The mutually opposing surfaces of the guide members 113h and 113i are formed with respective recesses 113j and 113k of trapezoidal cross-section which extend longitudinally of the guide members 113h and 113i. In other words, the side walls $113j_1$, $113j_2$, $113k_1$ and $113k_2$ of the recesses 113j and 113k have slant surfaces.

In addition, an approximately cross-shaped side wall 113m is formed on the lock gear first cover 113 on the side thereof which is reverse to the side where the engagement projections 113d, 113e and 113f are provided. The side wall 113m is so designed that the intersection of two crossing portions of the side wall 113m is substantially coincident with the center of the circle that is defined by the annularly disposed teeth 113c. The intersection of the side wall 113m is provided with a small hole 113n at a position which is coincident with the center of the annularly disposed teeth 113c. The small hole 113n is fitted with the small-diameter end portion $104d_1$ of the first rotating shaft 104d of the reel shaft 104 rotatably with substantially no gap left therebetween, thereby allowing the first rotating shaft 104d to be rotatably supported by the small hole 113n.

As shown in FIG. 31(a), the lock gear 114 comprises a circular flat plate portion 114a, and an annular flange 114b that is formed around the outer peripheral edge of the flat plate portion 114a. The outer peripheral surface of the flange 114b is formed with a predetermined number of teeth 114c. The teeth 114c each have a triangular cross-sectional configuration in which the surface of each tooth 114c which faces the webbing unwinding direction $\alpha$ is a relatively gentle slope, whereas the surface thereof which faces the webbing winding direction $\beta$ is a substantially vertical surface.

As shown in FIGS. 31(a) and 31(b), the flat plate portion 114a has a spring retaining member 114d provided on the left-hand side thereof (as viewed in FIG. 31(b); the side that is surrounded with the flange 114b) for supporting one end of the control spring 116. The spring retaining member 114d is provided with a spring guide portion 114e that projects parallel to the flat plate portion 114a. Further, the flat plate portion 114a is provided with a shaft 114f for rockably supporting the inertia member 115, as described later. An arcuate fall preventing member 114g is provided adjacent to the shaft 114f.

As shown in FIG. 31(c), the fall preventing member 114g has a retaining projection $114g_1$ formed on the distal end thereof. The retaining projection $114g_1$ has a slant surface at the upper end thereof and projects a little toward the shaft 114f. Accordingly, when fitted onto the shaft 114f, the inertia member 115 presses the slant surface of the retaining projection $114g_1$, so that the fall preventing member 114g is elastically deformed so as to enlarge a little the gap between the shaft 114f and the fall preventing member 114g. Thus, the inertia member 115 rides over the retaining projection $114g_1$ and is accommodated in the space defined between the shaft 114f and the fall preventing member 114g. In this state, if the inertia member 115 is urged to move axially upward as viewed in FIG. 31(c), the axial movement is prevented by the retaining projection $114g_1$. Thus, the inertia member 115 is prevented from coming off the shaft 114f. However, since the amount to which the retaining projection $114g_1$ projects is so small that the inertia member 115 and the retaining projection $114g_1$ engage each other lightly, the inertia member 115 can readily ride over the retaining projection $114g_1$ and come off the shaft 114f when a relatively small external force is applied to the inertia member 115 in a direction in which it comes off the shaft 114f. The fall preventing member 114g allows the inertia member 115 to be readily attached to and removed from the shaft 114f and also enables the inertia member 115 to be reliably supported by the shaft 114f in a rockable state.

In addition, the flat plate portion 114a is provided with a first stopper 114h and a second stopper 114i and further has a tubular rotating shaft 114j axially projecting from the center of the flat plate portion 114a. It should be noted that the bore of the tubular rotating shaft 114j is pierced with the first rotating shaft 104d of the reel shaft 104 so that the rotating shaft 114j is rotatable about the first rotating shaft 104d.

Further, the flat plate portion 114a is provided with first, second and third cam holes 114k, 114m and 114n, which extend through the flat plate portion 114a and have predetermined configurations. As shown in FIG. 31(b), the respective peripheral edges of the first, second and third cam holes 114k, 114m and 114n are made greater than the flat plate portion 114a in the wall thickness so that cam followers which are fitted in these cam holes are guided effectively and reliably and the peripheral edges of the cam holes are reinforced. The cam profiles of the second and third cam holes 114m and 114n will be detailed later. The first cam hole 114k is formed as a circular arc centered at the rotating shaft 114j.

On the right-hand side (as viewed in FIG. 31(b); the side that is not surrounded with the flange 114b) of the flat plate portion 114a is provided with a spring retaining member 114p for supporting one end of the pawl spring 118. The spring retaining member 114p is provided with a spring guide portion 114q which projects parallel to the flat plate portion 114a.

Figure 32A:
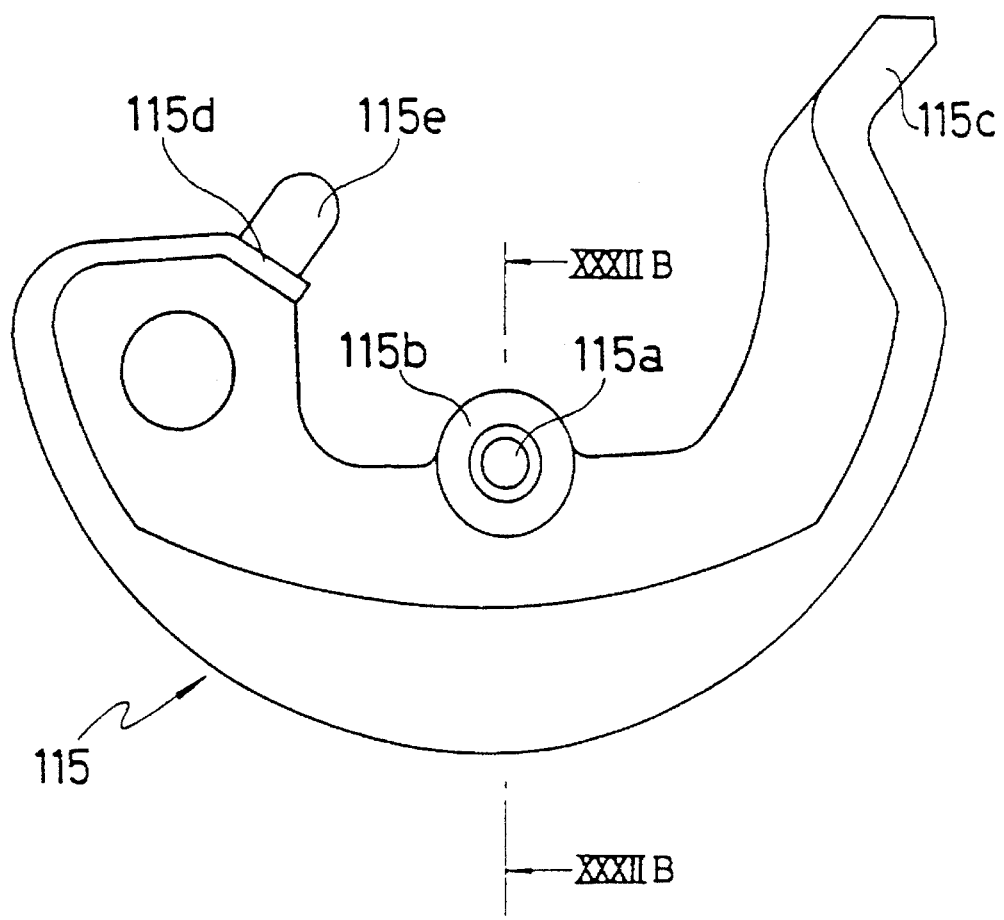
FIG. 32(a) is a side view of the inertia member as seen from the left-hand side thereof.
Figure 32B:
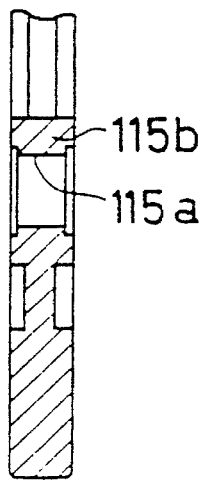
FIG. 32(b) is a sectional view taken along the line XXXIIB—XXXIIB in FIG. 32 (a).

As shown in FIGS. 32(a) and 32(b), the inertia member 115 is formed in an approximately C shape from a flat plate.

The inertia member 115 is formed in the center thereof with a boss portion 115b having a hole 115a. Further, a pawl 115c is formed at one end of the inertia member 115. The other end of the inertia member 115 is provided with a spring retaining portion 115d and a spring guide portion 115e for supporting and guiding the other end of the control spring 116. As shown in FIG. 17, the inertia member 115 is rockably supported on the lock gear 114 by fitting the hole 115a with the shaft 114f of the lock gear 114. At this time, the boss portion 115b of the inertia member 115 is retained by the retaining projection $114g_1$ of the fall preventing member 114g, thereby preventing the inertia member 115 from coming off the shaft 114f, as described above.

As shown in FIG. 17, the control spring 116 is fitted at both ends thereof to the respective guide portions 114e and 115e of the lock gear 114 and the inertia member 115 in a state where the inertia member 115 is rockably supported on the shaft 114f. Thus, the control spring 116 is compressedly loaded between the spring retaining members 114d and 115d. Accordingly, the inertia member 115 is constantly biased in the direction α relative to the lock gear 114 by the spring force from the control spring 116, so that it is normally held in a position where it abuts on the first stopper 114h, as shown by the solid line. On the other hand, when the inertia member 115 rotates in the direction β relative to the lock gear 114 against the spring force from the control spring 116, the inertia member 115 assumes a position where it abuts on the second stopper 114i, as shown by the two-dot chain line.

As shown in FIGS. 17 and 18, when the seat belt retractor 101 is in an assembled state, the teeth 113c of the lock gear first cover 113 lie inside the annular flange 114b of the lock gear 114 and in between the flange 114b and the inertia member 115. Since the inertia member 115 is normally held in a position where it abuts on the first stopper 114h, which is shown by the solid line in FIG. 17, the pawl 115c is held in a non-engaging position, which is apart from the teeth 113c. When the inertia member 115 is in a position where it abuts on the second stopper 114i, which is shown by the two-dot chain line in FIG. 17, the pawl 115c assumes a position where it is engageable with a tooth 113c.

If the lock gear 114 rotates in the webbing unwinding direction α when the pawl 115c is in the engageable position, the pawl 115c engages with a tooth 113c, so that the lock gear 114 is prevented from further rotating in the webbing unwinding direction α. If the lock gear 114 rotates in the webbing winding direction β when the pawl 115c is in the engageable position, the pawl 115c passes over the teeth 113c while moving along the gentle slopes of the teeth 113c against the control spring 116. Accordingly, the lock gear 114 is rotatable in the webbing winding direction β.

As shown in FIGS. 33(a) and FIGS. 33(c), the main pawl 117 is formed in a substantially fan-like shape and has a boss portion 117b formed in a portion thereof which acts as a pivot. The boss portion 117b has a through-hole 117a. The main pawl 117 has a pawl portion 117c formed at an end thereof which is remote from the pivot. Further, teeth 117d which are engageable with the teeth 102f of the right-hand side wall 102a of the frame 102 are formed at the distal end of the pawl portion 117c. As shown in FIG. 23(a), the boss portion 117b is pivotably fitted in the third recess 104n of the flange 104b of the reel shaft 104. Accordingly, the main pawl 117 is attached to the reel shaft 104 so as to be pivotable about the boss portion 117b. When it abuts on the step 104q formed on the flange 104b, the main pawl 117 is prevented from further pivoting in the direction α, whereas, when it abuts on the step 104r formed on the flange 104b, the main pawl 117 is prevented from further pivoting in the direction β. In other words, these steps 104q and 104r serve as stoppers for limiting the pivoting motion of the main pawl 117 in the directions α and β, respectively.

When the main pawl 117 abuts on the step 104q, the teeth 117d formed at the distal end thereof lie completely inside the outer peripheral surface of the flange 104b. When the main pawl 117 abuts on the step 104r, the teeth 117d project outwardly from the outer peripheral surface of the flange 104b to reach a position where the teeth 117d are engageable with the teeth 102f of the right-hand side wall 102a of the frame 102, as described later. In addition, the main pawl 117 has a load transfer portion 117e formed at an end of the pawl portion 117c which is remote from the teeth 117d. The load transfer portion 117e is formed from a circular arc which is a part of a circle concentrical with respect to the through-hole 117a and the boss portion 117b.

As shown by the two-dot chain line in FIG. 23(a), the main pawl 117 is attached to the right-hand flange 104b by rotatably fitting the boss portion 117b into the third recess 104n of the reel shaft 104. When the main pawl 117 is attached to the right-hand flange 104b, the pawl portion 117c lies in the second recess 104i, while the load transfer portion 117e abuts on the load bearing surface 104j of the reel shaft 104. Since the load transfer portion 117e and the load bearing surface 104j of the reel shaft 104 are formed from circular arcs of the same circle, the load transfer portion 117e abuts on the load bearing surface 104j of the reel shaft 104 at all times irrespective of the position of the main pawl 117.

Thus, since the load transfer portion 117e abuts on the load bearing surface 104j of the reel shaft 104, a load w applied to the pawl portion 117c of the main pawl 117 is transferred from the load transfer portion 117e to the load bearing surface 104j, as shown in FIG. 23(b), and borne by the reel shaft 104. In such a load bearing structure, since the teeth 117d, which serve as a point of application of load, and the load transfer portion 117e are relatively close to each other, substantially no flexure acts on the main pawl 117, but compression alone acts thereon substantially. Moreover, since the load transfer portion 117e and the load bearing surface 104j are in plane contact with each other, the load is transferred to the reel shaft 104 through a relatively wide area and hence dispersed, so that the stress produced therein is relatively small. Accordingly, the level of strength required for the main pawl 117 is lower than that of the conventional main pawl, and hence the main pawl 117 can be formed by using a relatively lightweight material, e.g., a resin material.

Further, the main pawl 117 has a columnar cam follower 117f projecting from a side thereof which is reverse to the side where the load transfer portion 117e is provided. The cam follower 117f is fitted into the third cam hole 114n of the lock gear 114 so as to be guided along the cam hole 114n.

The pawl spring 118 is accommodated in the first recess 104h of the reel shaft 104 and fitted to the spring guide portion 114q of the lock gear 114 so as to be compressedly loaded between the wall surface of the first recess 104h and the spring retaining portion 114p. Accordingly, the pawl spring 118 constantly biases the main pawl 117 relative to the reel shaft 104 in the webbing unwinding direction α. Therefore, the main pawl 117 is normally held in abutment on the step 104q, which is formed on the flange 104b, by the biasing force of the pawl spring 118.

As shown in FIGS. 34(a) and 35(c), the joint pin 119 has a body 119a that is formed with a circular cross-sectional configuration. The body 119a is formed at the right-hand end thereof (as viewed in FIG. 34(*a*)) with an arm 119*b* that extends at right angles to the body 119*a*. A cam follower 119*c* having a circular cross-sectional configuration is provided at the distal end of the arm 119*b*. The cam follower 119*c* is fitted into the second cam hole 114*m* of the lock gear 114 so as to be guided along the cam hole 114*m*. Further, a shaft portion 119*d* having a rectangular cross-sectional configuration is formed at the other end of the body 119*a*. The shaft portion 119*d* is fitted into a hole formed in one end portion of the backup pawl 120 (described later) so as to be unable to rotate relative to the backup pawl 120. Accordingly, when the arm 119*b* pivots in response to the movement of the cam follower 119*c* guided along the second cam hole 114*m*, the body 119*a* rotates, and the rotation of the body 119*a* is transferred to the backup pawl 120. Thus, the backup pawl 120 pivots in response to the movement of the cam follower 119*c* guided along the second cam hole 114*m*.

As shown in FIGS. 35(*a*) and 35(*c*), the backup pawl 120 is formed in a substantially fan-like shape and has a boss portion 120*b* formed in a portion thereof which serves as a pivot. The boss portion 120*b* has a through-hole 120*a* of rectangular cross-section. The backup pawl 120 has a pawl portion 120*c* formed at an end thereof which is remote from the pivot. Further, teeth 120*d* which are engageable with the teeth 102*g* of the left-hand side wall 102*b* of the frame 102 are formed at the distal end of the pawl portion 120*c*. As shown in FIG. 24(*a*), the boss portion 120*b* is pivotably fitted in the fifth recess 104*x* of the flange 104*c* of the reel shaft 104. Accordingly, the backup pawl 120 is attached to the reel shaft 104 so as to be pivotable about the boss portion 120*b*. When the backup pawl 20 abuts on a portion 104*z'* of the step 104*z*, formed on the flange 104*c*, which is located at an end of the outer peripheral edge 104*y*, the backup pawl 120 is prevented from further pivoting in the direction α, whereas, when it abuts on the step 104A formed on the flange 104*c*, the backup pawl 120 is prevented from further pivoting in the direction β. In other words, these steps 104*z'* and 104A serve as stoppers for limiting the pivoting motion of the backup pawl 120 in the directions α and β, respectively. When the backup pawl 120 abuts on the step 104*z'* the teeth 120*d* formed at the distal end thereof lie completely inside the outer peripheral surface of the flange 104*c*. When the backup pawl 120 abuts on the step 104A, the teeth 120*d* project outwardly from the outer peripheral surface of the flange 104*c* to reach a position where the teeth 120*d* are engageable with the teeth 102*g* of the left-hand side wall 102*b* of the frame 102, as described later. In addition, the backup pawl 120 has a load transfer portion 120*e* formed at an end of the pawl portion 120*c* which is remote from the teeth 120*d*. The load transfer portion 120*e* is formed from a circular arc which is a part of a circle concentrical with respect to the through-hole 120*a* and the boss portion 120*b*.

As shown in FIG. 24(*a*), when the backup pawl 120 is attached to the left-hand flange 104*c*, the pawl portion 120*c* lies in the fourth recess 104*u*, while the load transfer portion 120*e* abuts on the load bearing surface 104*v* of the reel shaft 104. In this case, the load transfer portion 120*e* abuts on the load bearing surface 104*v* of the reel shaft 104 at all times irrespective of the position of the backup pawl 120.

Thus, since the load transfer portion 120*e* abuts on the load bearing surface 104*v* of the reel shaft 104, a load w' applied to the pawl portion 120*c* of the backup pawl 120 is transferred from the load transfer portion 120*e* to the load bearing surface 104*v*, as shown in FIG. 24(*b*), and borne by the reel shaft 104. In such a load bearing structure, since the teeth 120*d*, which serve as a point of application of load, and the load transfer portion 120*e* are relatively close to each other, substantially no flexure acts on the backup pawl 120, but compression alone acts thereon substantially, in the same way as in the case of the above-described main pawl 117. Moreover, since the load transfer portion 120*e* and the load bearing surface 104*v* are in plane contact with each other, the load is transferred to the reel shaft 104 through a relatively wide area and hence dispersed, so that the stress produced therein is relatively small. Accordingly, the level of strength required for the backup pawl 120 is lower than that of the conventional backup pawl, and hence the backup pawl 120 can be formed by using a relatively lightweight material, e.g., a resin material.

Figure 36A:
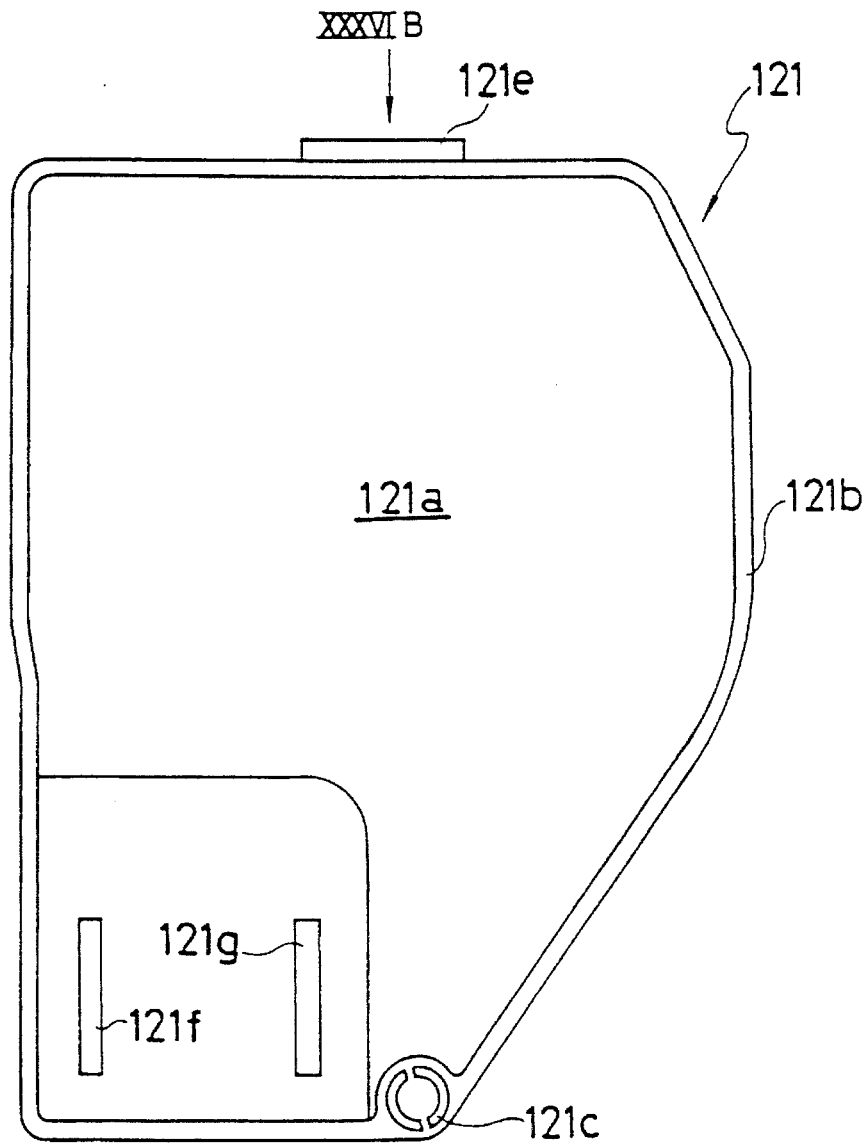
Figure 36B:
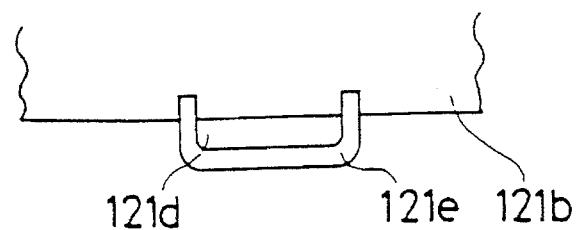

As shown in FIGS. 36(*a*) and 36(*b*), the lock gear second cover 121 comprises a flat plate portion 121*a*, a flange 121*b* formed around the outer peripheral edge of the flat plate portion 121*a*, an engagement projection 121*c* that is fitted into a through-hole formed in the right-hand side wall 102*a* of the frame 102, and an engagement portion 121*e* that defines a gap 121*d* into which is fitted the engagement projection 102*s* formed on the upper end of the right-hand side wall 102*a*. By fitting the engagement projection 102*s* into the gap 121*d*, the engagement portion 121*e* is engaged with the engagement projection 102*s*, and by fitting the engagement projection 121*c* into the engagement hole 102*r* of the right-hand side wall 102*a*, the lock gear second cover 121 is removably attached to the right-hand side wall 102*a* so as to cover the deceleration sensing means 107.

Figure 37:
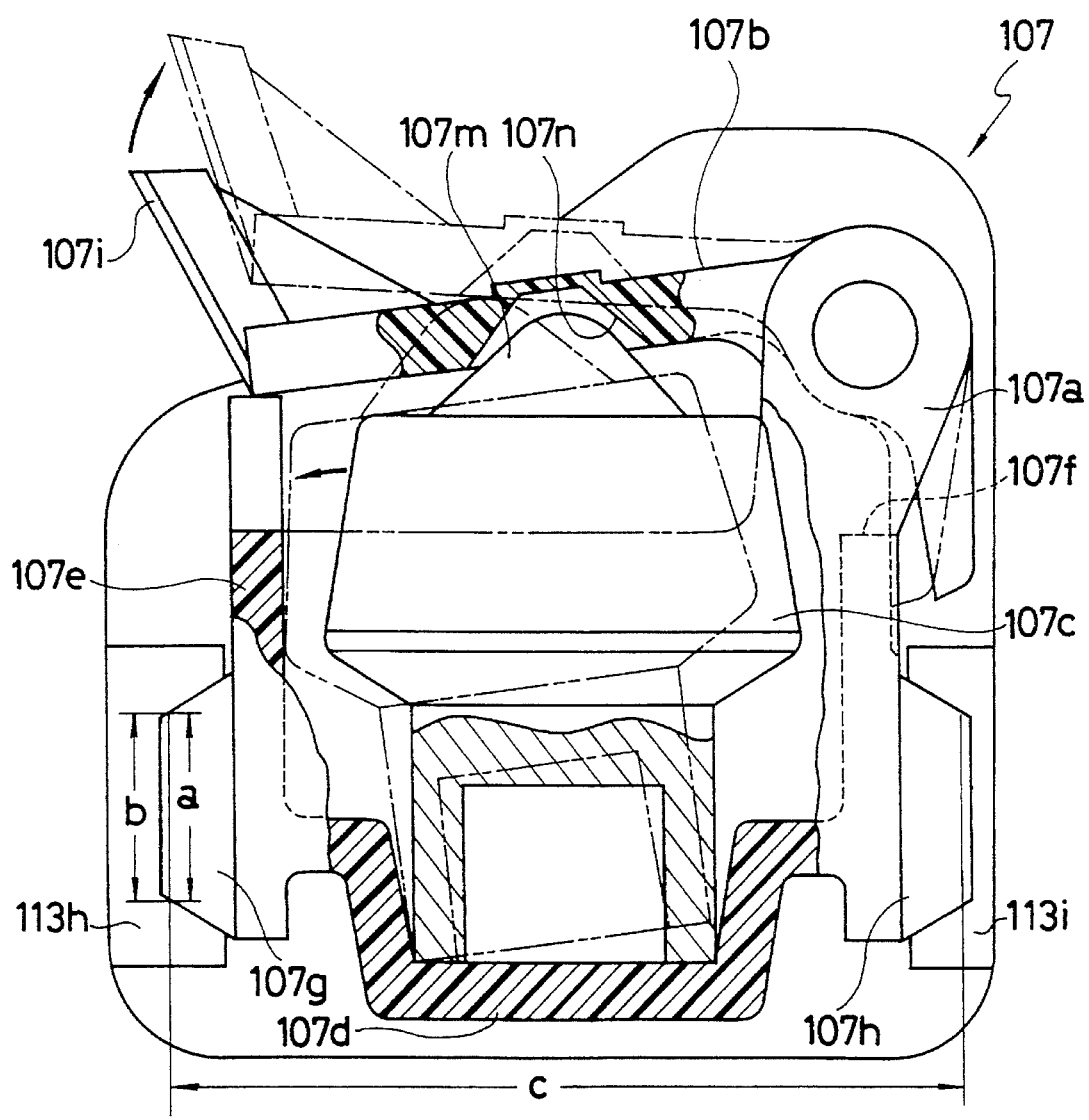
FIG. 37 is a partly-cutaway side view of a deceleration sensing means employed in the second embodiment.

As shown in FIG. 37, the deceleration sensing means 107 has a casing 107*a*, a lever 107*b* which is pivotably supported by the casing 107*a*, and an inertia member 107*c* which is accommodated in the casing 107*a* so that when the vehicle is in a normal state, the inertia member 107*c* is in the position shown by the solid line, whereas, when deceleration exceeding a predetermined value acts on the vehicle, the inertia member 107*c* tilts to the position shown by the two-dot chain line.

Figure 38B:
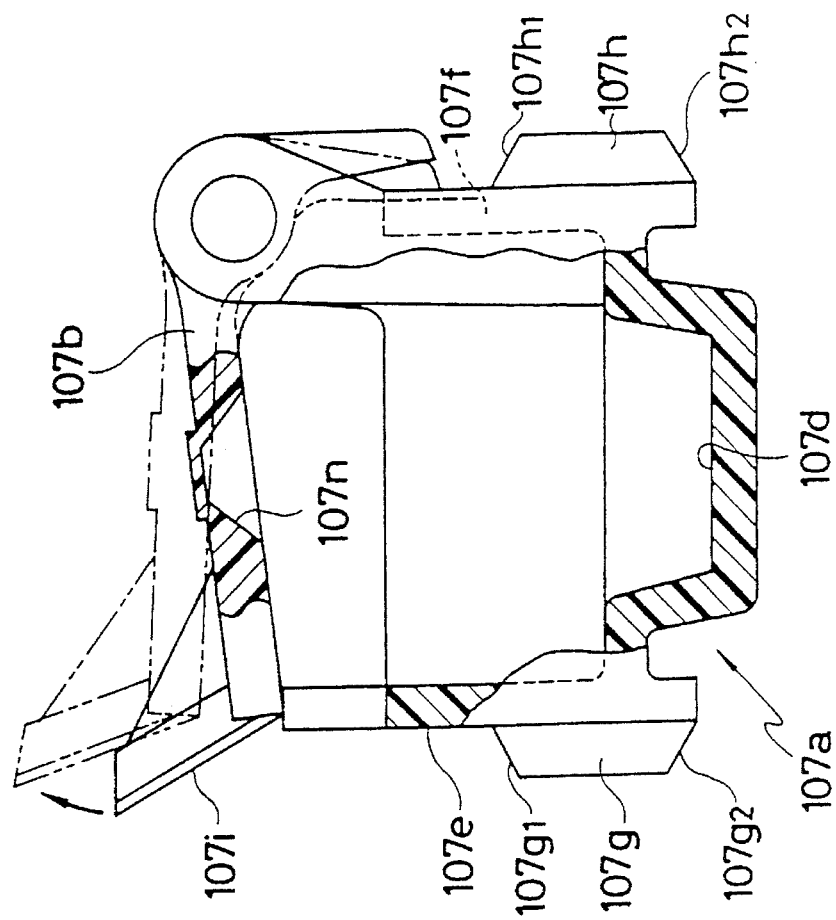
Figure 38A:
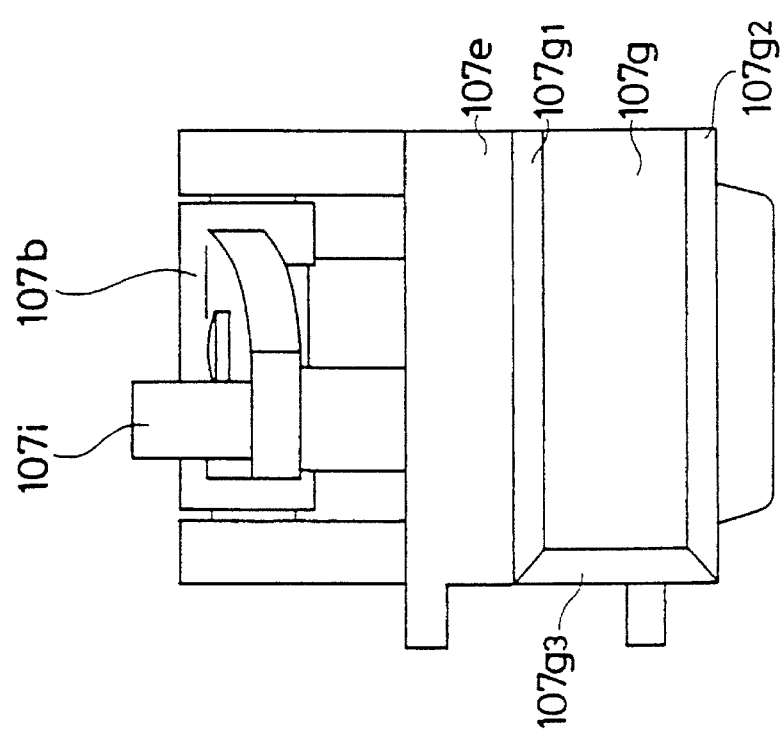

As shown in FIGS. 38(*a*) and 38(*b*), the casing 107*a* is formed in the shape of a container having a rectangular cross-sectional configuration. The bottom of the casing 107*a* is formed as a portion 107*d* where the inertia member 107*c* is mounted. The front and rear walls 107*e* and 107*f* of the casing 107*a* are formed with respective engagement ridges 107*g* and 107*h* each having a trapezoidal cross-sectional configuration. More specifically, the engagement ridges 107*g* and 107*h* have side walls $107g_1$, $107g_2$, $107h_1$ and $107h_2$ which are formed as slant surfaces having the same slope angle as that of the side walls $113j_1$, $113j_2$, $113k_1$ and $113k_2$ of the recesses 113*j* and 113*k* of the guide members 113*h* and 113*i*. As will be clear from FIG. 38(*a*), one longitudinal end of the engagement ridge 107*g* is formed in the shape of a slant surface $107g_3$. Similarly, one longitudinal end of the other engagement ridge 107*h* is formed in the shape of a slant surface, although not shown. These engagement ridges 107*g* and 107*h* are fitted into the recesses 113*j* and 113*k* of the guide members 113*h* and 113*i* of the lock gear first cover 113.

The lever 107*b* is pivotably supported at the rear end thereof by the casing 107*a*. The forward end of the lever 107*b* is provided with a pawl 107*i* which is engageable with a tooth 114*c* of the lock gear 114.

As shown in FIG. 39, the inertia member 107*c* has a hollow cylinder-shaped small-mass portion 107*j* formed at the bottom thereof. The inertia member 107*c* further has a solid frusto-conical large-mass portion 107*k* formed on the upper end of the small-mass portion 107*j*. The large-mass portion 107*k* has a larger diameter than that of the small-mass portion 107*j*. The angle of slope of the outer peripheral surface of the large-mass portion 107k is set so that when the inertia member 107c tilts to a maximum degree, as described later, it substantially coincides with the inner surface of the front wall 107e. In addition, a conical actuating projection 107m is formed on the upper end of the large-mass portion 107k. By forming the inertia member 107c so that the top thereof has a larger mass than that of the bottom thereof, as described above, the inertia member 107c can sense deceleration even more sensitively.

As shown in FIG. 37, the inertia member 107c, which is arranged as described above, is mounted in the mounting portion 107d of the casing 107a. In a normal state, the inertia member 107c mounted in the mounting portion 107d erects perpendicularly to the mounting portion 107d, as shown by the solid line, and the upper end of the actuating projection 107m formed at the top of the inertia member 107c fits in a frusto-conical recess 107n formed in the lever 107b. In the normal state, the lever 107b is held in a substantially horizontal position shown by the solid line. In this solid-line position, the lever 107b is placed in a non-engaging position where the pawl 107i does not engage with a tooth 114c of the lock gear 114.

When a predetermined degree of deceleration acts on the vehicle, the inertia member 107c tilts until the outer peripheral surface of the large-mass portion 107k substantially abuts on the inner surface of the front wall 107e, as shown by the two-dot chain line. The tilting of the inertia member 107c causes the actuating projection 107m to push up the lever 107b. Accordingly, the lever 107b pivots to the position shown by the two-dot chain line. In the two-dot chain line position, the lever 107b assumes an engageable position where the pawl 107i is engageable with a tooth 114c of the lock gear 114.

Incidentally, the inertia member 107c is provided with the actuating projection 107m, and by virtue of the presence of the actuating projection 107m, it is possible to obtain a relatively large stroke of the lever 107b with a relatively small angle of inclination of the inertia member 107c. Thus, it is possible to shorten the length of the arm of the lever 107b and hence form the deceleration sensing means 107 in a compact structure.

The deceleration sensing means 107, arranged as described above, is accommodated in the accommodating portion 113g by longitudinally fitting the engagement ridges 107g and 107h into the respective recesses 113j and 113k of the guide members 113h and 113i, which are provided in the accommodating portion 113g, as shown in FIG. 37. At this time, the engagement ridges 107g and 107h can be smoothly fitted into the recesses 113j and 113k because one end of each of the engagement ridges 107g and 107h is formed in the shape of a slant surface, as described above.

In addition, the distance a between the upper and lower side walls $107g_1$, $107g_2$, $107h_1$ and $107h_2$ at the respective projecting ends of the engagement ridges 107g and 107h is set longer than the distance b between the upper and lower side walls $113j_1$, $113j_2$, $113k_1$ and $113k_2$ of the recesses 113j and 113k at the respective positions corresponding to the projecting end positions of the engagement ridges 107g and 107h. When the engagement ridges 107g and 107h are fitted to the recesses 113j and 113k, the casing 107a is supported by the guide members 113h and 113i relatively rigidly by virtue of the elastic force derived from the elastic deformation of the accommodating portion 113g and the casing 107a. In particular, since the side walls of the engagement ridges 107g and 107h and those of the recesses 113j and 113k are formed in the shape of slant surfaces, wedge effect is obtained between the guide members 113h and 113i and the engagement ridges 107g and 107h, so that the casing 107a is supported by the guide members 113h and 113i even more rigidly.

As shown in FIGS. 40(a) and 40(c), the webbing guide 122 has a body 122a which is disposed in between the two side walls 102a and 102b of the frame 102 and which has in its center a hole 122f that is pierced with the webbing 103. The webbing guide 122 further has shafts 122b and 122c which project longitudinally from two longitudinal ends, respectively, of the body 122a and which are slidably fitted into the respective guide holes 102p and 102q of the two side walls 102a and 102b. In addition, the webbing guide 122 has flanges 122d and 122e which similarly project longitudinally from the two ends of the body 122a and which abut on the respective upper end surfaces of the side walls 102a and 102b.

The webbing guide 122 slides along the guide holes 102p and 102q of the side walls 102a and 102b in accordance with the roll diameter of the webbing 103 taken up on the reel shaft 104, thereby allowing the webbing 103 to be smoothly wound on and off. The webbing guide 122 also protects the webbing 103.

Next, the operations of the main pawl 117 and the backup pawl 120 will be explained in detail with reference to FIG. 41A(I)(a) to FIG. 41A(I)(d), FIG. 41A(II)(a) to FIG. 41A(II)(d), FIG. 41B(I)(e) to FIG. 41B(I)(h) and FIG. 41 B(II)(e) to FIG. 41B(U)(h) It should be noted that in each of these figures, the upper part (I) shows the operation of the main pawl 117, whereas the lower part (II) shows the operation of the backup pawl 120. Below these figures will be referred to as, for example, FIG. 41(a), when discussing both the corresponding upper part (I) for example, FIG. 41A(I)(a), and the corresponding lower part (II), for example, FIG. 41A(II)(a). In addition, these Figures are schematic views in which the teeth 102f, the teeth 117d and the three cam holes 114k, 114m and 114n at the main pawl (17) side are illustrated on the same plane, and in which both the main pawl 117 and the backup pawl 120 are seen from the right-hand side as viewed in FIG. 16C.

Referring to FIG. 41A(I)(a) to FIG. 41A(I)(d) and FIG. 41A(II)(a) to FIG. 41A(II)(d), the reel shaft 104 (in FIG. 41A are shown only the through-hole 104m, which is pierced with the body 119a of the joint pin 119, and the main pawl 117, which is provided on the reel shaft 104) is constantly biased in the direction β relative to the lock gear 114 (in FIG. 41A are shown only the cam holes 114k, 114m and 114n) by the spring force of the pawl spring 118 (not shown in FIG. 41A; see FIG. 16A, for example). Therefore, the reel shaft 104 rotates in the direction β relative to the lock gear 114 until the body 119a abuts on the upper end edge of the cam hole 114k, thus reaching a normal state as shown in FIG. 41A(a).

In the normal state, the cam follower 119c of the joint pin 119 abuts on the upper end edge of the cam hole 114m, and the cam follower 117f of the main pawl 117 abuts on the upper end edge of the cam hole 114n. In addition, the teeth 117d of the main pawl 117 are far apart from the teeth 102f of the right-hand side wall 102a, so that the main pawl 117 assumes a non-engaging position where the teeth 117d do not engage with the teeth 102f. On the other hand, the backup pawl 120 assumes the position shown in FIG. 41A(a) in accordance with the angle of rotation of the joint pin 119 that is determined by positions at which the cam followers 119c and 117f abut on the respective upper end edges of the cam holes 114m and 114n. That is, the teeth 120d of the backup pawl 120 are far apart from the teeth 102g of the left-hand side wall 102b, so that the backup pawl

120 also assumes a non-engaging position where the teeth 120*d* do not engage with the teeth 102*g*.

When the reel shaft 104 rotates in the direction α relative to the lock gear 114 about the first rotating shaft 104*d* (not shown in FIG. 41A; see FIG. 22), that is, when the through-hole 104*m*, which is pierced with the body 119*a*, rotates in the direction α relative to the first to third cam holes 114*k*, 114*m* and 114*n* of the lock gear 114 about the first rotating shaft 104*d*, the body 119*a* and the boss portion 117*b* of the main pawl 117 move a little downwardly along and relative to the first cam hole 114*k*, as shown in FIG. 41A(*b*).

At the same time, the cam follower 117*f* moves a little downwardly by being guided by the third cam hole 114*n*. At this time, the boss portion 117*b* also moves a little leftwardly as viewed in the figure in accordance with the cam profile of the first cam hole 114*k*, and the cam follower 117*f* moves a little leftwardly in accordance with the cam profile of the third cam hole 114*n*. Since the amount of the leftward movement of the cam follower 117*f* is a little larger than that of the boss portion 117*b*, the main pawl 117 pivots a little in the direction β. Thus, the teeth 117*d* approach the teeth 102*f*.

Further, at the same time, the cam follower 119*c* moves downwardly by being guided by the second cam hole 114*m*. Since the cam follower 119*c* also moves rightwardly in accordance with the cam profile of the second cam hole 114*m*, the arm 119*b* pivots a little in the direction α about the body 119*a*. The pivoting motion of the arm 119*b* in the direction α causes the body 119*a* to rotate also a little in the direction α. However, since the reel shaft 104 also rotates in the direction α, the body 119*a* and the arm 119*b* do not substantially rotate relative to the reel shaft 104. Accordingly, the backup pawl 120 is held in the non-engaging position, as shown in FIG. 41A(*b*).

Referring next to FIG. 41A(*c*), when the reel shaft 104 further rotates in the direction α relative to the lock gear 114, the body 119*a* and the boss portion 117*b* further move downwardly and leftwardly along the first cam hole 114*k*. At the same time, the cam follower 117*f* further moves a little downwardly by being guided by the third cam hole 114*n*. Since the amount of the further leftward movement of the cam follower 117*f* is a little larger than that of the boss portion 117*b*, the main pawl 117 further pivots a little in the direction β, so that the teeth 117*d* further approach the teeth 102*f*.

Further, at the same time, the cam follower 119*c* further moves a little downwardly and leftwardly by being guided by the second cam hole 114*m*. At this time, since the cam follower 119*c* also moves a little downwardly and leftwardly in accordance with the cam profile of the second cam hole 114*m*, the arm 119*b* does not substantially pivot. However, since the reel shaft 104 further moves in the direction α, the body 119*a* and the arm 119*b* rotate in the direction β relative to the reel shaft 104. Thus, the backup pawl 120 pivots a little in the direction β relative to the reel shaft 104, so that the teeth 120*d* approach the teeth 102*g*.

Referring to FIG. 41A(*d*), when the reel shaft 104 further rotates in the direction α relative to the lock gear 114, the main pawl 117 further pivots a little in the direction β relative to the reel shaft 104 in the same way as the above, so that the teeth 117*d* further approach the teeth 102*f* to a substantial degree. Similarly, the backup pawl 120 further pivots a little in the direction β, so that the teeth 120*d* approach the teeth 102*g*.

Referring to FIG. 41B(*e*), when the reel shaft 104 further rotates in the direction α relative to the lock gear 114, the main pawl 117 and the backup pawl 120 further pivot in the direction β relative to the reel shaft 104 in the same way as the above. Accordingly, the teeth 117*d* move to a position where they are engageable with the teeth 102*f*. In addition, the backup pawl 120 further pivots a little in the direction β, so that the teeth 120*d* further approach the teeth 102*g* to a substantial degree.

As shown in FIG. 41B(*f*), when the reel shaft 104 further rotates in the direction α relative to the lock gear 114, the teeth 117*d* further approach the teeth 102*f* by a set amount. However, the teeth 117*d* will not approach the teeth 102*f* any further. When the reel shaft 104 further pivots in the direction α in this state, the tooth 117*d*₁ among the teeth 117*d* of the main pawl 117, which is the forefront when the main pawl 117 pivots in the direction α, comes in contact with the steep slope of a tooth 102*f*. This position of the main pawl 117 is the standby position where the teeth 117*d* of the main pawl 117 begin to engage with the teeth 102*f* of the right-hand side wall 102*a*. When the reel shaft 104 further rotates in the direction α after the tooth 117*d*₁ has come in contact with the steep slope of the tooth 102*f*, the tip of the tooth 117*d*₁ is guided toward the bottom of the tooth 102*f* by the steep slope of the tooth 102*f*, causing the main pawl 117 to pivot in the direction β.

Thus, when the reel shaft 104 further rotates in the direction α relative to the lock gear 114, the tips of the teeth 117*d* come in contact with the respective bottoms of the teeth 102*f*, so that the teeth 117*d* of the main pawl 117 are completely engaged with the teeth 102*f* of the right-hand side wall 102*a*, as shown in FIG. 41B(*g*). Thus, the main pawl 117 reaches the lock position. The motion of the main pawl 117 from the standby position to the lock position is not caused by the cam hole 114*n*, but realized by the guiding action of the steep slopes of the teeth 102*f*. With this motion, the main pawl 117 performs a self-lock action.

On the other hand, when the teeth 117*d* of the main pawl 117 become completely engaged with the teeth 102*f* of the right-hand side wall 102*a*, the backup pawl 120 assumes a position where the tooth 120*d*₁ among the teeth 120*d*, which is the forefront during pivoting in the direction α, is in contact with the steep slope of a tooth 102*g*. Thus, the backup pawl 120 reaches the standby position where the teeth 120*d* of the backup pawl 120 begin to engage with the teeth 102*g* of the left-hand side wall 102*b*.

As shown in FIG. 41B(*h*), when the reel shaft 104 further rotates in the direction α relative to the lock gear 114, the complete engagement between the teeth 117*d* and 102*f* is maintained. In the meantime, the backup pawl 120 performs a self-lock action similar to that of the main pawl 117 by being guided by the steep slopes of the teeth 102*g*. Thus, the backup pawl 120 becomes completely engaged with the teeth 102*g* of the left-hand side wall 102*b* to reach the lock position.

Thus, the engagement of the teeth 120*d* of the backup pawl 120 with the teeth 102*g* begins with a little delay with respect to the engagement of the teeth 117*d* of the main pawl 117 with the teeth 102*f*.

The following is a more specific description of the motions of the main pawl 117 and the lock gear 114 during the self-lock action of the main pawl 117 performed from the standby position, that is, the shift from the position shown in FIG. 41B(*f*) to the position shown in FIG. 41B(*g*), together with the cam profile of the third cam hole 114*n* and the configuration of the teeth 102*f* of the right-hand side wall 102*a* whereby the motions of the main pawl 117 and the lock gear 114 are realized.

FIGS. 42(*a*) and 42(*b*) are enlarged views of FIGS. 41B(I)(*f*) and 41B(I)(*g*), respectively.

First, the cam profile of the third cam hole 114*n* for controlling the pivoting of the main pawl 117 when the reel shaft 104 rotates in the direction α relative to the lock gear 114 will be explained. In the non-engaging position of the main pawl 117, shown in FIG. 41A(a), the cam follower 117f is at the uppermost end position in the third cam hole 114n. The cam profile of the third cam hole 114n is designed so that when the reel shaft 104 rotates in the direction α relative to the lock gear 114, the cam follower 117f lowers from the uppermost end position in the third cam hole 114n by being guided by the first guide cam surface 114n₁ of the third cam hole 114n, causing the main pawl 117 to pivot in the direction β until it reaches the standby position, shown in FIG. 42(a), thereby allowing the teeth 117d to approach the teeth 102f of the right-hand side wall 102a.

Figure 42B:
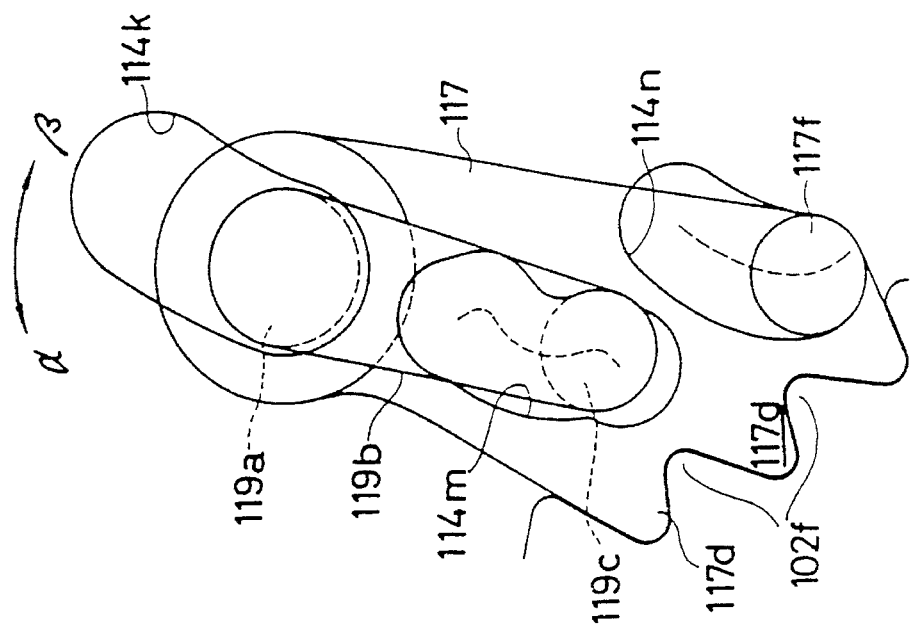
Figure 42A:
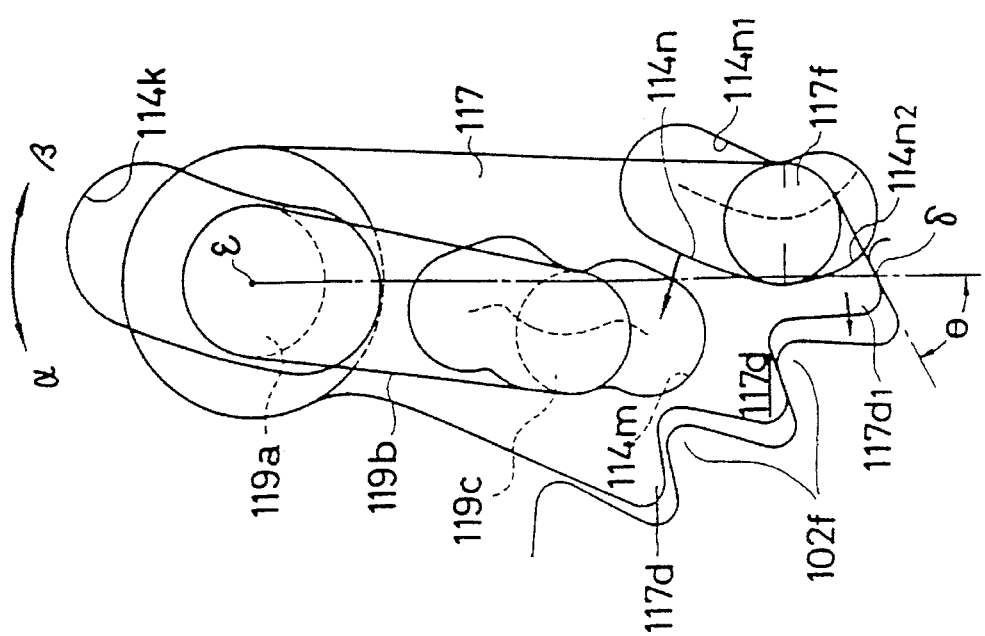

Further, the cam profile of the third cam hole 114n is designed so that when the cam follower 117f has reached the position in the third cam hole 114n that is shown in FIG. 42(a), the third cam hole 114n does not guide the cam follower 117f any longer even if the reel shaft 104 rotates in the direction α relative to the lock gear 114. With the above-described cam profile, the third cam hole 114n does not allow the tips of the teeth 117d to reach the bottoms of the teeth 102f.

When the main pawl 117 shifts from the standby position, shown in FIG. 42(a), to the lock position, that is, the completely engaged position, shown in FIG. 42(b), the main pawl 117 performs the self-lock action by virtue of the guiding action of the steep slopes of the teeth 102f, as described above. For this self-lock action, the cam profile of the third cam hole 114n is designed so that the cam follower 117f causes the lock gear 114 (represented by the first to third cam holes 114k, 114m and 114n in FIG. 42) to rotate a little reversely in the direction β through the second guide cam surface 114n₂ of the third cam hole 114n. By virtue of the above-described cam profile, when the main pawl 117 becomes completely engaged with the teeth 102f, the pawl 107i of the lever 107b in the deceleration sensing means 107 can be disengaged from the tooth 114c of the lock gear 114. Accordingly, it is possible to prevent occurrence of end lock.

Thus, the third cam hole 114n comprises a control portion for controlling the action of the main pawl 117, which is comprised of the first guide cam surface 114n₁ that guides the cam follower 117f from the non-engaging position at the upper end of the cam hole 114n, shown in FIG. 41A(a), to the standby position, shown in FIG. 41B(f), and a control portion for controlling the reverse rotation of the lock gear 114, which is comprised of the second guide cam surface 114n₂ that transfers operating force from the cam follower 117f to the lock gear 114 when the cam follower 117f shifts from the standby position, shown in FIG. 41B(f), to the lock position, shown in FIG. 41B(g), thereby causing the lock gear 114 to rotate reversely in the webbing winding direction.

On the other hand, the steep slopes of the teeth 102f of the right-hand side wall 102a have a slope angle θ [angle of the steep slope of each tooth 102f to an imaginary straight line γ connecting together a contact portion δ of the steep slope of the tooth 102f, which is in contact with the tooth 117d₁, and the center ε of pivoting motion of the main pawl 117, as shown in FIG. 42(a)] set so that the main pawl 117 can perform a self-lock action from the standby position, shown in FIG. 42(a), to the completely engaged position, shown in FIG. 42(b).

Similarly, the steep slopes of the teeth 102g of the left-hand side wall 102b have a slope angle set so that the backup pawl 120 can perform a self-lock action.

The following is a description of the cam profile of the second cam hole 114m for controlling the pivoting motion of the backup pawl 120 when the reel shaft 104 rotates in the direction α relative to the lock gear 114.

The cam profile of the second cam hole 114m is designed so that the backup pawl 120 performs an action similar to that of the main pawl 117 with a delay with respect to the action of the main pawl 117, as shown in FIGS. 41A and 41B. Particularly, the cam profile of the second cam hole 114m is designed so that when the main pawl 117 shifts from the standby position, shown in FIG. 41B(f), to the lock position, shown in FIG. 41B(g), that is, when the main pawl 117 reaches the lock position by performing a self-lock action, the backup pawl 120 reaches the standby position, as shown in FIG. 41B(g).

By virtue of the cam profile of the second cam hole 114m, the teeth 117d of the main pawl 117 first become completely engaged with the teeth 102f of the right-hand side wall 102a, and at this time the backup pawl 120 is set in the standby position. Thereafter, with a little delay, the backup pawl 120 reaches the lock position where the teeth 120d thereof are completely engaged with the teeth 102g of the left-hand side wall 102b. Accordingly, after the teeth 117d of the main pawl 117 have become completely engaged with the teeth 102f, the teeth 120d become completely engaged with the teeth 102g with a little delay. Therefore, at least either the engagement between the main pawl 117 and the teeth 102f or the engagement between the backup pawl 120 and the teeth 102g is surely made without an engagement failure.

Next, the operation of the seat belt retractor in this embodiment, arranged as described above, will be explained.

[Normal state where no deceleration exceeding a predetermined value acts on the vehicle]

In this state, the inertia member 107c of the deceleration sensing means 107 does not tilt forwardly. Therefore, the lever 107b is held in the solid-line position as shown in FIG. 2, and the pawl 107i is placed in the non-engaging position, which is apart from the teeth 114c of the lock gear 114. Similarly, the pawl 115c of the inertia member 115, the main pawl 117 and the backup pawl 120 are held in the respective non-engaging positions, as shown in FIGS. 17 and 19.

Accordingly, in this state the seat belt retractor 101 mainly performs an operation based on the action of the biasing force application means 105. That is, the reel shaft 104 is biased in the webbing winding direction β by the spring force of the power spring 108 so as to wind up the webbing 103.

(When the seat belt is not fastened to the occupant's body)

In this state, a tongue (not shown), which is attached to the webbing 103, is separate from a buckle member (not shown). Accordingly, the webbing 103 has been wound up by the spring force of the power spring 108, as described above.

(When the webbing is unwound)

When the occupant unwinds the webbing 103 in order to fasten it to his/her body, the reel shaft 104 and the bush 109 rotate in the webbing unwinding direction α in response to the unwinding of the webbing 103. Consequently, the power spring 108 is gradually wound up.

(When the occupant takes his/her hand off the webbing after connecting together the tongue and the buckle member)

At the time when the occupant connects together the tongue and the buckle member, the webbing 103 has been unwound in excess of the length of the webbing 103 unwound when the occupant has it fastened to his/her body in a normal state. Therefore, when the occupant takes his/her hand off the webbing 103 after connecting together the tongue and the buckle member, the webbing 103 is wound up by the spring force of the power spring 108 until it fits to the occupant's body. The spring force of the power spring 108 is properly determined in advance so that the webbing 103 will not give a sensation of pressure to the occupant. During the running of the vehicle, the seat belt retractor 101 maintains this state unless deceleration exceeding a predetermined value acts on the vehicle.

[When deceleration exceeding a predetermined value acts on the vehicle]

When deceleration exceeding a predetermined value acts on the vehicle during the running due to a sudden braking operation or other emergency operation, both the seat belt lock activating means 106 and the deceleration sensing means 107 operate. As a first stage of the operation, the inertia member 107c of the deceleration sensing means 107 moves forwardly (the position shown by the two-dot chain line in FIG. 17) by inertia, so that the lever 107b pivots upwardly to reach the position shown by the two-dot chain line in FIG. 17. Consequently, the pawl 107i of the lever 107b assumes an engageable position where it is engageable with a tooth 114c of the lock gear 114. In the meantime, the occupant's body is urged to move forwardly by the deceleration acting on the vehicle to a degree higher than a predetermined value, thus causing the webbing 103 to be unwound. The unwinding of the webbing 103 causes both the reel shaft 104 and the lock gear 114 to rotate in the unwinding direction $\alpha$.

However, since a tooth 114c of the lock gear 114 engages with the pawl 107i immediately, the lock gear 114 is immediately stopped from rotating in the unwinding direction $\alpha$. As a result, the reel shaft 104 alone continuously rotates in the unwinding direction $\alpha$. Thus, the reel shaft 104 rotates in the direction $\alpha$ relative to the lock gear 114.

The relative rotation of the reel shaft 104 in the direction $\alpha$ causes the main pawl 117 to pivot in the direction $\beta$ relative to the reel shaft 104 and to engage with the teeth 102f to thereby reach the lock position, as a second stage of the operation, as shown in FIGS. 41A and 41B. At this time, when the main pawl 117 shifts from the standby position to the lock position, the lock gear 114 rotates a little reversely in the webbing winding direction $\beta$. When the main pawl 117 reaches the lock position, the backup pawl 120 reaches the standby position. Thereafter, with a little delay, the backup pawl 120 engages with the teeth 102g to reach the lock position.

Thus, the reel shaft 104 is locked from rotating in the webbing unwinding direction $\alpha$.

As a result, unwinding of the webbing 103, which would otherwise be caused by the inertial forward movement of the occupant's body, is surely prevented. Thus, the occupant's body is reliably restrained and protected. Further, at this time, the lock gear 114 rotates a little reversely in the webbing winding direction $\beta$, causing the pawl 107i of the deceleration sensing means 107 to disengage from the tooth 114c of the lock gear 114, thus bringing the lock gear 114 into a free state. Therefore, the reel shaft 104 can rewind the webbing 103 with ease.

[When unwinding force suddenly acts on the webbing]

When such a situation occurs, the webbing 103 is suddenly unwound, so that the reel shaft 104, the lock gear 114 and the inertia member 115 are suddenly urged to rotate in the webbing unwinding direction $\alpha$. However, since the spring force of the control spring 116 is not so strong, the control spring 116 contracts, so that the inertia member 115 has an inertia delay. That is, the inertia member 115 not only revolves in the webbing unwinding direction $\alpha$ together with the lock gear 114 but also rotates in the direction $\beta$ relative to the lock gear 114.

The rotation of the inertia member 115 causes the pawl 115c to move to the engageable position, where it abuts on the second stopper 114i, and engage with a tooth 113c of the lock gear first cover 113, as shown by the two-dot chain line in FIG. 17. Consequently, the revolution of the inertia member 115 and the rotation of the lock gear 114 in the webbing unwinding direction $\alpha$ are stopped. Accordingly, the reel shaft 104 alone rotates in the webbing unwinding direction $\alpha$. Thus, the reel shaft 104 rotates in the direction $\alpha$ relative to the lock gear 114, as described above.

The relative rotation of the reel shaft 104 in the direction $\alpha$ causes the main pawl 117 to pivot and engage with the teeth 102f, and thereafter, with a little delay, the backup pawl 120 engages with the teeth 102f, in the same way as the above. Thus, the reel shaft 104 is locked from rotating in the webbing unwinding direction $\alpha$. As a result, unwinding of the webbing 103, which would otherwise be caused by the inertial forward movement of the occupant's body, is surely prevented. Thus, the occupant's body is reliably restrained and protected.

In this case also, the lock gear 114 rotates a little reversely in the webbing winding direction $\beta$, causing the pawl 115c of the inertia member 115 to disengage from the tooth 113c of the lock gear first cover 113, thus bringing the lock gear 114 into a free state. Therefore, the reel shaft 104 can rewind the webbing 103 with ease.

Figure 43:
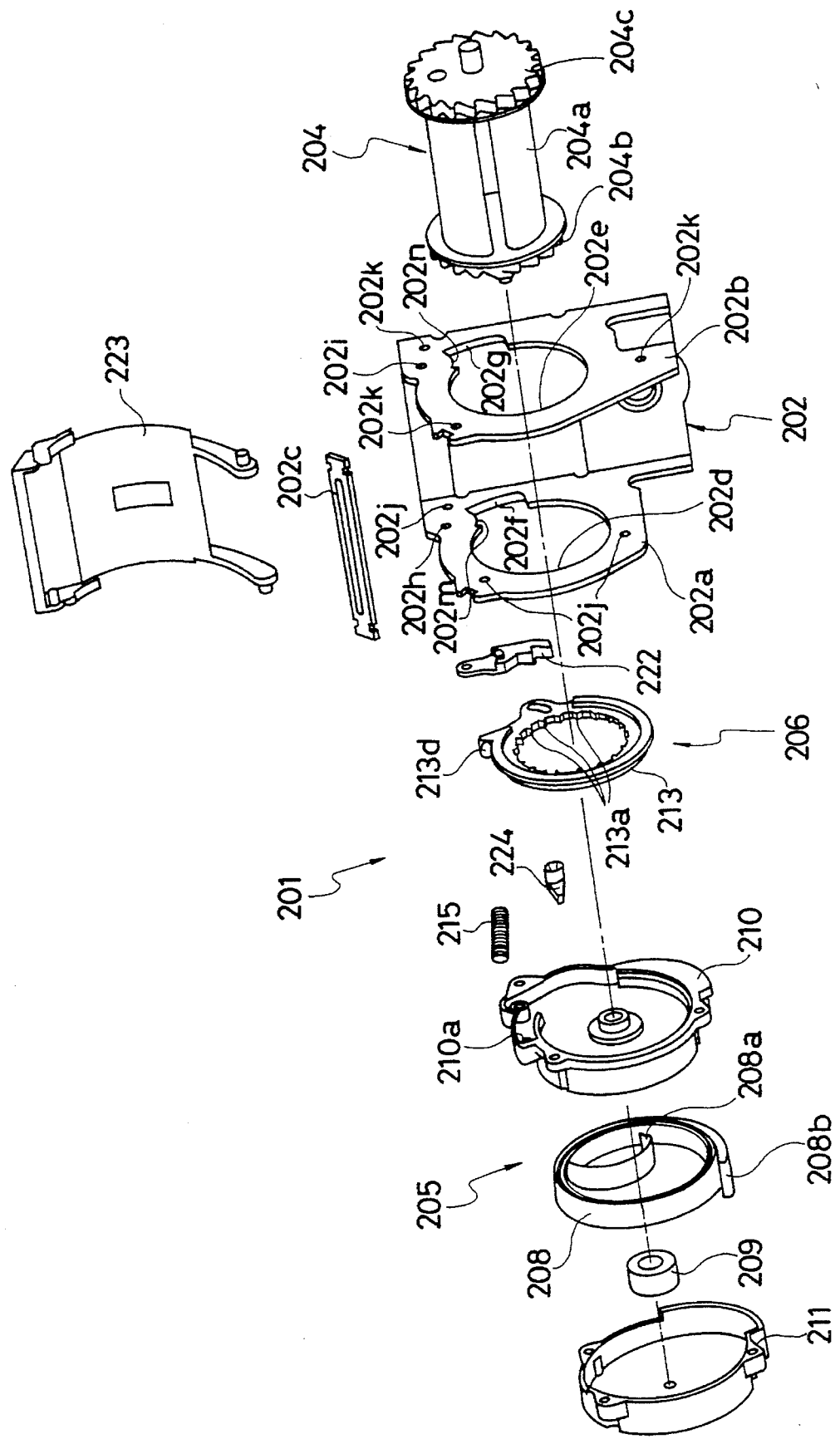
FIG. 43A is an exploded perspective view of a left-hand portion of still another embodiment of the seat belt retractor according to the present invention.
FIG. 43B is an exploded perspective view of a right-hand portion of the third embodiment of the seat belt retractor according to the present invention.
Figure 43:
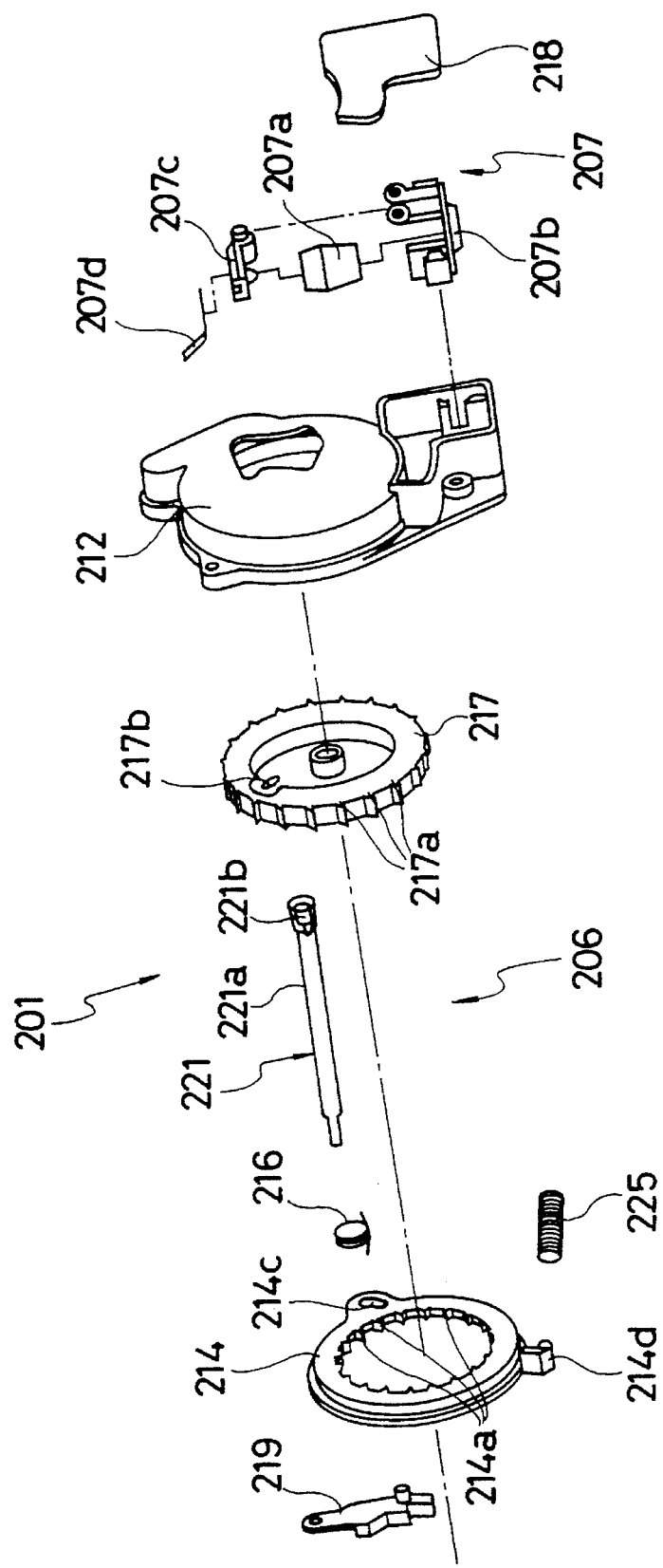

FIGS. 43A and 43B are exploded perspective views showing still another embodiment of the present invention. An exploded perspective view showing the whole of the embodiment is formed by placing FIG. 43B at the right-hand side of FIG. 43A and aligning them together.

In both the above-described embodiments, the reel shaft is prevented from rotating in the webbing unwinding direction by engaging, the pawls, which are provided on the reel shaft, with the teeth formed on the frame. In contrast, this embodiment is arranged such that pawls which are provided on the frame are engaged with teeth formed of the reel shaft to thereby prevent rotation of the reel shaft in the webbing unwinding direction.

Many of the constituent elements of this embodiment are similar to those of the foregoing embodiments. Therefore, such constituent elements will be explained briefly by using reference numerals: In FIGS. 43A and 43B, reference numeral 201 denotes a seat belt retractor; 202, a frame; 202a and 202b, a pair of left- and right-hand side walls; 202c, a connecting member; 203, a webbing; 204, a reel shaft; 204d and 204e, teeth; 205, a biasing force application means; 206, a seat belt lock activating means; 207, a deceleration sensing means; 208, a spiral spring; 209, a bush; 210, a retainer; 211, a cover; 212, a retainer; 213 and 214, lock rings; 215 and 216, springs; 217, a ring gear; 219, a main pawl; 221, a joint pin; 222, a backup pawl; 223, a webbing guide; 224, a pawl; and 225, a spring.

As shown in FIGS. 43A and 43B, the left- and right-hand side walls 202a and 202b of the frame 202 are respectively formed with circular holes 202d and 202e, grooves 202f and 202g for receiving the respective pawls, and holes 202h and 202i for pivotably supporting the respective pawls. Further, the left-hand side wall 202a is formed with a hole 202j for mounting the biasing force application means 205, while the right-hand side wall 202b is formed with a hole 202k for mounting the retainer 212.

Figure 45:
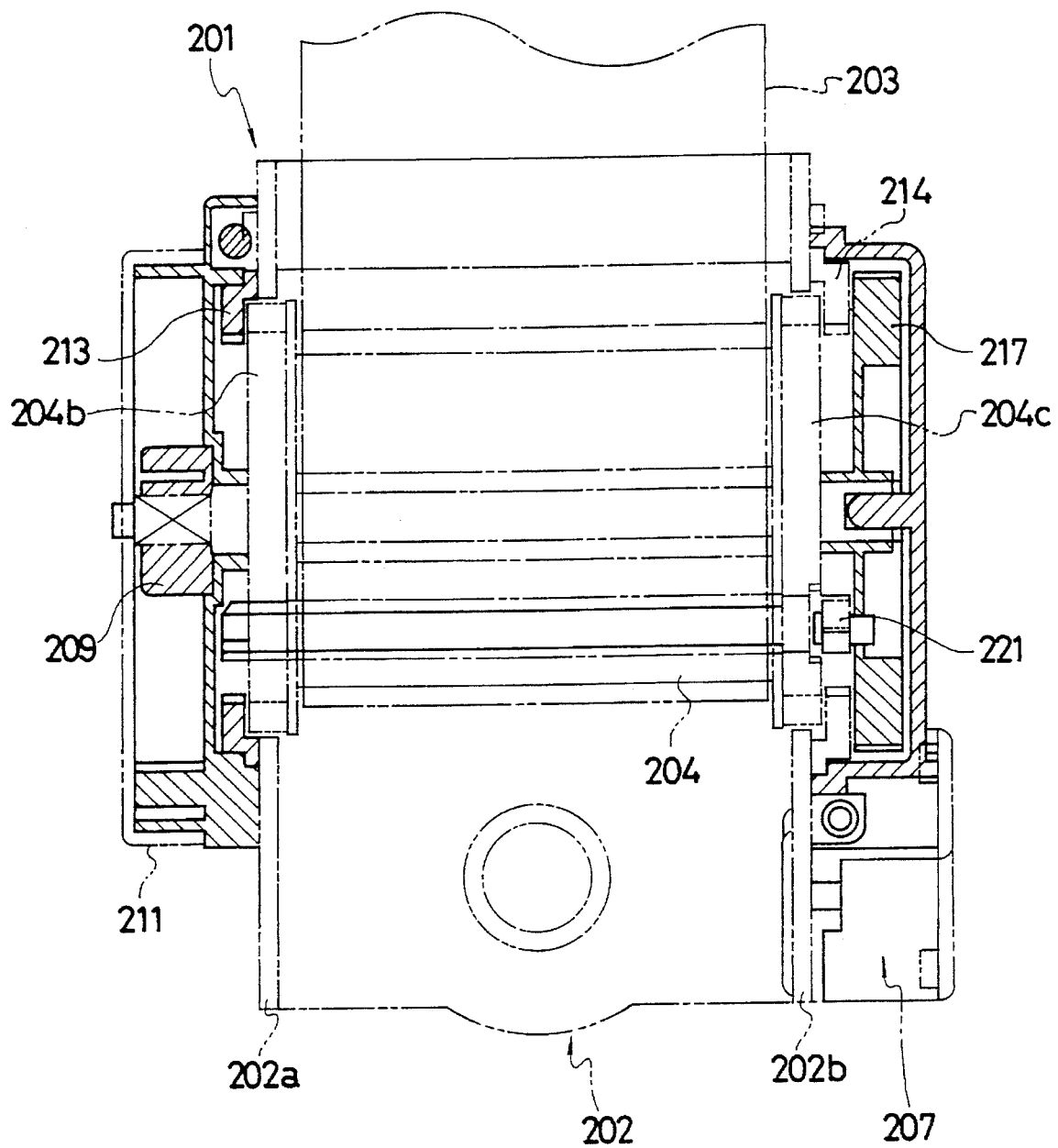
FIG. 45 is a front view of the seat belt retractor of the third embodiment in the assembled state.

As shown in FIG. 45, the reel shaft 204 for wining up the webbing 203 is disposed in between the left- and right-hand side walls 202a and 202b of the frame 202. As will be clear from FIG. 43A, the reel shaft 204 comprises a take-up portion 204a for winding up the webbing 203, and a pair of flanges 204b and 204c formed at the left and right ends, respectively, of the take-up portion 204a so as to guide the webbing 203 when wound up.

Figure 47B:
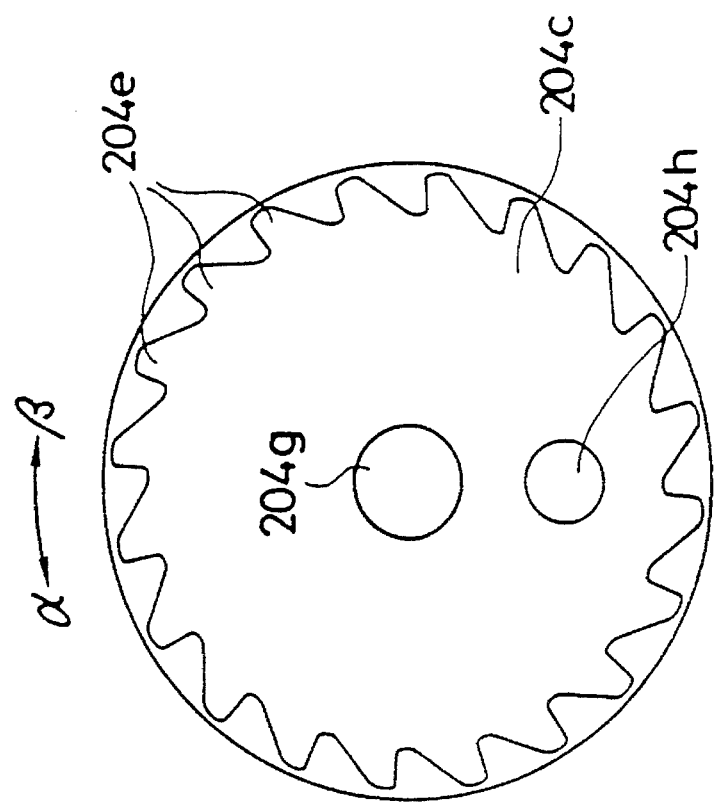
Figure 47A:
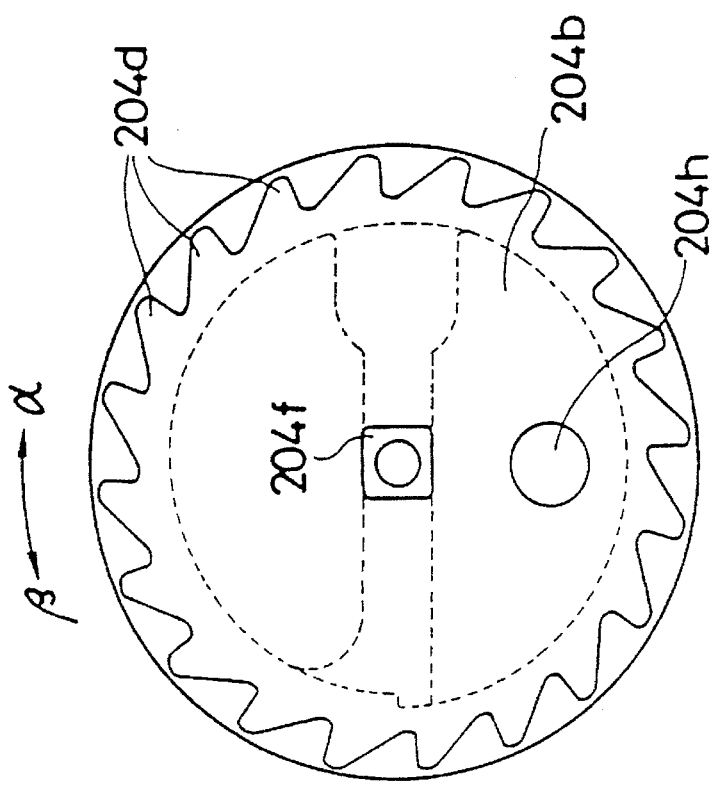

As shown in FIGS. 47(a) and 47(b), ratchet wheels are formed on the respective outer sides of the left and right flanges 204b and 204c. Teeth 204d and 204e of the ratchet wheels each have a triangular cross-sectional configuration in which the surface of each tooth that faces a direction α in which the webbing 203 is unwound is a relatively gentle slope, whereas the surface that faces a direction β for winding up the webbing 203 is a relatively steep slope. Further, a first rotating shaft 204f is formed in the center of the left flange 204b, and a second rotating shaft 204g is formed in the center of the right flange 204c. In addition, the reel shaft 204 is formed with an axial through-hole 204h which is pierced with the joint pin 221 (described later).

The spiral spring 208 of the biasing force application means 205 is disposed between the bush 209 and the retainer 210 so that the spring force from the spring 208 is applied to the bush 209. The bush 209 is fitted to the first rotating shaft 204f so as to be unable to rotate relative to it.

Figure 48B:
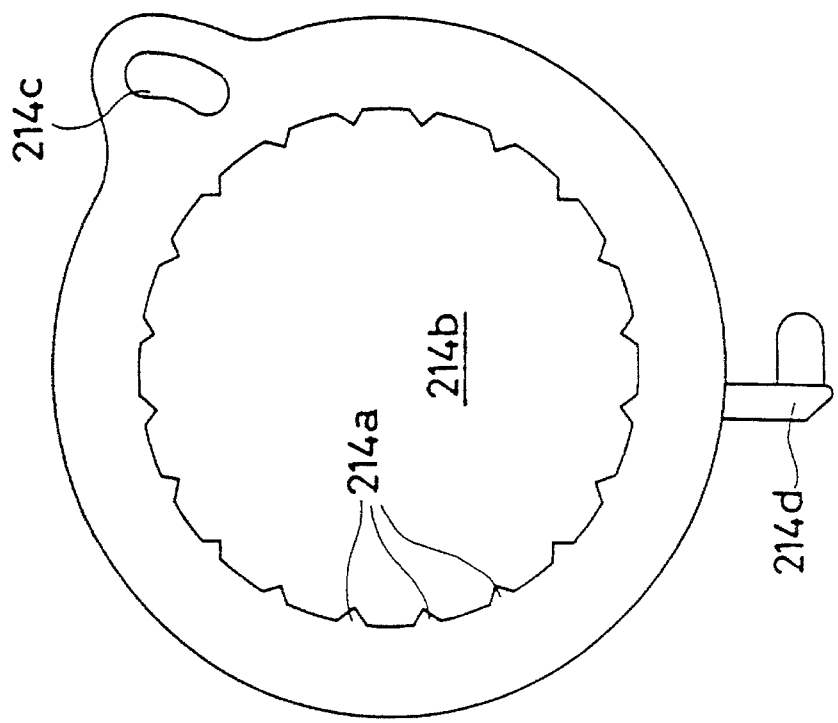
Figure 48A:
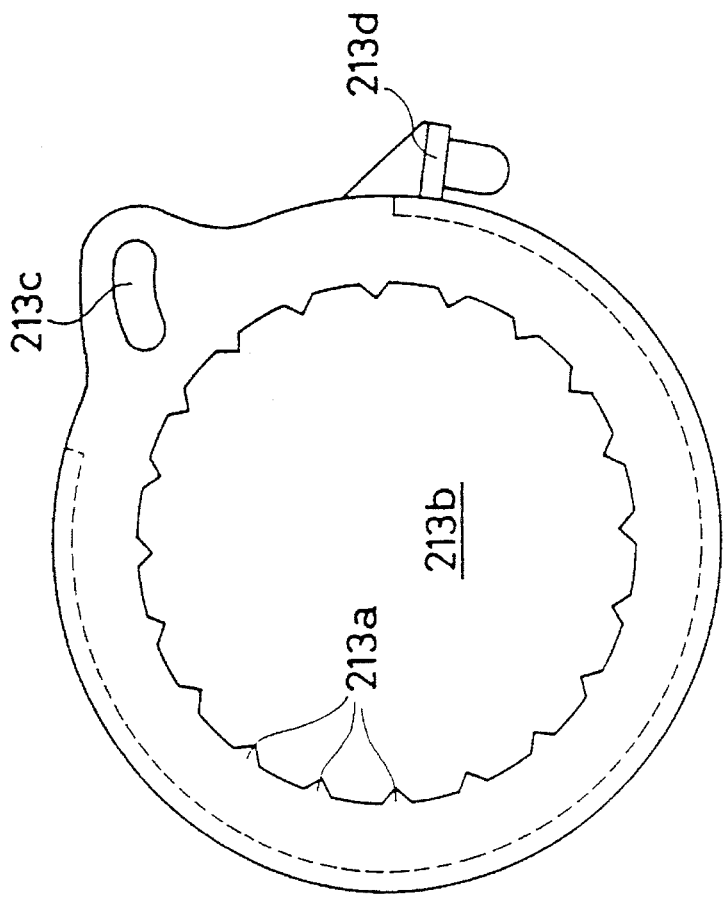

As shown in FIGS. 48(a) and 48(b), the left and right lock rings 213 and 214 in the seat belt lock activating means 206 are respectively provided with relatively large circular holes 213b and 214b having a predetermined number of teeth 213a and 214a formed on the respective inner peripheral surfaces, cam holes 213c and 214c, and spring retaining portions 213d and 214d for each retaining one end of a return spring (described later).

Figures 49A, 49B:
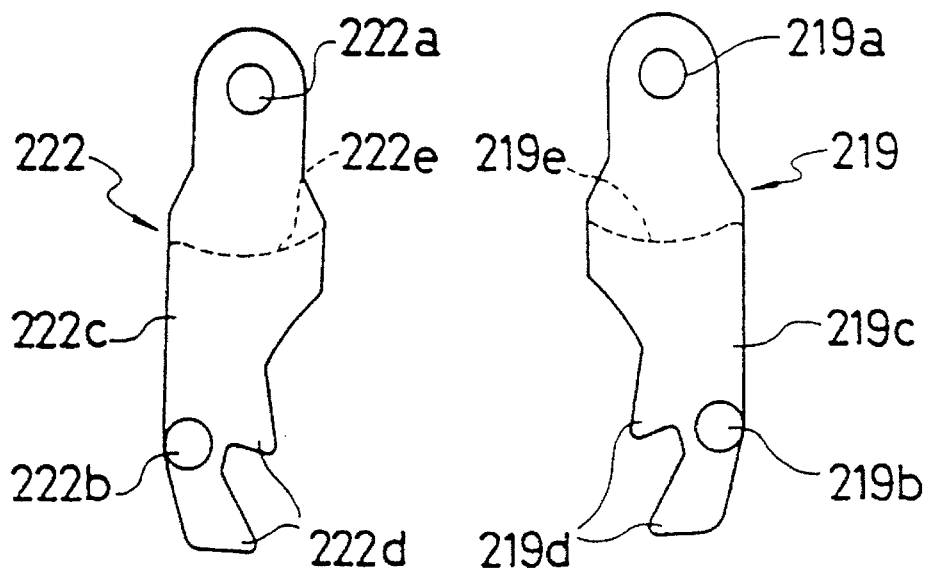

As shown in FIGS. 49(a) and 49(b), the upper end portions of the backup pawl 222 and the main pawl 219 are respectively provided with holes 222a and 219a for receiving pivot shafts for these pawls. The lower end portions of the backup pawl 222 and the main pawl 219 are respectively provided with columnar projections 222b and 219b which are fitted in the respective cam holes 213c and 214c of the lock rings 213 and 214 so as to be guided by these cam holes 213c and 214c. The lower-half portions of the backup pawl 222 and the main pawl 219 are defined as engagement portions 222c and 219c. The engagement portions 222c and 219c are formed with pawl portions 222d and 219d, respectively. The upper end portions of the pawls 222 and 219 are cut at the sides thereof where the pivot shafts 222a and 219a are provided so that these upper end portions are thinner in the wall thickness than the engagement portions 222c and 219c. Thus, steps 222e and 219e, which are in the form of circular arcs centered at the pivot shafts 222a and 219a, respectively, are formed between the thin-walled portions on the one hand and the engagement portions 222c and 219c on the other.

The backup and main pawls 222 and 219 are pivotably attached to the frame 202 by fitting the pivot shafts 222a and 219a into the respective holes 202h and 202i of the left- and right-hand side walls 202a and 202b. When the pawls 22 and 219 are attached in position, the engagement portions 222c and 219c are disposed in the grooves 202f and 202g, respectively, with the steps 222e and 219e being in slidable contact with respective arcuate frame edge portions 202m and 202n (shown in FIG. 43A) which define the grooves 202f and 202g. The backup and main pawls 222 and 219 are each selectively set in two positions, that is, an engageable position where the pawl portions 222d and 219d are engageable with teeth 204d and 204e of the reel shaft 204, and a non-engaging position where the pawl portions 222d and 219d do not engage with the teeth 204d and 204e.

Figure 46:
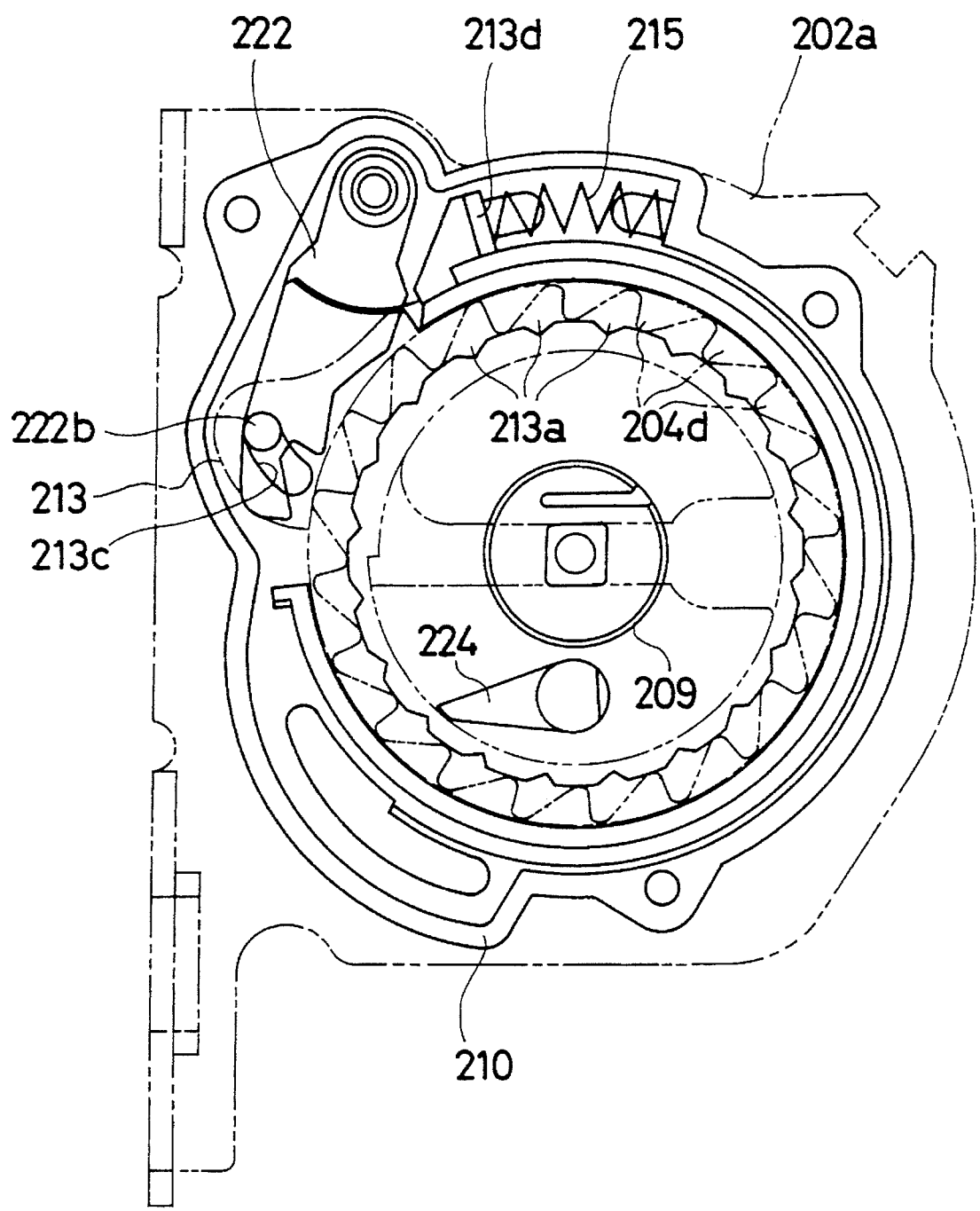
FIG. 46 is a side view of the seat belt retractor of the third embodiment in the assembled state, as seen from the left-hand side thereof, with the cover removed therefrom.

As shown in FIG. 43A, the spring 215 is compressedly loaded in between the spring retaining portion 210a of the retainer 210 and the spring retaining portion 213d of the lock ring 213, so that the lock ring 213 is constantly biased in the direction β for winding up the webbing 203, as viewed in FIG. 46, by the spring force from the spring 215. Accordingly, under normal circumstances the lock ring 213 holds the backup pawl 222 in the non-engaging position.

Figure 44:
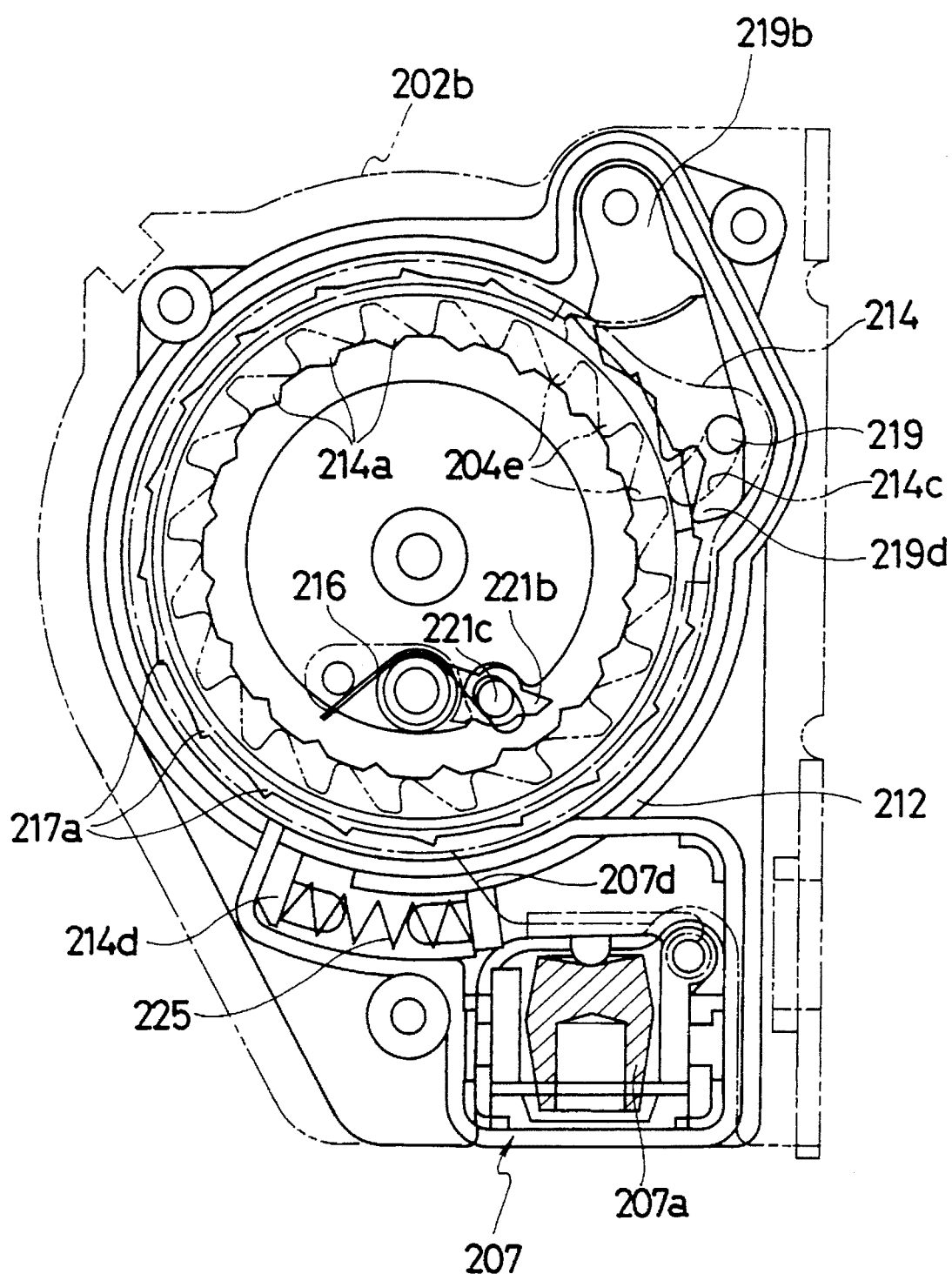
FIG. 44 is a side view of the seat belt retractor of the third embodiment in an assembled state, as seen from the right-hand side thereof, with a cover removed therefrom.

Similarly, the spring 225 is compressedly loaded in between the spring retaining portion 212a (shown in FIG. 44) of the retainer 212 and the spring retaining portion 214d of the lock ring 214, as shown in FIG. 43B, so that the lock ring 214 is constantly biased in the webbing winding direction β, as viewed in FIG. 44, by the spring force from the spring 225. Accordingly, under normal circumstances the lock ring 214 holds the main pawl 219 in the non-engaging position.

Figure 50:
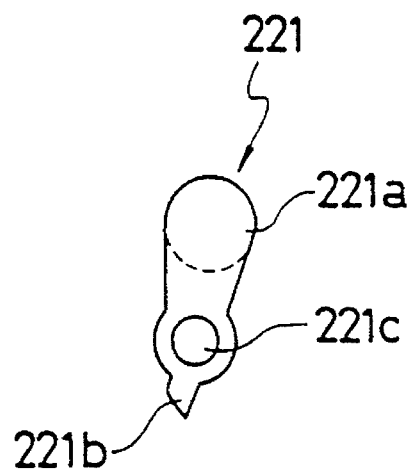
FIG. 50 shows a pawl member employed in the third embodiment.

The joint pin 221 comprises a shaft portion 221a and a pawl 221b formed at the right end (as viewed in FIG. 43B) of the shaft portion 221a. As shown in FIG. 50, the pawl 221b is provided with a columnar projection 221c. The joint pin 221 extends through the through-hole 204h of the reel shaft 204, and the projection 221c is fitted into the cam hole 217b of the lock gear 217, described later. The pawl 221b is engageable with a tooth 214a of the lock ring 214. The joint pin 221 is constantly biased by the spring 216 toward a non-engaging position where the pawl 221b does not engage with a tooth 214a of the lock ring 214. Accordingly, under normal circumstances, the pawl 221b is held in the non-engaging position.

The pawl 224 is attached to the other end of the joint pin 221, which extends through the through-hole 204h of the reel shaft 204, such that the pawl 224 is unable to rotate relative to the joint pin 221. The pawl 224 is engageable with a tooth 213a of the lock ring 213. The pawl 224 is also held in the non-engaging position under normal circumstances.

The lock gear 217 has a predetermined number of teeth 217a formed on the outer peripheral surface thereof. The lock gear 217 is further formed with a cam hole 217b. A pawl 207d of an actuator 207 provided in the deceleration sensing means 207 is engageable with a tooth 217a, as described later. The cam hole 217b guides the projection 221c of the pawl 221b that is fitted therein. The cam hole 217b is so designed that when the reel shaft 204 rotates in the webbing unwinding direction α relative to the lock gear 217, the pawl 221b pivots from the non-engaging position to the engageable position with respect to the teeth 214a of the lock ring 214.

Next, the operations of the main pawl 219 and the backup pawl 222 will be explained in detail with reference to FIG. 51(I)(a) to 51(I)(d) and FIG. 5(II)(a) to 51(II)(d). It should be noted that the part (I) of each of these figures schematically shows the operation of the main pawl 219, whereas the part (II) of each of these figures schematically shows the operation of the backup pawl 222. Below these figures will be referred to as, for example, FIG. 51(a), when discussing both the corresponding upper part (I), for example, FIG. 51(I)(a), and the corresponding lower part (II), for example, FIG. 51(II)(a).

Since the lock ring 214 is biased in the webbing winding direction β by the spring force from the spring 225, under normal circumstances the projection 219b lies in the upper end of the cam hole 214c, so that the main pawl 219 is held in the non-engaging position, as shown in FIG. 51(a). Similarly, the projection 222b lies in the upper end of the cam hole 213c, so that the backup pawl 222 is held in the non-engaging position.

When the reel shaft 204 rotates in the webbing unwinding direction α relative to the lock gear 217, the projection 221c of the pawl 221b moves by being guided along the cam hole 217b of the lock gear 217. The movement of the projection 221c causes the pawl 221b to pivot and engage with a tooth 214a of the lock ring 214. The pivoting motion of the pawl 221b causes the pawl 224 to pivot through the joint pin 221. Thus, the pawl 224 also engages with a tooth 213a of the lock ring 213.

When the reel shaft 204 further rotates in the webbing unwinding direction α relative to the lock gear 217 in this state, the lock rings 213 and 214 also rotate in the same direction α. The rotation of the lock rings 213 and 214 causes the projections 219b and 222b to move along the respective cam holes 214c and 213c, as shown in FIG. 51(b). In response to the movement of the projections 219b and 222b, the main pawl 219 pivots toward the teeth 204e, and the backup pawl 222 also pivots toward the teeth 204d, as shown in FIG. 51(b).

When the reel shaft 204 further rotates in the direction α relative to the lock gear 217, the lock rings 213 and 214 also rotate further in the same direction α. Accordingly, the projections 219b and 222b further move by being guided along the respective cam holes 214c and 213c, as shown in FIG. 51(c). Thus, the main pawl 219 and the backup pawl 222 further pivot toward the respective teeth 204e and 204d, so that the pawl portions 219d and 222d of the pawls 219 and 222 begin to engage with teeth 204e and 204d of the reel shaft 204.

When the reel shaft 204 further rotates in the direction α relative to the lock gear 217 and the lock rings 213 and 214 also further rotate in the same direction α, the projections 219b and 222b further move by being guided along the respective cam holes 214c and 213c to reach the lower ends of the cam holes 214c and 213c, as shown in FIG. 51(d). In this state, both the main pawl 219 and the backup pawl 222 are completely engaged with the teeth 204e and 204d. Thus, the reel shaft 204 is stopped from rotating further in the direction α relative to the lock gear 217. Accordingly, the pull-out of the webbing 203 is prevented. In this case, counterforces that are applied to the main and backup pawls 219 and 222 from the reel shaft 204 are transferred to the arcuate frame edge portions 202m and 202n from the steps 219e and 222e, and hence surely borne by the frame 202. Accordingly, substantially no counterforce is transferred to the pivot shafts of the pawls 219 and 222. Therefore, the strength required for the pivot shafts is relatively low.

The deceleration sensing means 207 comprises, as shown in FIG. 43B, an inertia member 207a, a support 207b for supporting the inertia member 207a, an actuator 207 that is attached to the support 207b so as to be pivotable through the movement of the inertia member 207a, and a pawl 207d that is attached to the actuator 207c.

As shown in FIG. 44, the inertia member 207a is mounted on the support 207b. Under normal circumstances, the inertia member 207a is held in an erect position. However, when deceleration exceeding a predetermined value acts on the vehicle, the inertia member 207a tilts forwardly. In response to the tilting of the inertia member 207a, the actuator 207c pivots upwardly, causing the pawl 207d to engage with a tooth 217a of the lock gear 217.

Next, the operation of the seat belt retractor in this embodiment, arranged as described above, will be explained.

[Normal state where no deceleration exceeding a predetermined value acts on the vehicle]

In this state, the inertia member 207a of the deceleration sensing means 207 does not tilt. Therefore, the actuator 207c is held in the non-activating position, and the pawl 207d is in the non-engaging position with respect to the teeth 217a. Accordingly, the lock gear 217 is rotatable. Similarly, the pawl 221b, the main pawl 219 and the backup pawl 222 are held in the respective non-engaging positions, as shown in FIGS. 44 and 46.

Accordingly, in this state the seat belt retractor 1 mainly performs an operation based on the action of the biasing force application means 205. That is, the reel shaft 204 is biased in the webbing winding direction β by the spring force of the spiral spring 208 so as to wind up the webbing 203.

(When the seat belt is not fastened to the occupant's body)

In this state, a tongue (not shown), which is attached to the webbing 203, is separate from a buckle member (not shown). Accordingly, the webbing 203 has been wound up by the spring force of the spiral spring 208, as described above.

(When the webbing is unwound)

When the occupant unwinds the webbing 203 in order to fasten it to his/her body, the reel shaft 204 and the bush 209 rotate in the webbing unwinding direction α in response to the unwinding of the webbing 203. Consequently, the spiral spring 208 is gradually wound up.

(When the occupant takes his/her hand off the webbing after connecting together the tongue and the buckle member)

At the time when the occupant connects together the tongue and the buckle member, the webbing 203 has been unwound in excess of the length of the webbing 203 unwound when the occupant has it fastened to his/her body in a normal state. Therefore, when the occupant takes his/her hand off the webbing 203 after connecting together the tongue and the buckle member, the webbing 203 is wound up by the spring force of the spiral spring 208 until it fits to the occupant's body. During the running of the vehicle, the seat belt retractor 1 maintains this state unless deceleration exceeding a predetermined value acts on the vehicle.

[When deceleration exceeding a predetermined value acts on the vehicle]

When deceleration exceeding a predetermined value acts on the vehicle during the running due to a sudden braking operation or other emergency operation, both the seat belt lock activating means 206 and the deceleration sensing means 207 operate. As a first stage of the operation, the inertia member 207a of the deceleration sensing means 207 tilts forwardly (leftwardly as viewed in FIG. 44) by the deceleration, so that the actuator 207c pivots upwardly. Consequently, the pawl 207d assumes the engageable position. In the meantime, the occupant's body is urged to move forwardly by the inertia, thus causing the webbing 203 to be unwound. The unwinding of the webbing 203 causes both the reel shaft 204 and the lock gear 217 to rotate in the unwinding direction α.

However, since a tooth 207a of the lock gear 217 engages with the pawl 207d immediately, the lock gear 217 is immediately stopped from rotating in the unwinding direction α. As a result, the reel shaft 204 alone continuously rotates in the unwinding direction α. Thus, the reel shaft 204 rotates in the direction α relative to the lock gear 217.

In response to the rotation of the reel shaft 204 relative to the lock gear 217, the pawls 221b and 224 engage with teeth 214a and 213a of the lock rings 214 and 213, causing the lock rings 214 and 213 to rotate in the direction α, as a second stage of the operation. Consequently, the main pawl 219 and the backup pawl 222 pivot to engage with teeth 204e and 204d of the reel shaft 204. Thus, the reel shaft 204 is locked from rotating in the webbing unwinding direction α. As a result, unwinding of the webbing 203, which would otherwise be caused by the inertial forward movement of the occupant's body, is surely prevented. Thus, the occupant's body is reliably restrained and protected.

It should be noted that the present invention is not necessarily limited to the above-described embodiments and that various changes and modifications may be imparted thereto. For example, although in the foregoing embodiments the biasing force application means 105 is not provided with a comfort device, the present invention may also be applied to a seat belt retractor that is provided with a comfort device.

Further, although in the foregoing embodiments the present invention has been described by way of an example in which it is applied to a seat belt retractor wherein tension is applied to the webbing by a biasing force application means, the present invention may also be applied to a tensionless seat belt retractor.

As will be clear from the foregoing description, according to the seat belt retractor of the present invention, both the engagement between the first engagement portion and the first engagement member and the engagement between the second engagement portion and the second engagement member are reliably made by the lock control means. Therefore, the rotation of the reel shaft in the webbing unwinding direction can be surely prevented at both sides of the reel shaft. Accordingly, the reliability of the seat belt retractor can be improved.

In addition, according to the present invention, there is no stress concentration, which would otherwise occur when the engagement is effected only at one side. Therefore, stress that is produced by the engagement is extremely small. Accordingly, it is unnecessary to increase the thickness of the frame to a substantial degree. In addition, the reel shaft can also be reduced in size. Thus, the retractor can be reduced in the overall size and weight.

Further, according to the present invention, the engagement members surely engage with the respective engagement portions without a failure, so that the reel shaft can be reliably locked.

Further, according to the present invention, the reel shaft can be locked simply by engaging the first and second engagement members with the first and second engagement portions without moving the reel shaft. Accordingly, the mechanism is simplified, and the number of parts required decreases. As a result, the number of assembling steps decreases, and the cost lowers.

Further, according to the present invention, pawls are employed as the first and second engagement members, and teeth are used to constitute the first and second engagement portions. Thus, the engagement is made even more reliably, and the structure is simplified.

Further, according to the present invention, cams and cam holes are employed to form the lock control means. Thus, the structure is further simplified, and the operation is made even more reliable.

What we claim:

1. A seat belt retractor for a vehicle including a reel shaft for winding up a webbing, a frame rotatably supporting both ends of said reel shaft, lock means disposed in between said frame and said reel shaft and arranged to allow rotation of said reel shaft under normal circumstances and to be activated, when need arises, so as to prevent rotation of said reel shaft in at least a direction in which said webbing is unwound, deceleration sensing means operating when deceleration exceeding a predetermined value acts on the vehicle, and lack activating means for activating said lack means in response to the operation of said deceleration sensing means;

said lock means including either a first engagement member or a first engagement portion, which is provided on said frame at a position which is closer to one end of said reel shaft, the other of said first engagement member and first engagement portion, which is supported on said one end of said reel shaft so as to be engageable with the first-mentioned one of said first engagement member and first engagement portion, either a second engagement member or a second engagement portion, which is provided on said frame at a position which is closer to the other end of said reel shaft, and the other of said second engagement member and second engagement portion, which is supported on the other end of said reel shaft so as to be engageable with the first-mentioned one of said second engagement member and second engagement portion, said lock activating means including lock control means for controlling locking such that after said first engagement member and first engagement portion have been set in a state where they are engageable with each other, said second engagement member and second engagement portion are set in a state where they are engageable with each other, and then engagement between said first engagement member and first engagement portion and engagement between said second engagement member and second engagement portion are effected, wherein said lock control means effects control such that the engagement between said first engagement member and first engagement portion and the engagement between said second engagement member and second engagement portion are completed simultaneously.

2. A seat belt retractor according to claim 1, further comprising webbing pull-out sensing means operating when said webbing is pulled out at acceleration exceeding a predetermined value, said lock activating means being also activated in response to the operation of said webbing pull-out sensing means.

3. A seat belt retractor according to claim 1, wherein said first and second engagement portions respectively comprise a predetermined number of first teeth and a predetermined number of second teeth, which are formed on respective inner peripheral surfaces of circular holes formed in said frame, and said first and second engagement member respectively comprise a first pawl and a second pawl, which are pivotably provided on said reel shaft and engageable with said first and second teeth, respectively, and wherein said lock control means decides which one of said second teeth is to be engaged with said second pawl after deciding which one of said first teeth is to be engaged with said first pawl.

4. A seat belt retractor according to claims 1, wherein said first and second engagement portions respectively comprise a predetermined number of first teeth and a predetermined number of second teeth, which are formed on respective outer peripheries of flanges formed on said reel shaft, and said first and second engagement members respectively comprise a first pawl and second pawl, which are pivotally provided on said frame and engageable with said first and second teeth, respectively, and wherein said lock control means decides which one of said second teeth is to be engaged with said second pawl after deciding which one of said first teeth is to be engaged with said first pawl.

5. A seat belt retractor for a vehicle including a reel shaft for winding up a webbing, a frame rotatably supporting both ends of said reel shaft, lock means disposed in between said frame and said reel shaft and arranged to allow rotation of said reel shaft under normal circumstances and to be activated, when need arises, so as to prevent rotation of said reel shaft in at least a direction in which said webbing is unwound, deceleration sensing means operating when deceleration exceeding a predetermined value acts on the vehicle, and lock activating means for activating said lock means in response to the operation of said deceleration sensing means, said lock means including either a first engagement member or a first engagement portion, which is provided on said frame at a position which is closer to one end of said reel shaft, the other of said first engagement member and first engagement portion, which is supported on said one end of said reel shaft so as to be engageable with the first-mentioned one of said first engagement member and first engagement portion, either a second engagement member or a second engagement portion , which is provided on said frame at a position which is closer to the other end of said reel shaft, and the other of said second engagement member and second engagement portion, which is supported on the other end of said reel shaft so as to be engageable with the first-mentioned one of said second engagement member and second engagement portion, said lock activating means including lock controlling means for controlling locking such that after said first engagement member and first engagement portion have been set in a state where they are engageable with each other, said second engagement member and second engagement portion are set in a state where they are enagageable with each other, and then engagement between said first engagement member and first engagement portion and engagement between said second engagement member and second engagement portion are effected; said lock control means effecting control such that after the engagement between said first engagement member and first engagement portion has been completed, the engagement between said second engagement member and second engagement portion is completed, wherein said first and second engagement portions respectively comprise a predetermined number of first teeth and a predetermined number of second teeth, which are formed on respective outer peripheries of flanges formed on said reel shaft, and said first and second engagement members respectively comprise a first pawl and second pawl, which are provided on said frame and engageable with said first and second teeth, respectively, and wherein said lock control means decides which one of said second teeth is to be engaged with said second pawl after deciding which one of said first teeth is to be engaged with said first pawl.

6. A seat belt retractor for a vehicle including a reel shaft for winding up a webbing, a frame rotatably supporting both ends of said reel shaft, lock means disposed in between said frame and said reel shaft and arranged to allow rotation of said reel shaft under normal circumstances and to be activated, when need arises, so as to prevent rotation of said reel shaft in at least a direction in which said webbing is unwound, deceleration sensing means operating when deceleration exceeding a predetermined value acts on the vehicle, and lock activating means for activating said lock means in response to the operation of said deceleration sensing means (1), said lock means including either a first engagement member or a first engagement portion, which is provided on said frame at a position which is closer to one end of said reel shaft, the other of said first engagement member and first engagement portion, which is supported on said one end of said reel shaft so as to be engageable with the first-mentioned one of said first engagement member and first engagement portion, either a second engagement member or a second engagement portion, which is provided on said frame at a position which is closer to the other end of said reel shaft, and the other of said second engagement member and second engagement portion, which is supported on the other end of said reel shaft so as to be enagageable with the first-mentioned one of said second engagement member and second engagement portion, said lock activating means Including lock control means for controlling locking such that after said first engagement member and first engagement portion have been set in a state where they are engageable with each other, said second engagement member and second engagement portion are set in a state where they are engageable with each other, and then engagement between said first engagement member and first engagement portion and engagement between said second engagement member and second engagement portion are effected, and webbing pull-out sensing means operating when said webbing is pulled out at acceleration exceeding a predetermined value, said lock activating means being also activated in response to the operation of said webbing pull-out sensing means, wherein said first and second engagement portions respectively comprise a predetermined number of first teeth and a predetermined number of second teeth, which are formed on respective outer peripheries of flanges formed on said reel shaft, and said first and second engagement members respectively comprise a first pawl and second pawl, which are pivotally provided on said frame and engageable with said first and second teeth, respectively, and wherein said lock control means decides which one of said second teeth is to be engaged with said second pawl after deciding which one of said first teeth is to be engaged with said first pawl.

7. A seat belt retractor for a vehicle including a reel shaft for winding up a webbing, a frame rotatably supporting both ends of said reel shaft, lock means disposed in between said frame and said reel shaft and arranged to allow rotation of said reel shaft under normal circumstances and to be activated, when need arises, so as to prevent rotation of said reel shaft in at least a direction in which said webbing is unwound, deceleration sensing means operating when deceleration exceeding a predetermined value acts on the vehicle, and lock activating means for activating said lock means in response to the operation of said deceleration sensing means, said lock means including either a first engagement member or a first engagement portion, which is provided on said frame at a position which is closer to one end of said reel shaft, the other of said first engagement member and first engagement portion, which is supported on said one end of said reel shaft so as to be engageable with the first-mentioned one of said first engagement member and first engagement portion, either a second engagement member or a second engagement portion, which is provided on said frame at a position which is closer to the other end of said reel shaft, and the other of said second engagement member and second engagement portion, which is supported on the other end of said reel shaft so as to be engageable with the first-mentioned one of said second engagement member and second engagement portion; said first and second engagement portions respectively comprising a predetermined number of first teeth and a predetermined number of second teeth, which are formed on respective inner peripheral surfaces of circular holes formed in said frame, and said first and second engagement member respectively comprising a first pawl and a second pawl, which are pivotally provided on said reel shaft and engageable with said first and second teeth, respectively, said lock activating means including lock control means for controlling locking such that after said first engagement member and first engagement portion having been set in a state where they are engageable with each other, said second engagement member and second engagement portion are set in a state where they are engageable with each other, and then engagement between said first engagement member and first engagement portion and engagement between said second engagement member and second engagement portion are effected, and said lock control means deciding which one of said second teeth is to be engaged with said second pawl after deciding which one of said first teeth is to be engaged with said first pawl, wherein said lock control means includes a first cam for guiding said first pawl, a second cam for guiding said second pawl, and means for interlocking said first and second pawls; and said first cam is a radial cam hole, and said second cam is formed in a substantially L shape from a radial hole and a circumferential hole.

8. A seat belt retractor for a vehicle including a reel shaft for winding up a webbing, a frame rotatably supporting both ends of said reel shaft, lock means disposed in between said frame and said reel shaft and arranged to allow rotation of said reel shaft under normal circumstances and to be activated, when need arises, so as to prevent rotation of said reel shaft in at least a direction in which said webbing is unwound, deceleration sensing means operating when deceleration exceeding a predetermined value acts on the vehicle, and lock activating means for activating said lock means in response to the operation of deceleration sensing means, said lock means including either a first engagement member or a first engagement portion, which is provided on said frame at a position which is closer to one end of said reel shaft, the other of said first engagement member and first engagement portion, which is supported on said one end of said reel shaft so as to be engageable with the first-mentioned one of said first engagement member and first engagement portion, either a second engagement member or a second engagement portion, which is provided on said frame at a position which is closer to the other end of said reel shaft, and the other of said second engagement member and second engagement portion, which is supported on the other end of said reel shaft so as to be engageable with the first-mentioned one of said second engagement member and second engagement portion, said lock activating means including lock control means for controlling locking such that after said first engagement member and first engagement portion have been set in a state where they are engageable with each other, said second engagement member and second engagement portion are set in a state where they are engageable with each other, and then engagement between said first engagement member and first engagement portion and engagement between said second engagement member and second engagement portion are effected, wherein said first and second engagement portions respectively comprise a predetermined number of first teeth and a predetermined number of second teeth, which are formed on respective outer peripheries of flanges formed on said reel shaft, and said first and second engagement members respectively comprise a first pawl and second pawl, which are pivotally provided on said frame and engageable with said first and second teeth, respectively, and wherein said lock control means decides which one of said second teeth is to be engaged with said second pawl after deciding which one of said first teeth is to be engaged with said first pawl.

9. A seat belt retractor according to claim 8, wherein said lock control means includes a first cam for guiding said first pawl, a second can for guiding said second pawl, and means for interlocking said first and second cams.

* * * * *